United States Patent
Rhoads et al.

(10) Patent No.: US 8,489,598 B2
(45) Date of Patent: Jul. 16, 2013

(54) METHODS AND DEVICES EMPLOYING CONTENT IDENTIFIERS

(75) Inventors: Geoffrey B. Rhoads, West Linn, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 752 days.

(21) Appl. No.: 11/671,848

(22) Filed: Feb. 6, 2007

(65) Prior Publication Data

US 2007/0276841 A1   Nov. 29, 2007

Related U.S. Application Data

(60) Division of application No. 11/132,031, filed on May 17, 2005, now Pat. No. 7,174,031, which is a division of application No. 09/571,422, filed on May 15, 2000, now Pat. No. 6,947,571, and a continuation-in-part of application No. 09/552,998, filed on Apr. 19, 2000, now abandoned, and a continuation-in-part of application No. 09/547,664, filed on Apr. 12, 2000, now Pat. No. 7,206,820, and a continuation-in-part of application No. 09/531,076, filed on Mar. 18, 2000, now Pat. No. 8,180,844, and a continuation-in-part of application No. 09/343,104, filed on Jun. 29, 1999, now abandoned, and a continuation-in-part of application No. 09/343,101, filed on Jun. 29, 1999, now abandoned, and a continuation-in-part of application No. 09/342,971, filed on Jun. 29, 1999, now abandoned, and a continuation-in-part of application No. 09/342,689, filed on Jun. 29, 1999, now Pat. No. 6,311,214, and a continuation-in-part of application No. 09/342,688, filed on Jun. 29, 1999, now Pat. No. 6,650,761, and a continuation-in-part of application No. 09/314,648, filed on May 19, 1999, now Pat. No. 6,681,028.

(60) Provisional application No. 60/141,468, filed on Jun. 29, 1999, provisional application No. 60/151,586, filed on Aug. 30, 1999, provisional application No. 60/158,015, filed on Oct. 6, 1999, provisional application No. 60/163,332, filed on Nov. 3, 1999, provisional application No. 60/164,619, filed on Nov. 10, 1999.

(51) Int. Cl.
*G06F 7/00* (2006.01)
*G06F 17/30* (2006.01)

(52) U.S. Cl.
USPC .................. 707/736; 707/756; 707/796

(58) Field of Classification Search
None
See application file for complete search history.

(56) References Cited

U.S. PATENT DOCUMENTS

| 5,436,653 A | 7/1995 | Ellis et al. |
| 5,481,294 A | 1/1996 | Thomas et al. |

(Continued)

FOREIGN PATENT DOCUMENTS

WO     WO9904568     1/1999

OTHER PUBLICATIONS

Mockapetris, RFC 1034, Domain names—implementation and specification, Nov. 1987.

(Continued)

*Primary Examiner* — Cheryl Lewis
*Assistant Examiner* — Raheem Hoffler

(57) ABSTRACT

Content identifiers are associated with respective metadata. Through use of the metadata, a user's experience with the content can be enhanced. A variety of other arrangements are also detailed.

20 Claims, 16 Drawing Sheets

U.S. PATENT DOCUMENTS

| | | | |
|---|---|---|---|
| 5,502,576 A | 3/1996 | Ramsay et al. |
| 5,568,570 A | 10/1996 | Rabbani |
| 5,577,266 A | 11/1996 | Takahisa et al. |
| 5,581,800 A | 12/1996 | Fardeau et al. |
| 5,584,050 A | 12/1996 | Lyons |
| 5,606,609 A | 2/1997 | Houser et al. |
| 5,613,004 A | 3/1997 | Cooperman et al. |
| 5,640,193 A | 6/1997 | Wellner |
| 5,687,236 A | 11/1997 | Moskowitz et al. |
| 5,740,244 A | 4/1998 | Indeck et al. |
| 5,761,606 A | 6/1998 | Wolzien |
| 5,765,152 A | 6/1998 | Erickson |
| 5,765,176 A * | 6/1998 | Bloomberg .................... 715/209 |
| 5,774,666 A | 6/1998 | Portuesi |
| 5,781,914 A | 7/1998 | Stork |
| 5,790,172 A | 8/1998 | Imanaka |
| 5,822,432 A | 10/1998 | Moskowitz et al. |
| 5,838,458 A | 11/1998 | Tsai |
| 5,838,790 A | 11/1998 | McAuliffe et al. |
| 5,838,906 A | 11/1998 | Doyle |
| 5,841,886 A * | 11/1998 | Rhoads .......................... 382/115 |
| 5,841,978 A | 11/1998 | Rhoads |
| 5,848,413 A | 12/1998 | Wolff |
| 5,862,260 A | 1/1999 | Rhoads |
| 5,870,552 A | 2/1999 | Dozier |
| 5,870,754 A | 2/1999 | Dimitrova |
| 5,903,892 A | 5/1999 | Hoffert |
| 5,905,248 A | 5/1999 | Russell et al. |
| 5,923,327 A | 7/1999 | Smith |
| 5,938,727 A | 8/1999 | Ikeda |
| 5,939,695 A | 8/1999 | Nelson |
| 5,950,173 A | 9/1999 | Perkowski |
| 5,963,916 A | 10/1999 | Kaplan |
| 5,963,957 A | 10/1999 | Hoffberg |
| 5,969,283 A | 10/1999 | Looney |
| 5,971,277 A | 10/1999 | Cragun et al. |
| 5,979,757 A | 11/1999 | Tracy et al. |
| 5,986,690 A | 11/1999 | Hendricks |
| 5,988,897 A | 11/1999 | Pierce et al. |
| 6,012,102 A | 1/2000 | Shachar |
| 6,014,569 A | 1/2000 | Bottom |
| 6,032,195 A | 2/2000 | Reber |
| 6,076,734 A | 6/2000 | Dougherty et al. |
| 6,081,629 A | 6/2000 | Browning |
| 6,081,830 A | 6/2000 | Schindler |
| 6,084,528 A | 7/2000 | Beach et al. |
| 6,088,455 A | 7/2000 | Logan |
| 6,098,106 A | 8/2000 | Philyaw |
| 6,104,913 A * | 8/2000 | McAllister .................... 455/41.1 |
| 6,108,656 A | 8/2000 | Durst |
| 6,119,944 A | 9/2000 | Mulla |
| 6,121,530 A | 9/2000 | Sonoda |
| 6,122,403 A | 9/2000 | Rhoads |
| 6,147,940 A | 11/2000 | Yankowski |
| 6,148,331 A | 11/2000 | Parry |
| 6,148,407 A | 11/2000 | Aucsmith |
| 6,151,624 A | 11/2000 | Teare |
| 6,154,738 A | 11/2000 | Call |
| 6,164,534 A | 12/2000 | Rathus et al. |
| 6,169,541 B1 | 1/2001 | Smith |
| 6,185,318 B1 | 2/2001 | Jain et al. |
| 6,185,683 B1 * | 2/2001 | Ginter et al. .................. 713/176 |
| 6,188,010 B1 | 2/2001 | Iwamura |
| 6,199,048 B1 | 3/2001 | Hudetz et al. |
| 6,205,249 B1 | 3/2001 | Moskowitz |
| 6,208,746 B1 * | 3/2001 | Musgrave ..................... 382/100 |
| 6,219,793 B1 | 4/2001 | Li et al. |
| 6,222,807 B1 | 4/2001 | Min-Jae |
| 6,226,672 B1 | 5/2001 | DeMartin et al. |
| 6,229,924 B1 | 5/2001 | Rhoads et al. |
| 6,240,185 B1 * | 5/2001 | Van Wie et al. ............... 380/232 |
| 6,240,459 B1 | 5/2001 | Roberts |
| 6,243,480 B1 | 6/2001 | Zhao et al. |
| 6,249,226 B1 | 6/2001 | Harrison et al. |
| 6,307,949 B1 | 10/2001 | Rhoads |
| 6,311,214 B1 | 10/2001 | Rhoads |
| 6,345,256 B1 | 2/2002 | Milsted et al. |
| 6,381,341 B1 | 4/2002 | Rhoads |
| 6,385,329 B1 | 5/2002 | Sharma et al. |
| 6,389,055 B1 | 5/2002 | August |
| 6,408,082 B1 | 6/2002 | Rhoads et al. |
| 6,421,070 B1 | 7/2002 | Ramos et al. |
| 6,424,725 B1 | 7/2002 | Rhoads et al. |
| 6,425,081 B1 | 7/2002 | Iwamura |
| 6,484,198 B1 | 11/2002 | Milovanovic |
| 6,505,160 B1 | 1/2003 | Levy et al. |
| 6,516,079 B1 | 2/2003 | Rhoads et al. |
| 6,522,770 B1 | 2/2003 | Seder et al. |
| 6,535,617 B1 | 3/2003 | Hannigan et al. |
| 6,542,927 B2 | 4/2003 | Rhoads |
| 6,549,933 B1 | 4/2003 | Barrett |
| 6,553,129 B1 | 4/2003 | Rhoads |
| 6,567,533 B1 | 5/2003 | Rhoads |
| 6,580,808 B2 | 6/2003 | Rhoads |
| 6,590,996 B1 | 7/2003 | Reed et al. |
| 6,605,160 B2 | 8/2003 | Hoskin |
| 6,611,607 B1 | 8/2003 | Davis et al. |
| 6,614,914 B1 | 9/2003 | Rhoads et al. |
| 6,636,249 B1 | 10/2003 | Rekimoto |
| 6,647,128 B1 | 11/2003 | Rhoads |
| 6,647,130 B2 | 11/2003 | Rhoads |
| 6,650,761 B1 | 11/2003 | Rodriguez et al. |
| 6,674,993 B1 | 1/2004 | Tarbouriech |
| 6,675,165 B1 | 1/2004 | Rothschild |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,735,311 B1 | 5/2004 | Rump et al. |
| 6,745,234 B1 | 6/2004 | Philyaw |
| 6,760,463 B2 | 7/2004 | Rhoads |
| 6,763,123 B2 | 7/2004 | Reed et al. |
| 6,768,809 B2 | 7/2004 | Rhoads et al. |
| 6,771,885 B1 | 8/2004 | Agnihotri et al. |
| 6,772,124 B2 | 8/2004 | Hoffberg |
| 6,775,392 B1 | 8/2004 | Rhoads |
| 6,785,815 B1 * | 8/2004 | Serret-Avila et al. ......... 713/176 |
| 6,798,894 B2 | 9/2004 | Rhoads |
| 6,813,366 B1 | 11/2004 | Rhoads |
| 6,829,368 B2 | 12/2004 | Meyer et al. |
| 6,879,701 B1 | 4/2005 | Rhoads |
| 6,917,724 B2 | 7/2005 | Seder et al. |
| 6,920,232 B2 | 7/2005 | Rhoads |
| 6,937,135 B2 * | 8/2005 | Kitson et al. ................. 340/5.52 |
| 6,941,275 B1 | 9/2005 | Swierczek |
| 6,947,571 B1 | 9/2005 | Rhoads et al. |
| 6,965,682 B1 | 11/2005 | Davis |
| 6,965,683 B2 | 11/2005 | Hein, III |
| 6,973,669 B2 | 12/2005 | Daniels |
| 6,975,746 B2 | 12/2005 | Davis et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,465 B2 | 5/2006 | Rhoads |
| 7,055,166 B1 | 5/2006 | Logan |
| 7,058,697 B2 | 6/2006 | Rhoads |
| 7,062,069 B2 | 6/2006 | Rhoads |
| 7,095,871 B2 | 8/2006 | Jones et al. |
| 7,111,170 B2 | 9/2006 | Rhoads et al. |
| 7,113,614 B2 | 9/2006 | Rhoads |
| 7,139,408 B2 | 11/2006 | Rhoads et al. |
| 7,158,654 B2 | 1/2007 | Rhoads |
| 7,164,780 B2 | 1/2007 | Brundage et al. |
| 7,171,016 B1 | 1/2007 | Rhoads |
| 7,171,018 B2 | 1/2007 | Rhoads et al. |
| 7,174,031 B2 | 2/2007 | Rhoads et al. |

| | | |
|---|---|---|
| 7,174,293 B2 | 2/2007 | Kenyon |
| 7,177,443 B2 | 2/2007 | Rhoads |
| 7,185,201 B2 | 2/2007 | Rhoads |
| 7,206,820 B1 | 4/2007 | Rhoads |
| 7,213,757 B2 | 5/2007 | Jones et al. |
| 7,224,819 B2 | 5/2007 | Levy et al. |
| 7,224,995 B2 | 5/2007 | Rhoads |
| 7,248,717 B2 | 7/2007 | Rhoads |
| 7,251,475 B2 | 7/2007 | Kawamoto |
| 7,261,612 B1 | 8/2007 | Hannigan et al. |
| 7,289,643 B2 | 10/2007 | Brunk et al. |
| 7,302,574 B2 | 11/2007 | Conwell |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,333,957 B2 | 2/2008 | Levy et al. |
| 7,349,552 B2 | 3/2008 | Levy |
| 7,369,676 B2 | 5/2008 | Hein |
| 7,369,678 B2 | 5/2008 | Rhoads |
| 7,377,421 B2 | 5/2008 | Rhoads |
| 7,391,880 B2 | 6/2008 | Reed et al. |
| 7,406,214 B2 | 7/2008 | Rhoads et al. |
| 7,415,129 B2 | 8/2008 | Rhoads |
| 7,424,131 B2 | 9/2008 | Alattar et al. |
| 7,427,030 B2 | 9/2008 | Jones et al. |
| 7,433,491 B2 | 10/2008 | Rhoads |
| 7,437,430 B2 | 10/2008 | Rhoads |
| 7,444,000 B2 | 10/2008 | Rhoads |
| 7,444,353 B1 | 10/2008 | Chen |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,461,136 B2 | 12/2008 | Rhoads |
| 7,466,840 B2 | 12/2008 | Rhoads |
| 7,486,799 B2 | 2/2009 | Rhoads |
| 7,502,759 B2 | 3/2009 | Hannigan et al. |
| 7,505,605 B2 | 3/2009 | Rhoads |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,951 B2 | 6/2009 | Davis et al. |
| 7,545,952 B2 | 6/2009 | Brundage et al. |
| 7,562,392 B1 | 7/2009 | Rhoads |
| 7,564,992 B2 | 7/2009 | Rhoads |
| RE40,919 E | 9/2009 | Rhoads |
| 7,587,602 B2 | 9/2009 | Rhoads |
| 7,590,259 B2 | 9/2009 | Levy |
| 7,593,576 B2 | 9/2009 | Meyer et al. |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,693,965 B2 | 4/2010 | Rhoads |
| 7,697,719 B2 | 4/2010 | Rhoads |
| 7,711,143 B2 | 5/2010 | Rhoads |
| 7,738,673 B2 | 6/2010 | Reed |
| 7,747,037 B2 | 6/2010 | Hein, III |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,805,500 B2 | 9/2010 | Rhoads |
| 7,822,225 B2 | 10/2010 | Alattar |
| 7,837,094 B2 | 11/2010 | Rhoads |
| 7,945,781 B1 | 5/2011 | Rhoads |
| 7,949,147 B2 | 5/2011 | Rhoads et al. |
| 7,953,270 B2 | 5/2011 | Rhoads |
| 7,953,824 B2 | 5/2011 | Rhoads et al. |
| 7,957,553 B2 | 6/2011 | Ellingson et al. |
| 7,961,949 B2 | 6/2011 | Levy et al. |
| 7,970,166 B2 | 6/2011 | Carr et al. |
| 7,970,167 B2 | 6/2011 | Rhoads |
| 2001/0001854 A1 | 5/2001 | Schena et al. |
| 2001/0011233 A1 | 8/2001 | Narayanaswami |
| 2001/0034705 A1 | 10/2001 | Rhoads et al. |
| 2001/0051996 A1* | 12/2001 | Cooper et al. ............... 709/217 |
| 2001/0055407 A1 | 12/2001 | Rhoads |
| 2002/0009208 A1 | 1/2002 | Alattar et al. |
| 2002/0131076 A1 | 9/2002 | Davis |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2003/0154138 A1* | 8/2003 | Phillips et al. ................ 705/26 |
| 2004/0005093 A1 | 1/2004 | Rhoads |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0043018 A1 | 2/2005 | Kawamoto |
| 2005/0058318 A1 | 3/2005 | Rhoads |
| 2005/0063027 A1* | 3/2005 | Durst et al. ...................... 359/2 |
| 2005/0160272 A1* | 7/2005 | Teppler ....................... 713/178 |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0055884 A1 | 3/2007 | Rhoads |
| 2007/0064940 A1* | 3/2007 | Moskowitz et al. .......... 380/205 |
| 2007/0108287 A1 | 5/2007 | Davis et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0125475 A1 | 5/2009 | Rhoads et al. |
| 2009/0286572 A1 | 11/2009 | Rhoads et al. |
| 2010/0045816 A1 | 2/2010 | Rhoads |
| 2010/0062819 A1 | 3/2010 | Hannigan et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0066658 A1 | 3/2011 | Rhoads et al. |
| 2011/0091066 A1 | 4/2011 | Alattar |

OTHER PUBLICATIONS

Mockapetris, Development of the domain name system, ACM Sigcomm Computer Communication Review, vol. 25, Issue 1, Jan. 1995, pp. 112-122.

Office Action on Korean Application 10-2010-700716, dated Dec. 30, 2010 (with English summary).

Boney et al., "Digital Watermarks for Audio Signals," IEEE Proceedings of Multimedia '96, 1996, pp. 473-480.

Bender et al., "Techniques for Data Hiding," SPIE vol. 2420, 1996, pp. 164-173.

U.S. Appl. No. 09/343,101, filed Jun. 29, 1999, Bruce L. Davis, et al.

U.S. Appl. No. 09/343,104, filed Jun. 29, 1999, Tony F. Rodriguez, et al.

U.S. Appl. No. 09/413,117, filed Oct. 6, 1999, Geoffrey B. Rhoads.

U.S. Appl. No. 09/482,749, filed Jan. 13, 2000, Geoffrey B. Rhoads.

U.S. Appl. No. 09/507,096, filed Feb. 17, 2000, Geoffrey B. Rhoads, et al.

U.S. Appl. No. 09/552,998, filed Apr. 19, 2000, Tony F. Rodriguez, et al.

U.S. Appl. No. 09/567,405, filed May 8, 2000, Geoffrey B. Rhoads, et al.

U.S. Appl. No. 09/629,649, filed Aug. 1, 2000, J. Scott Carr, et al.

U.S. Appl. No. 09/633,587, filed Aug. 7, 2000, Geoffrey B. Rhoads, et al.

U.S. Appl. No. 09/689,289, filed Oct. 11, 2000, Geoffrey B. Rhoads, et al.
U.S. Appl. No. 09/697,015, filed Oct. 25, 2000, Bruce L. Davis, et al.
U.S. Appl. No. 09/697,009, filed Oct. 25, 2000, Bruce L. Davis, et al.
U.S. Appl. No. 13/084,981, filed Apr. 12, 2011, Geoffrey B. Rhoads.

Office Action on Canadian Application 2,373,511, mailed Sep. 12, 2012.

* cited by examiner

Grid Orientation Under
CCD 218a

Grid Orientation Under
CCD 218b

METHODS AND DEVICES EMPLOYING CONTENT IDENTIFIERS

RELATED APPLICATION DATA

This application is a division of application Ser. No. 11/132,031, filed May 17, 2005 (now U.S. Pat. No. 7,174, 031), which is a division of application Ser. No. 09/571,422, filed May 15, 2000 (now U.S. Pat. No. 6,947,571), which claims priority to each of the following provisional patent applications:

60/141,468, filed Jun. 29, 1999;
60/151,586, filed Aug. 30, 1999;
60/158,015, filed Oct. 6, 1999;
60/163,332, filed Nov. 3, 1999; and
60/164,619, filed Nov. 10, 1999;

and which is also a continuation-in-part of each of the following applications

Ser. No. 09/314,648, filed May 19, 1999 (now U.S. Pat. No. 6,681,028);
Ser. No. 09/342,688, filed Jun. 29, 1999(now U.S. Pat. No. 6,650,761);
Ser. No. 09/342,689, filed Jun. 29, 1999 (now U.S. Pat. No. 6,311,214);
Ser. No. 09/342,971, filed Jun. 29, 1999 (now abandoned);
Ser. No. 09/343,101, filed Jun. 29, 1999 (now abandoned);
Ser. No. 09/343,104, filed Jun. 29, 1999 (now abandoned);
Ser. No. 09/531,076, filed Mar. 18, 2000;
Ser. No. 09/547,664, filed Apr. 12, 2000 (now allowed); and
Ser. No. 09/552,998, filed Apr. 19, 2000 (now abandoned).

The foregoing documents are incorporated herein by reference.

INTRODUCTION

"Bedoop." That might be the sound someone might hear as they lazily place a magazine advertisement in front of their desktop camera. Magically, the marketing and sales web site associated with the ad is displayed on their computer. More information? Want to buy now? Look at the full product line? No problem.

"Bedoop." That might be the same sound when that same someone places their credit card in front of their desktop camera. Instantly, the product displayed on the web page is purchased. Behind the scenes, a secure purchase link is initiated, transmitting all requisite information to the vendor. Twist the credit card clockwise and the purchaser chooses overnight delivery.

So goes an exemplary embodiment further described in this specification. Although this example is rather specific, it nevertheless alludes to vast array of applications possible when an input device such as a digital camera is turned into a general-purpose user interface device with an intuitive power that very well might rival the mouse and the keyboard.

One aspect of certain embodiments is that an object or paper product so-scanned contains digital information that can be quickly read and acted upon by an appropriately configured device, computer or appliance. Such an embodiment envisions that this digital information is aesthetically hidden on objects. These objects have been previously and pro-actively marked with the digital information, using any of the broad range of data encoding technologies, such as digital watermarking.

Although this aspect of the technology concentrates on flat object applications wherein the digital information is often imperceptibly integrated into the object, it is certainly not meant to be so limited. Objects can be three dimensional in nature and the information more visually overt and/or pre-existing (i.e., not "pro-actively" embedded, or it might not even be "digital," per se). Different implementation considerations attach to these variants. Likewise, though the bulk of this disclosure concentrates on objects which have some form of digital message attached thereto, some aspects of the technology may apply to objects which have no such thing, where the prior arts of pattern recognition and gestural input can be borrowed in combination with this technology to effect yet a broader array of applications.

Nor, as will be apparent, is the technology limited to systems employing optical input and encoded imagery. Corresponding techniques can also be employed with encoded audio. Indeed, any physical or electronic "object" can make use of the principles detailed herein.

"Bedoop." The sound that a refrigerator might make, outfitted with a simple camera/processor unit/net connection, as a ten year old child holds up an empty milk carton and a ping goes out to the local grocery store, adding the item to an accumulating delivery list. The sound that might be heard echoing over and over inside Internet cafés as heretofore computerphobes take their first skeptical steps onto the World Wide Web. The sound heard at the fast food counter as a repeat customer holds up his sandwich card ticking off his latest meal, hoping for the sirens to go off for a $500 prize given to the lucky customer of the week. Blue sky scenarios abound.

Such aspects of the present technology are thus about powerful new user interfaces to computers. These new user interfaces extend into the everyday world in ways that a mouse and keyboard never could. By enabling everyday objects to communicate their identities and functions to ever-attendant devices, not only will the World Wide Web be given an entirely new dimension, but basic home and office computing may be in store for some fundamental advances as well.

According to one aspect, a method of data processing on a computer system comprises (a) using an application program to compose an electronic version of a document; (b) printing the document onto paper, the printing including marking with machine readable indicia encoding plural-bit auxiliary data; and (c) storing the plural-bit auxiliary data in association with data identifying a location at which the electronic version of the document is stored.

According to another aspect, a method of data processing on a computer system comprises (a) presenting a printed document to an optical capture device; (b) processing image data produced by said device to decode plural-bit data encoded therein; (c) based on said decoded plural-bit data, launching a software application corresponding to said printed document; and (d) using said software application to open an electronic version of said document.

According to another aspect, a method of operating a computer (the computer including an operating system with a registry database, the registry database associating specific data types with specific software programs particularly corresponding thereto) comprises: (a) providing a frame of image data; (b) decoding plural-bit identifier data from the image data; (c) consulting the registry database to identify a software program corresponding to said identifier data; and (d) invoking the identified software program.

According to another aspect, a greeting card comprises a substrate with visually-perceptible indicia printed thereon, wherein the card is encoded with plural-bit binary data that can be decoded by an image processing device and used to direct a computer to a web site where an image, video, and/or audio presentation corresponding to said card is provided.

According to another aspect, method of providing a customized greeting comprises: (a) providing a greeting card having plural-bit data encoded therein; (b) customizing a web site presentation corresponding to said card; (c) providing the card to a recipient; (d) decoding the encoded plural-bit data from the card; and (e) in response to the decoded plural-bit data, presenting to the recipient the web site presentation.

According to another aspect, a method of printing a magazine comprises: (a) processing an electronic representation of an advertisement to encode plural bit data therein; (b) printing a page of advertising in accordance with said electronic representation to yield an encoded advertisement page; and (c) binding said page into a magazine; wherein said plural bit data serves to identify an entry in a database, said database entry having an internet address of a web page that is associated with said advertisement stored therein.

According to another aspect, a promotional method comprises: (a) encoding a print advertisement to hide plural-bit data therein; (b) processing the print advertisement to extract the plural-bit data therefrom; and (c) using at least a part of the extracted plural-bit data to direct an internet web browser to a web site that provides consumer information related to a product or service promoted by the print advertisement.

According to another aspect, a method of determining consumer response to print advertising comprises: (a) encoding a first print advertisement with first data; (b) encoding a second print advertisement with second data different than the first; (c) the first and second data providing identifiers by which consumer devices can link to web pages associated with said advertisements; (d) monitoring linking traffic due to each of said identifiers to thereby determine consumer response to the advertisements.

According to another aspect, a promotional method comprises: (a) presenting an object within the field of view of an optical sensor device, the object being selected from the list consisting of a retail product, packaging for a retail product, or printed advertising; (b) acquiring optical data corresponding to the object; (c) decoding plural-bit digital data from the optical data; (d) submitting at least some of said decoded data to a remote computer; and (e) determining at the remote computer whether a prize should be awarded in response to submission of said decoded data.

According to another aspect, a method of interacting with a magazine using a computer (the computer including an internet web browser) comprises: (a) providing a peripheral device having a sensor; (b) positioning the peripheral device adjacent a first advertisement in the magazine to direct the web browser to a first internet address; and (c) positioning the peripheral device adjacent a second advertisement in the magazine to direct the web browser to a second internet address.

According to another aspect, a computer used in conjunction with a computer system having an internet browser associated therewith comprises: (a) a housing adapted to fit within a user's palm and slide over a medium; (b) an optical sensor having at least one sensing element and producing optical data; (c) a lens for imaging the medium onto the sensor; and the method includes: (a) sliding the peripheral over a portion of a printed advertisement; (b) processing the optical data to decode plural bit information encoded on the advertisement; and (c) using said plural bit information to direct the internet browser to an internet web page associated with said advertisement.

According to another aspect, an electronic commerce method comprises: (a) providing a printed catalog that includes an image of an article offered for sale by a merchant, wherein the image is encoded with plural-bit binary data; (b) optically sensing the image to produce optical data corresponding thereto; (c) decoding the encoded data from the optical data; and (d) electronically ordering the article from the merchant by use of said decoded data. The ordering may make use of earlier-stored customer profile information (e.g., clothing size data), and the encoding may be steganographic.

According to another aspect, a wireless telephony handset includes a microphone, a modulator, and an RF amplifier, the device serving to receive audio and transmit an RF signal conveying audio modulation, the handset further including an optical sensor producing optical data, a lens for imaging an object onto the sensor, and a decoder for decoding plural bit identifier data conveyed by a barcode or a digital watermark on the object.

According to another aspect, an image-based network navigation method permitting a user to link to a remote computer comprises: (a) detecting encoded data from a printed object; (b) linking to the remote computer through a network in accordance with said encoded data; and (c) providing the user's zip code to the remote computer.

According to another aspect, a method comprises: (a) sensing an object identifier from a first object; (b) sending said first object identifier from a first device to a second device; (c) in response, at said second device, identifying address information corresponding to said first object identifier and sending same to the first device; (d) initiating a link from the first device in accordance with said address information; (e) at said second device, identifying additional objects related to said first object; identifying additional address information corresponding to said additional objects; and sending said additional address information to the first device; and (f) storing said additional address information in a memory at the first device; wherein, if an object included among said identified additional objects is sensed by the first device, the corresponding address information can be retrieved from said memory in the first device without the intervening delays of communicating with the second device.

According to another aspect, an apparatus has a detector of machine readable data and a software program used in conjunction with said machine readable data, and is operable to transmit a packet of data to a remote system, said packet of data comprising (a) an identifier of said software program, and (b) at least a portion of detected machine readable data.

According to another aspect, an apparatus having a detector of machine readable data and a software program used in conjunction with said machine readable data, is operable to transmit a packet of data to a remote system, said packet of data comprising (a) a context or environment identifier, and (b) at least a portion of detected machine readable data.

According to another aspect, a networked computer system, responsive to watermark data sent from a software program on a remote computer, initiates delivery of advertisement data to said remote computer.

In any of the foregoing arrangements, the encoding can be steganographic (e.g., by digital watermarking), or can employ other machine readable data (e.g., barcodes, etc.). More generally, the arrangements just reviewed generally have counterparts that can be implemented with other than optical or image data (e.g., audio data, magnetic stripe information, etc.).

The foregoing just touches on a few of the many aspects of the technology detailed below. These and other features of the present technology will be more readily apparent from the following detailed description, which proceeds with reference to the accompanying drawings.

DETAILED DESCRIPTION

Figure 1:
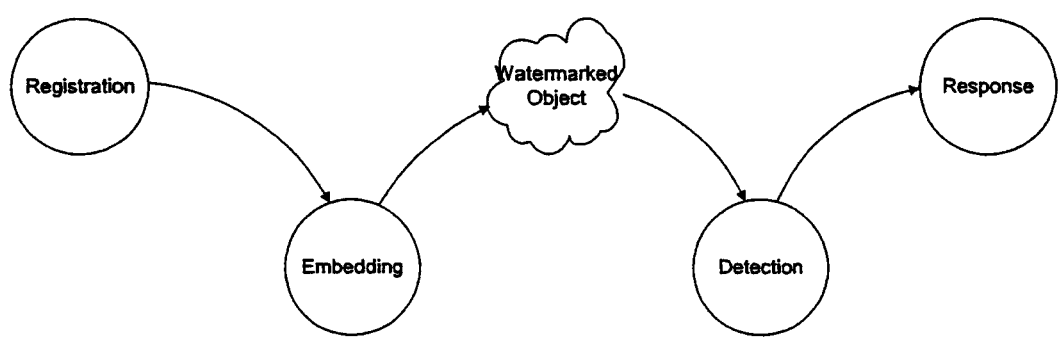
FIG. 1 is a diagram showing the principal process components of an illustrative system employing the present technology.

Basically, the technology detailed in this disclosure may be regarded as enhanced systems by which users can interact with computer-based devices. Their simple nature, and adaptability for use with everyday objects (e.g., milk cartons), makes the disclosed technology well suited for countless applications.

Due to the great range and variety of subject matter detailed in this disclosure, an orderly presentation is difficult to achieve. For want of a better arrangement, the specification is broken into two main parts. The first part details a variety of methods, applications, and systems, to illustrate the diversity of the present technology. The second more particularly focuses on a print-to-internet application. A short concluding portion is presented in Part III.

As will be evident, many of the topical sections presented below are both founded on, and foundational to, other sections. For want of a better rationale, the sections in the first part are presented in a more or less random order. It should be recognized that both the general principles and the particular details from each section find application in other sections as well.

Compounding the situation, the present specification draws from several priority applications filed over the course of nearly a year. Accordingly, the same concepts are sometimes expressed several times, each reflecting a different perspective—depending on the date and context of the application in which it was first found.

The term "Bedoop" has been superceded in applicant's commercialization of the technology by the term Digimarc MediaBridge. Both terms are used in this specification but refer to the same technology.

To prevent the length of this disclosure from compounding out of control, the various permutations and combinations of the features of the different sections are not exhaustively detailed. The inventors intend to explicitly teach such combinations/permutations, but practicality requires that the detailed synthesis be left to those who ultimately implement systems in accordance with such teachings.

Part I
Introduction to Digital Watermarking and Other Encoding Techniques

There are nearly as many techniques for digital watermarking (a type of steganographic data encoding) as there are applications for it. The reader is presumed to be familiar with the great variety of methods. A few are reviewed below.

The present assignee's U.S. Pat. No. 6,345,104 shows techniques by which very fine lines can be printed on a medium to slightly change the medium's apparent tint, while also conveying digital data. Commonly-owned U.S. Pat. No. 6,449,377 details how the contours of printed imagery can be adjusted to convey digital data. (That technique can be applied to printed text characters, as well as the line art imagery particularly considered.) The assignee's U.S. Pat. No. 5,850,481 details how the surface of paper or other media can be textured to convey optically-detectable binary data. The assignee's U.S. Pat. Nos. 5,862,260, 5,841,886 and 5,809,160 detail various techniques for steganographically encoding photographs and other imagery.

Some watermarking techniques are based on changes made in the spatial domain; others are based on changes made in transformed domains (e.g., DCT, wavelet).

Watermarking of printed text can be achieved by slight variations to character shape, character kerning, line spacing, etc., as shown by various writings by Brassil et al, including "Electronic Marking and Identification Techniques to Discourage Document Copying," Proceedings of INFOCOM '94 Conference on Computer, IEEE Comm. Soc Conference, Jun. 12-16, 1994, pp. 1278-1287; "Hiding Information in Document Images," Proceedings of the Twenty-Ninth Annual Conference on Information Sciences and Systems, p. 482-9, 1995; and "Document marking and identification using both line and word shifting," Proceedings of IEEE INFOCOM '95, The Conference on Computer Communications. Fourteenth Annual Joint Conference of the IEEE Computer and Communications Societies; Bringing Information to People (Cat. No. 95CH35759), p. 853-60 vol. 2, 1995.

The foregoing is just a sampling of the large literature on watermarking. The artisan is presumed to be familiar with such art, all of which is generally suitable for use with the novel concepts detailed below.

Although the following specification focuses on applications employing digital watermarking, certain of such applications can alternatively employ other data encoding techniques, including 1D and 2D barcodes, magnetic ink character recognition (MICR), optical character recognition (OCR), optical mark recognition (OMR), radio frequency identification (RF/ID), UV/IR identification technologies, data glyphs, organic transistors, magnetic stripe, etc., depending on the particular application requirements.

Basic Principles—Refrigerators and Desktop Clutter

Figure 11:
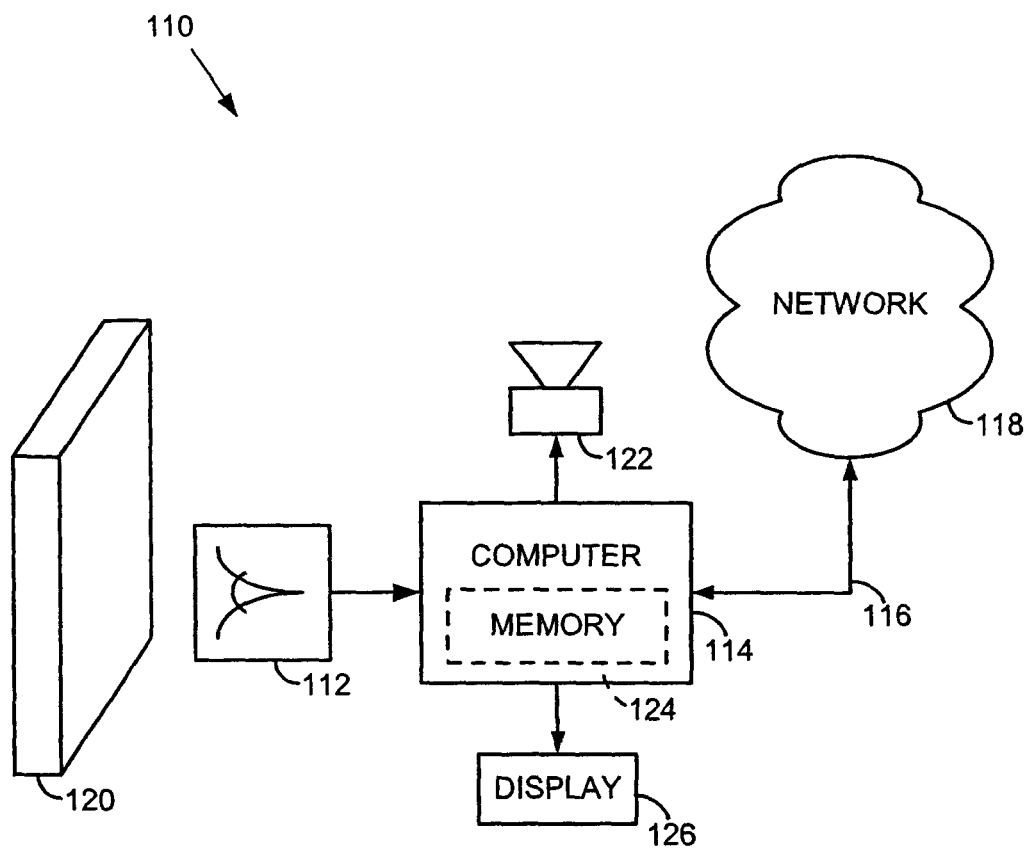
FIG. 11 is a block diagram showing another embodiment of the present technology.

Referring to FIG. 11, a basic embodiment 110 of the present technology includes an optical sensor 112, a computer 114, and a network connection 116 to the internet 118. The illustrated optical sensor 112 is a digital camera having a resolution of 320 by 200 pixels (color or black and white) that stares out, grabbing frames of image data five times per second and storing same in one or more frame buffers. These frames of image data are analyzed by a computer 114 for the presence of Bedoop data. (Essentially, Bedoop data is any form of plural-bit data encoding recognized by the system 110—data which, in many embodiments, initiates some action.) Once detected, the system responds in accordance with the detected Bedoop data (e.g., by initiating some local action, or by communication with a remote computer, such as over the internet, via an online service such as AOL, or using point-to-point dial-up communications, as with a bulletin board system).

Consider the milk carton example. The artwork on a milk carton can be adapted to convey Bedoop data. In the preferred embodiment, the Bedoop data is steganographically encoded (e.g., digitally watermarked) on the carton. Numerous digital watermarking techniques are known—all of which convey data in a hidden form (i.e., on human inspection, it is not apparent that digitally encoded data is present). Exemplary techniques operate by slightly changing the luminance, or contours of selected points on artwork or text printed on the carton, or by splattering tiny droplets of ink on the carton in a seemingly random pattern. Each of these techniques has the effect of changing the local luminance at areas across the carton—luminance changes that can be detected by the computer 114 and decoded to extract the encoded digital data. In the case of a milk carton, the data may serve to identify the object as, e.g., a half gallon carton of Alpenrose brand skim milk.

The FIG. 11 apparatus can be integrated into the door of a refrigerator and used to compile a shopping list. Milk cartons, and other Bedoop-encoded packaging, can be held up the optical sensor. When the computer 114 detects the presence of Bedoop data and successfully decodes same, it issues a confirmation tone ("be-doop") from a speaker or other audio transducer 122. The computer then adds data identifying the just-detected object to a grocery list. This list can be maintained locally (in disk storage or non-volatile RAM 124 or the like in the refrigerator or elsewhere in the home), or remotely (e.g., at a server computer located at a user-selected grocery, or elsewhere). In either event, the list is desirably displayed on a display in the user's home (e.g., an LCD screen 126 built into the front of the appliance). Conventional user interface techniques can be employed permitting the user to scroll through the displayed list, delete items as desired, etc.

Periodically, the listed groceries can be purchased and the list cleared. In one embodiment, the list is printed (either at the home or at the grocery), and the user walks the grocery aisles and purchases same in the conventional manner. In another embodiment, the grocer pulls the listed items from the shelves (in response to a user request conveyed by the internet or telephone, or by a gesture as hereafter detailed). Once the list has been pulled, the grocer can alert the user that the groceries are available for pickup (again, e.g., by internet or telephone message), or the grocer can simply deliver the groceries directly to the user's home. Naturally, on-line payment mechanisms can be employed if desired.

Consider a wholly unrelated Bedoop application. A Microsoft Excel spreadsheet is printed onto paper, and the paper becomes buried in a stack of clutter on an office worker's desk. Months later the spreadsheet again becomes relevant and is dug out of the stack. Changes need to be made to the data, but the file name has long-since been forgotten. The worker simply holds the printed page in front of a camera associated with the desktop computer. A moment later, the electronic version of the file appears on the worker's computer display.

When the page was originally printed, tiny droplets of ink or toner were distributed across the paper in a pattern so light as to be essentially unnoticeable, but which steganographically encoded the page with a plural-bit binary number (e.g., 24-128 bits). A database (e.g., maintained by the operating system, the Excel program, the printer driver, etc.) stored part of this number (e.g., 20 bits, termed a Universal Identifier, or UID) in association with the path and file name at which the electronic version of the file was stored, the page number within the document, and other useful information (e.g., author of the file, creation date, etc.).

The steganographic encoding of the document, and the updating of the database, can be performed by the software application (e.g., Excel). This option can be selected once by the user and applied thereafter to all printed documents (e.g., by a user selection on an "Options" drop-down menu), or can be presented to the user as part of the Print dialog window and selected (or not) for each print job.

When such a printed page is later presented to the camera, the computer automatically detects the presence of the encoded data on the page, decodes same, consults the database to identify the file name/location/page corresponding to the 20-bit UID data, and opens the identified file to the correct page (e.g., after launching Excel). This application is one of many "paper as portal" applications of the Bedoop technology.

The foregoing are but two of myriad applications of the technology detailed herein. In the following discussion a great many other applications are disclosed. However, regardless of the length of the specification, it is possible only to begin to explore a few of the vast ramifications of this technology.

A few more details on the basic embodiments described above may be helpful before delving into other applications.

Optics

For any system to decode steganographically encoded data from an object, the image of the object must be adequately focused on the digital camera's CCD (or other, e.g., CMOS) sensor. In a low cost embodiment, the camera has a fixed nominal focal length, e.g., in the range of 2-24 inches (greater or lesser lengths can of course be used). Since the camera is continuously grabbing and analyzing frames of data, the user can move the object towards—or away—from the sensor until the decoder succeeds in decoding the steganographically encoded data and issues a confirming "Bedoop" audio signal.

In more elaborate embodiments, known auto-focusing technology can be employed.

In still other embodiments, the camera (or other sensor) can be equipped with one or more auxiliary fixed-focus lenses that can be selectively used, depending on the particular application. Some such embodiments have a first fixed focused lens that always overlies the sensor, with which one or more auxiliary lenses can be optically cascaded (e.g., by hinge or slide arrangements). Such arrangements are desirable, e.g., when a camera is not a dedicated Bedoop sensor but also performs other imaging tasks. When the camera is to be used for Bedoop, the auxiliary lens is positioned (e.g., flipped into) place, changing the focal length of the first lens (which may be unsuitably long for Bedoop purposes, such as infinity) to an appropriate Bedoop imaging range (such as one foot).

Other lens-switching embodiments do not employ a fixed lens that always overlies the sensor, but instead employ two or more lenses that can be moved into place over the sensor. By selecting different lenses, focal lengths such as infinity, six feet, and one foot can be selected.

In all such arrangements, it is desirable (but not essential) that the steganographically-encoded portion of the object being imaged fills a substantial part of the image frame. The object can be of various sizes, e.g., a 10 by 12 inch front panel of a cereal box, or a proof of purchase certificate that is just one inch square. To meet this requirement, small objects need to be placed closer to the camera than large objects. The optics of the system can be designed, e.g., by selection of suitable aperture sizing and auxiliary lighting (if needed), to properly image objects of various sizes within a range of focal distances.

Some embodiments avoid issues of focal distances and identifying the intended object by constraining the size of the object and/or its placement. An example is a business card reader that is designed for the sole task of imaging business cards. Various such devices are known.

Decoding/Encoding

The analysis of the image data can be accomplished in various known ways. Presently, most steganographic decoding relies on general purpose microprocessors that are programmed by suitable software instructions to perform the necessary analysis. Other arrangements, such as using dedicated hardware, reprogrammable gate arrays, or other techniques, can of course be used.

The steganographic decoding process may entail three steps. In the first, the object is located. In the second, the object's orientation is discerned. In the third, the Bedoop data is extracted from the image data corresponding to the Bedoop object.

The first step, object location, can be assisted by various clues. One is the placement of the object; typically the center of the image field will be a point on the object. The surrounding data can then be analyzed to try and discern the object's boundaries.

Another location technique is slight movement. Although the user will typically try to hold the object still, there will usually be some jitter of the Bedoop object within the image frame (e.g., a few pixels back and forth). Background visual clutter, in contrast, will typically be stationary. Such movement may thus be sensed and used to identify the Bedoop object from within the image data.

Still another object-location clue is object shape. Many Bedoop objects are rectangular in shape (or trapezoidal as viewed by the camera). Straight edge boundaries can thus be used to define an area of likely Bedoop data.

Color is a further object identification clue that may be useful in some contexts.

Yet another object location clue is spatial frequency. In imaging systems with well defined focal zones, undesired visual clutter may be at focal distances that results in blurring. The Bedoop object, in contrast, will be in focus and may be characterized by fine detail. Analyzing the image data for the high frequencies associated with fine detail can be used to distinguish the intended object from others.

Characteristic markings on the object (as discussed below in connection with determining object orientation) can also be sensed and used in locating the object.

Once the Bedoop object has been located within the image data, masking can be applied (if desired) to eliminate image data not corresponding to the intended object.

The next step in the decoding process, determining orientation of the Bedoop data, can likewise be discerned by reference to visual clues. For example, some objects include subliminal graticule data, or other calibration data, steganographically encoded with the Bedoop data to aid in determining orientation. Others can employ overt markings, either placed for that sole purpose (e.g. reference lines or fiducials), or serving another purpose as well (e.g. lines of text), to discern orientation. Edge-detection algorithms can also be employed to deduce the orientation of the object by reference to its edges.

Some embodiments filter the image data at some point in the process to aid in ultimate Bedoop data extraction. One use of such filtering is to mitigate image data artifacts due to the particular optical sensor. For example, CCD arrays have regularly-spaced sensors that sample the optical image at uniformly spaced discrete points. This discrete sampling effects a transformation of the image data, leading to certain image artifacts. An appropriately configured filter can reduce some of these artifacts.

(In some arrangements, the step of determining the orientation can be omitted. Business card readers, for example, produce data that is reliably free of artifacts and is of known scale. Or the encoding of the Bedoop data can be effected in such a way that renders it relatively immune to certain distortion mechanisms. For example, while the presently-preferred encoding arrangement operates on a 2D grid basis, with rows and columns of data points, the encoding can alternatively be done on another basis (e.g., a rotationally-symmetric form of encoding, so that rotational state of the image data can be ignored). In still other embodiments, the orientation-determining step can be omitted because the decoding can readily proceed without this information. For example decoding which relies on the Fourier-Mellin transform produces data in which scale and rotation can be ignored.)

Once the orientation of the object is discerned, the image data may be virtually re-registered, effectively mapping it to another perspective (e.g., onto a rectilinear image plane). This mapping can employ known image processing techniques to compensate, e.g., for rotation state, scale state, differential scale state, and X-Y offset, of the original Bedoop image data. The resulting frame of data may then be more readily processed to extract the steganographically-encoded Bedoop data.

In an exemplary embodiment, after the image data is remapped into rectilinear planar form, subliminal graticule data is sensed that identifies the locations within the image data where the binary data is encoded. Desirably, the binary data is redundantly encoded, e.g., in blocks of eight-by-eight patches. Each patch comprises one or more pixels. (The patches are typically square, and thus contain 1, 4, 9, or 16, etc. pixels.) The nominal luminance of each patch before encoding (e.g., artwork pre-existing on the object) is slightly increased or decreased to encode a binary "1", or "0." The change is slight enough to be generally imperceptible to human observers, yet statistically detectable from the image data—especially if several such blocks are available for analysis. Preferably, the degree of change is adapted to the character of the underlying image, with relatively greater changes being made in regions where the human eye is less likely to notice them. Each block thus encoded can convey plural bits of data (e.g., 16-128 bits). The encoding of such blocks in tiled fashion across the object permits the data to be conveyed in robust fashion.

Much of the time, of course, the Bedoop sensor is staring out and grabbing image frames that have no Bedoop data. Desirably, the detection process includes one or more checks to assure that Bedoop data is not wrongly discerned from non-Bedoop image data. Various techniques can be employed to validate the decoded data, e.g., error detecting codes can be included in the Bedoop payload and checked to confirm correspondence with the other Bedoop payload. Likewise, the system can confirm that the same Bedoop data is present in different tiled excerpts within the image data, etc.

Details of particular encoding and decoding techniques can be found in U.S. Pat. Nos. 5,862,260 and 6,614,914, the disclosures of which are incorporated by reference. As noted, the data can be encoded on a tiled basis, with each tile being 64 to 256 elements on a side. Each element can be 0.01 inches square. The Bedoop payload data can be redundantly represented by various error-tolerant coding techniques (e.g., convolutions coding, trellis coding, turbo codes, etc.) to fill the tiled block. Each bit is thus redundantly encoded, with a "1" being represented as an increase at certain pixels, and as a decrease at other pixels. The increases and decreases can be scaled in accordance with visual masking attributes of the image being encoded. The calibration signal can be summed with the tiled data signal and can comprise a signal tailored in the frequency domain to have 12-64 spectral impulses per quadrant, in a known pattern. During detection, the rotation or scaling of these impulses from their known frequency domain coordinates permits the rotation or scaling of the image to be discerned and compensated for.

Data Structures, Formats, Protocols, and Infrastructures

In an exemplary system, the Bedoop data payload is 64 bits. This payload is divided into three fields CLASS (12 bits), DNS (24 bits) and UID (24 bits). (Other payload lengths, fields, and divisions, are of course possible, as is the provision of error-checking or error-correcting bits.)

Briefly, the CLASS ID is the most rudimentary division of Bedoop data, and may be analogized, in the familiar internet taxonomy, to the limited number of top level domains (e.g., .com, .net, .org, .mil, .edu, .jp, .de, .uk, etc.). It is basically an indicator of object type. The DNS ID is an intermediate level of data, and may be analogized to internet server addresses (e.g., biz.yahoo, interactive.wsj, etc.) The UID is the finest level of granularity, and can roughly be analogized to internet pages on a particular server (e.g., edition/current/summaries/front.htm, daily/home/default.hts, etc.).

Generally speaking, the CLASS ID and DNS ID, collectively, indicate to the system what sort of Bedoop data is on the object. In the case of Bedoop systems that rely on remote servers, the CLASS and DNS IDs are used in identifying the server computer that will respond to the Bedoop data. The UID determines precisely what response should be provided.

In the case of a refrigerator Bedoop system, what happens if an object with an unfamiliar CLASS/DNS ID data is encountered? The system can be programmed not to respond at all, or to respond with a raspberry-like sound (or other feedback) indicating, "I see a Bedoop object but don't know what to do with it."

Most systems will be able to respond to several classes of Bedoop objects. Simple software-based systems can compare the CLASS/DNS ID (and optionally the UID) to fixed values, and can branch program execution to corresponding subroutines. Likewise, hardware-based systems can activate different circuitry depending on the detected CLASS/DNS ID.

In the case of a computer equipped with a Bedoop input device (e.g., a Sony VAIO PictureBook laptop with built-in camera, or a desktop personal computer with a tethered camera), the operating system's registry database can be employed to associate different application programs with different CLASS/DNS IDs (just as the .XLS and .DOC file extensions are commonly associated by existing operating system registries to invoke Microsoft Excel and Word software applications, respectively). When a new Bedoop application is installed, it logs an entry in the registry database indicating the CLASS/DNS ID(s) that it will handle. Thereafter, when an object with such a CLASS/DNS ID is encountered, the operating system automatically launches the corresponding application to service the Bedoop data in an appropriate manner.

Sometimes the computer system may encounter a Bedoop object for which it does not have a registered application program. In such case, a default Bedoop application can be invoked. This default application can, e.g., establish an internet link to a remote server computer (or a network of such computers), and can transmit the Bedoop data (or a part of the Bedoop data) to that remote computer. The remote server can undertake the response itself, it can instruct the originating computer how to respond appropriately, or it can undertake some combination of these two responses. (Such arrangements are further considered below.)

Figure 12:
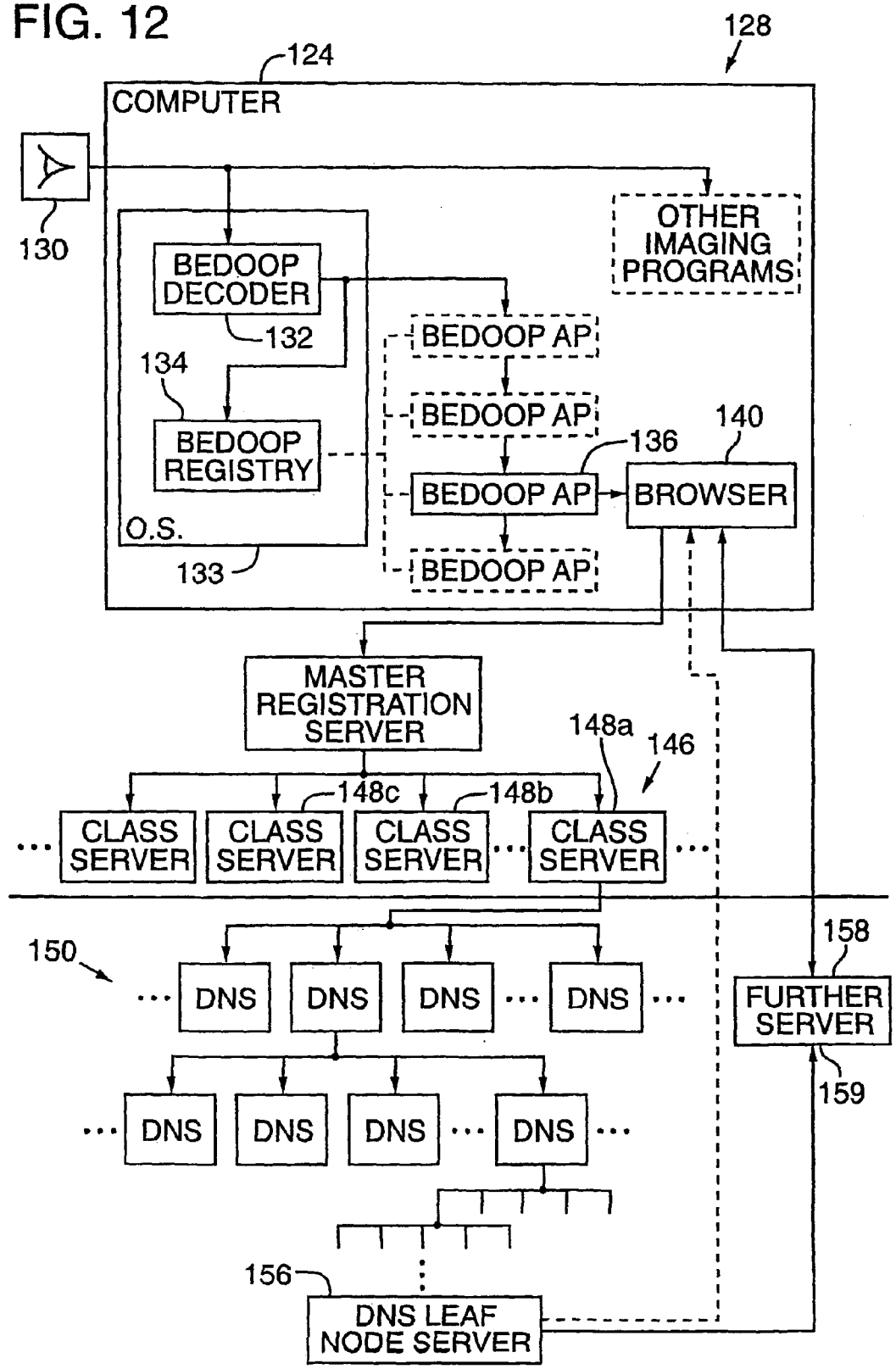
FIG. 12 is a block diagram showing another embodiment of the present technology.

FIG. 12 shows an illustrative architecture employing the foregoing arrangement.

At a local Bedoop system 128 (which may be implemented, for example, using a conventional personal computer 129), a camera, scanner, or other optical sensor 130 provides image data to a decoder 132 (which may be implemented as a software component of the operating system 133). The decoder 132 analyzes the image data to discern the plural-bit Bedoop data. The CLASS ID of this Bedoop data is applied to a Bedoop registry 134. The registry responds by identifying and launching a local Bedoop application 136 designed to service the discerned Bedoop data.

Sometimes the system 128 may encounter a Bedoop object for which several different responses may be appropriate. In the case of a printed office document, for example, one response may be as described above—to present the electronic version of the file on a computer, ready for editing. But other responses may also be desired, such as writing an email message to the author of the printed document, with the author's email address already specified in the message address field, etc.

Such different responses may be handled by different Bedoop applications, or may be options that are both provided by a single Bedoop application. In the former case, when the CLASS/DNS IDs are decoded and provided to the operating system, the registry indicates that there are two (or more) programs that might be invoked. The operating system can then present a dialog box to the user inviting the user to specify which form of response is desired. Optionally, a default choice can be made if the user doesn't specify within a brief period (e.g., three seconds). The operating system can then launch the Bedoop application corresponding to the chosen response.

A similar arrangement can be employed if a single Bedoop application can provide both responses. In such case the operating system launches the single Bedoop application (since there is no ambiguity to be resolved), and the application presents the choice to the user. Again, the user can select, or a default choice can be automatically made.

In the just-described situations, the user can effect the choice by using the keyboard or mouse—as with traditional dialog boxes. But Bedoop provides another, usually easier, form of interaction. The user can make the selection through the optical sensor input. For example, moving the object to the right can cause a UI button on the right side of the dialog box to be selected; moving the object to the left can cause a UI button on the left side of the dialog box to be selected; moving the object towards the camera can cause the selected button to be activated. Many other such techniques are possible, as discussed below.

If the registry 134 does not recognize, or otherwise does not know how to respond to Bedoop data of that particular CLASS/DNS, the registry launches a default Bedoop client application. This client application, in turn, directs a web browser 40 on the local Bedoop system 128 to communicate with a remote master registration server computer 42. The local computer forwards the Bedoop data to this master server. The master server 42 examines the CLASS ID, and forwards the Bedoop data (directly, or through intervening servers) to a corresponding CLASS server 44. (A single server may handle Bedoop data of several classes, but more typically there is a dedicated server for each CLASS.)

Each CLASS server 44 serves as the root of a tree 46 of distributed DNS servers. A DNS server 48a, for example, in a first tier 50 of the DNS server tree, may handle Bedoop data having DNS IDs beginning with "000." Likewise, DNS server 48b may handle Bedoop data having DNS IDs beginning with "001," etc., etc.

Each DNS server in the first tier 50 may, in turn, route Bedoop data to one of 8 servers in a second tier of the tree, in accordance with the fourth-through sixth bits of the DNS data. The tree continues in this fashion until a terminal level of DNS leaf node servers 56.

Ultimately, Bedoop data routed into this network reaches a DNS leaf node server 56. That leaf node server may handle the Bedoop data, or may redirect the local Bedoop system to a further server 58 that does so. That ultimate server—whether a DNS leaf node server or a further server—can query the local Bedoop system for further information, if necessary, and can either instruct the local Bedoop system how to respond, or can undertake some or all of the response itself and simply relay appropriate data back to the local Bedoop system.

In arrangements in which the local Bedoop system is redirected, by the DNS leaf node server, to a further server that actually handles the response, access to the further server may be through a port 59 (e.g., a special URL) tailored to receipt of Bedoop data.

In a typical implementation, most or all of the servers are mirrored, or otherwise replicated/redundant, so that failure of individual computers does not impair operation of the system.

Caching can be provided throughout the trees of servers to speed responses. That is, responses by leaf nodes for certain commonly-encountered CLASS/DNS IDs can be temporarily stored earlier in the tree(s). Bedoop data, propagating through the server network, can prompt a response from an intermediate server if there is a cache hit.

If desired, Bedoop traffic through the above-detailed server trees can be monitored to collect demographic and statistical information as to what systems are sending what Bedoop data, etc. One use of such information is to dynamically reconfigure the DNS network to better balance server loads, to virtually relocate DNS resources nearer regions of heavy usage, etc. Another use of such information is for marketing purposes, e.g., to promote certain Bedoop features and applications within user groups (e.g., internet domains) that seem to under-utilize those features.

Within certain user networks that are linked to the internet, e.g., corporate networks, Bedoop data that isn't handled within the originating Bedoop system may first be routed to a Bedoop name server within the corporate network. That server will recognize certain types of Bedoop data, and know of resources within the corporate network suitable for handling same. Referral to such resources within the corporate network will be made, where possible. These resources (e.g., corporate servers) may respond to Bedoop data in a way customized to the corporate preferences. If the corporate Bedoop name server does not know of a resource within the corporate network that can respond to the Bedoop data, the corporate name server then routes the data to the public Bedoop network described above. (Such referral can be to the master registration server or, to the extent the corporate name server knows the addresses of appropriate servers within the DNS server tree, or of the further servers to which DNS servers may point for certain Bedoop data, it can redirect the local Bedoop system accordingly.)

In typical rich Bedoop implementations, local systems may have libraries of Bedoop services, applications, or protocols. Some may be unique to that computer. Others may be commonly available on all computers. Some may be highly secure, employing encryption and/or anti-hacking measures, or data protocols that are not generally recognized. Others may be shareware, or the result of open-source programming efforts.

While the just-described arrangements used a 12/24/24 bit protocol for CLASS/DNS/UID data, other arrangements can of course be used. In some applications it is advantageous for the protocol to more nearly match those commonly used for internet communications. For example, IP addresses for internet Domain Name Servers (DNS) are presently 32 bits, with extension to 64 or 128 bits foreseen in the near future. The DNS field in Bedoop systems can follow the internet standard.

Greeting Cards, Birthday Cards, Etc.

To further illustrate some of the basic principles associated with this technology, consider greeting cards and the like that are encoded (e.g., by texturing, printing, etc.) with Bedoop data. On receiving such a card, a recipient holds it in front of the image capture device on a laptop or other computer. The computer responds by displaying an internet web page that has a stock- or customized-presentation (image, video, audio-video, etc.) to complement that presented on the greeting card.

The web site presentation can be personalized by the sender (e.g., with a text message, recent family photographs, etc.), either at the point of card sale, or sometime after the card is purchased. In the latter case, for example, the card can be serialized. After taking the card home, the purchaser can visit the card vendor's web site and enter the card serial number in an appropriate user interface. The purchaser is then presented with a variety of simple editing tools to facilitate customization of the web greeting. When the sender is finished designing the web greeting, the finished web page data is stored (by software at the vendor's web site) at a site corresponding to the serial number.

When the card is received by a recipient and held in front of a Bedoop sensor, CLASS, DNS, and UID data is decoded from the card. The CLASS and DNS data are used to navigate the earlier-described server network to reach a corresponding DNS leaf node server (perhaps maintained by the Hallmark greeting card company). That leaf node server indexes a table, database, or other data structure with the UID from the Bedoop data, and obtains from that data structure the address of an ultimate web site—the same address at which the web greeting customized by the sender was stored. That address is provided by the DNS leaf node server back to the local computer, with instructions that the web page at that address be loaded and displayed (e.g., by HTML redirection). The local computer complies, presenting the customized web greeting to the card recipient.

In the just-described embodiment, in which a pre-encoded card is purchased by a sender and the web-display is then customized, the address of the web site is typically determined by the card vendor. But this need not be the case. Likewise, the card need not be "purchased" in the typical, card-shop fashion.

To illustrate the foregoing alternatives, consider the on-line acquisition of a greeting card, e.g., by visiting a web site specializing in greeting cards. With suitable user-selection (and, optionally, customization), the desired card can be printed using an ink-jet or other printer at the sender's home. In such case, the Bedoop data on the card can be similarly customized. Instead of leading to a site determined by the card vendor, the data can lead to the sender's personal web page, or to another arbitrary web address.

To effect such an arrangement, the sender must arrange for a DNS leaf node server to respond to a particular set of Bedoop data by pointing to the desired web page. While individuals typically will not own DNS servers, internet service providers commonly will. Just as AOL provides simple tools permitting its subscribers to manage their own modest web pages, internet service providers can likewise provide simple tools permitting subscribers to make use of DNS leaf node servers. Each subscriber may be assigned up to 20 UIDs. The tools would permit the users to define a corresponding web address for each UID. Whenever a Bedoop application led to that DNS leaf node server, and presented one of those UIDs, the server would instruct the originating computer to load and present the web page at the corresponding web address.

Prior to customizing the greeting card, the sender uses the tool provided by the internet service provider to store the address of a desired destination web address in correspondence with one of the sender's available UIDs. When customizing the greeting card, the sender specifies the Bedoop data that is to be encoded, including the just-referenced UID. The greeting card application encodes this data into the artwork and prints the resulting card. When this card is later presented to a Bedoop system by the recipient, the recipient's system loads and displays the web page specified by the sender.

Commerce in Bedoop Resources

In the just-described arrangement, internet service providers make available to each subscriber a limited number of UIDs on a DNS server maintained by the service. Business enterprises typically need greater Bedoop resources, such as their own DNS IDs (or even their own CLASS ID(s).

While variants of the Bedoop system are extensible to provide an essentially unlimited number of CLASS IDs and DNS IDs, in the illustrated system these resources are limited. Public service, non-profit, and academic applications should have relatively generous access to Bedoop resources, either without charge or for only a modest charge. Business enterprises, in contrast, would be expected to pay fees to moderate their potentially insatiable demand for the resources. Small businesses could lease blocks of UIDs under a given CLASS/DNS ID. Larger businesses could acquire rights to entire DNS IDs, or to entire CLASS IDs (at commensurately greater fees).

Web-based systems for assigning DNS IDs (and CLASS IDs) can be modeled after those successfully used by Internic.com, and now Networksolutions.com, for registration of internet domains. The user fills out a web-based form with names, addresses, and billing information; the system makes the necessary changes to all of the hidden system infrastructure—updating databases, routing tables, etc., in servers around the world.

Controlled-Access ID

Just as the above-described embodiment employed an ink-jet printer to produce a customized-Bedoop greeting card, the same principles can likewise be applied to access-control objects, such as photo-IDs.

Consider an employment candidate who will be interviewing at a new employer. The candidate's visit is expected, but she is not recognized by the building's security personnel. In this, and many other applications, arrangements like the following can be used:

The employer e-mails or otherwise sends the candidate an access code. (The code can be encrypted for transmission.) The code is valid only for a certain time period on a given date (e.g., 9:00 a.m.-11:00 a.m. on Jun. 28, 1999).

Upon receipt of the access code, the candidate downloads from the web site of the state Department of Motor Vehicles the latest copy of her driver's license photo. The DMV has already encoded this photo with Bedoop data. This data leads to a state-run DNS leaf node server 56. When that server is presented with a UID decoded from a photograph, the server accesses a database and returns to the inquiring computer a text string indicating the name of the person depicted by the photograph.

The candidate incorporates this photo into an access badge. Using a software application (which may be provided especially for such purposes, e.g., as part of an office productivity suite such as Microsoft Office), the photo is dragged into an access badge template. The access code emailed from the employer is also provided to this application. On selecting "Print," an ink-jet printer associated with the candidate's computer prints out an access badge that includes her DMV photo and her name, and is also steganographically encoded in accordance with the employer-provided access code.

The name printed on the badge is obtained (by the candidate's computer) from the DMV's DNS server, in response to Bedoop data extracted from the photograph. (In this application, unlike most, the photograph is not scanned as part of a Bedoop process. Instead, the photograph is already available in digital form, so the Bedoop decoding proceeds directly from the digital representation.)

For security purposes, the access code is not embedded using standard Bedoop techniques. Instead, a non-standard format (typically steganographic) is employed. The embedding of this access code can span the entire face of the card, or can be limited to certain regions (e.g., excluding the region occupied by the photograph).

On the appointed day the candidate presents herself at the employer's building. At the exterior door lock, the candidate presents the badge to an optical sensor device, which reads the embedded building access code, checks it for authenticity and, if the candidate arrived within the permitted hours, unlocks the door.

Inside the building the candidate may encounter a security guard. Seeing an unfamiliar person, the guard may visually compare the photo on the badge with the candidate's face. Additionally, the guard can present the badge to a portable Bedoop device, or to one of many Bedoop systems scattered through the building (e.g., at every telephone). The Bedoop system extracts the Bedoop data from the card (i.e., from the DMV photograph), interrogates the DMV's DNS server with this Bedoop data, and receives in reply the name of the person depicted in the photograph. (If the Bedoop system is a telephone, the name may be displayed on a small LCD display commonly provided on telephones.)

The guard checks the name returned by the Bedoop system with the name printed on the badge. On seeing that the printed and Bedoop-decoded names match (and optionally checking the door log to see that a person of that name was authorized to enter and did so), the security guard can let the candidate pass.

It will be recognized that the just-described arrangement offers very high security, yet this security is achieved without the candidate ever previously visiting the employer, without the employer knowing what the candidate looks like, and by use of an access badge produced by the candidate herself.

Variants of such home-printed badge embodiments find numerous applications. Consider purchasing movie- or event-tickets over the web. The user can print an access ticket that has an entry code embedded therein. On arriving at the theater or event, the user presents the ticket to an optical scanning device, which decodes the entry code, checks the validity of same, authorizes the entry, and marks that entry code as having been used (preventing multiple uses of tickets printed with the same code).

Another Controlled Access ID

A great variety of access control systems can be implemented using the present technology. The foregoing is just one example.

Another application employs an ID card, Bedoop technology, and proximity detection technology (commonly known as RFID).

The ID card can be a badge or the like having a steganographically-encoded photograph of the bearer. The card further includes a proximity ID device, such as an unpowered electronic circuit that is excited and detected by a radiant field from an associated proximity detector, providing a unique signature signal identifying a particular individual.

The building can be provided with an image sensor (such as a video camera or the like), an associated Bedoop detection system, and the proximity detector. When a user wearing the badge approaches, the proximity detector signals the camera to capture image data. The Bedoop detection system identifies the badge photograph (e.g., by clues as are described in the prior applications, or without such aids), captures optical data, and decodes same to extract the steganographically-embedded data hidden therein. The access control system then checks whether the badge ID discerned from the proximity sensor properly corresponds to the Bedoop data extracted from the photograph on the badge. If so, access is granted; if not, the data is logged and an alarm is sounded.

By such arrangement, premises security is increased. No longer can proximity-based access badges be altered to substitute the picture of a different individual. If the photo is swapped, the proximity system ID and the embedded photo data will not match, flagging an unauthorized attempted access.

The same principles are applicable in many other contexts—not limited to RF-based proximity detection systems. For example, the data decoded from the photograph can be compared against other forms of machine-sensed personal identification associated with the badge. These include, but are not limited to, bar code IDs, mag-stripe ID cards, smart cards, etc. Or the comparison can be with an identification metric not associated with the badge (e.g., retinal scan, voice print, or other biometric data).

Ink-Jet Printing

In the foregoing discussions, reference has been made to use of ink-jet printing as a means for providing steganographically encoded indicia on substrates. The following discussion expands on some of the operative principles.

The basic physics and very low level analog electronic operation of ink-jet printers (sometimes termed bubble-jet printers) are ideally suited to support very-light-tint background digital watermarking on any form of substrate. (Watermarking through apparent "tinting" of substrates is discussed in U.S. Pat. No. 6,345,104.) In general, the statement, "if you can print it with an ink jet printer, you can watermark it" is largely accurate, even for (perhaps especially for) simple text documents. Indeed, there is a degree of flexibility and control in the ink-jet printing realm that is not as generally available in more traditional printing technologies, such as commercial offset printing and other plate-based technologies. (This is not to say that ink-jet has better quality than plate-based technologies; it has more to do with the statistics of ink droplets than anything else.) Heavier tint backgrounds are possible as well, where the continuum ranges from very light background tinting, where the casual observer will see "white paper," all the way through heavily inked patterned backgrounds, and photographs themselves, and everything in between.

In some embodiments, the ink-jet driver software is modified to provide lower-level control of individual droplet emission than is provided in existing printer drivers, which are naturally optimized for text and graphics. In some such embodiments, the "watermarking" print mode is another option from which the user can select (e.g., in addition to High Quality, Econo-Fast, etc.), or the selection can be made automatically by application software that is printing watermarked data.

In more sophisticated embodiments, the watermark data is applied to the printer driver software independently of the other image/text data. The printer driver is arranged to eject droplets in the usual print density for the image/text data, and at a more accurately-controlled, finer density for the separately-applied watermark data. (The latter may be effected as a slight modulation signal on the former.) This arrangement provides for essentially transparent integration into existing printer environments—no one need worry about the watermarking capability except the software applications that specifically make use of same.

Consumer Marking of Web-Based Materials

Various items of printed media can originate off the web, yet be printed at home. Examples include movie tickets, coupons, car brochures, etc. Bedoop data can be added, or modified, by the software application or by the printer driver at the time of printing. (Alternatively, the Bedoop data can be customized to correspond to the user before being downloaded to the user's system for printing.)

One advantage to Bedoop-encoding printed images locally, as opposed to Bedoop-encoding the image files prior to downloading for local printing, is that the encoding can be tailored in accordance with the particular properties of the local printer (e.g., to increase robustness or decrease visibility)—properties not generally known to a remote server.

In one particular example, the UID field in the Bedoop data can be written with a value that serves as an index to a database of user profiles, permitting later systems to which the printed item is presented to personalize their response in accordance with the profile data.

In another example, the UID field serves an authentication purpose, e.g., to verify that the printed medium actually was printed at a particular place, or by a particular user or at a particular time.

Coffee Mug

At retail coffee outlets, customers commonly order the same drink day after day ("half-decaf, short, skinny latte"). Some customers present personal coffee mugs to the cashier, preferring the sensation of ceramic or metal to paper, and avoiding the trash/recycle dilemma.

The drinker's "regular" order can be Bedoop-encoded either on the mug itself or, more commonly, on an adhesive label applied to the mug. The encoding can be in addition to other aesthetic imagery (e.g., artwork or a photo), or the marking can be purely data. Labels the size of postage stamps may be used.

On handing the mug to the cashier, the customer can simply say "the regular." The cashier passes the mug in front of the optical scanning device of a Bedoop system associated with the cash register. The system steganographically decodes the data and provides the corresponding order ("half-decaf, short, skinny latte"), either textually or audibly (e.g., by a voice synthesizer) to the cashier or the barrista. The cash register system also knows the current price of the requested drink, and rings up the charge accordingly.

Labels of the type described can be available to the cashier on pre-printed rolls, just as with other adhesive stickers, or can be printed on-demand. (Small label printers may be best suited in the latter case, given space constraints in retail outlets.) Customers ordering drinks for personal mugs may be invited to take a label corresponding to their just-ordered drink and apply it to their mug for future use.

In variants on this basic theme, the mug label can be further encoded (or a supplemental label can be provided and encoded) with electronic payment information, such as the customer's credit card number, or the number of a debit account maintained by the coffee merchant for that customer. When the mug is scanned for the drink order, the system likewise detects the payment information and charges the corresponding fee to the appropriate account. (For security reasons, the system may be arranged so that the mug cannot be used to authorize more than, say $5 of coffee drink purchases per day.)

In another variant on this theme, the system maintains an electronic log of coffee purchases made by the customer and, in accordance with then-prevailing marketing considerations, rewards the customer with a free drink after 8 or 12, etc., drinks have been purchased.

In still another variant on this theme, regular customers who use Bedoop-labeled mugs can participate in periodic promotions in which, for example, every $N^{th}$ such customer is rewarded with a cash or merchandise prize. Bells go off when the $N^{th}$ mug is scanned. (N can be a fixed number, such as 500, or can be a random number—typically within a known range or with a known mean.)

Warping and Focus Issues

The coffee cup is an example of a non-planar object. Another is soft drink cans. Special issues can arise when encoding and decoding markings on such objects. For example, when sensing such an object with a camera or the like, part of the image will be out of focus due to differing distances from the camera to different parts of the can surface.

While parts of an image sensed from a non-planar object, such as a can, may be out of focus, they still convey useful image data. The out of focus areas are just blurred—as if filtered by a low pass filter. But to make use of this information, a further complication must first be addressed: warping.

When viewed from a camera, the planar artwork with which the can is wrapped becomes warped. Portions of the can nearest the camera appear at a nominal full scale, while areas successively further around the can curvature (as viewed from the camera) appear progressively more and more spatially compressed. Regardless of the watermarking technology being employed, the physical warp of the can's surface is likewise manifested as a warping of the encoded watermark data.

One way of handling this issue is to pre-warp the watermark pattern to account for this optical distortion.

In watermarking techniques that operate directly on luminance values, the grid by which the watermark is applied can be pre-distorted to counteract the subsequent optical distortion of the artwork as it is perceived on the cylindrical can. Consider a Pepsi or Coke can. A virtual center line may pass through the center of the logo artwork (the "front" of the can), and serves as a center line of one of the watermark gridded tiles. On either side of this center line the grid is successively stretched. This stretching is computed so that, when viewed by a camera, the watermark grid has the appearance of being uniformly rectilinear, instead of being successively compressed towards the apparent edge of the can, as would otherwise be the case.

Figure 17:
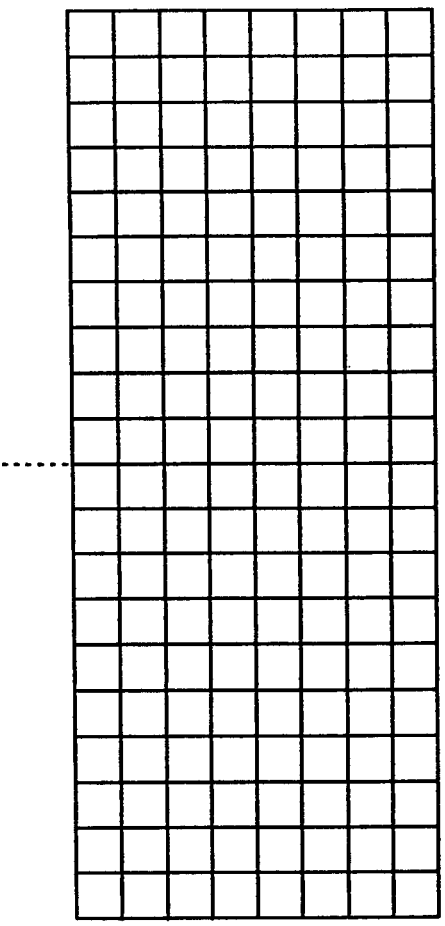
FIG. 17 shows a watermark grid.
Figure 18:
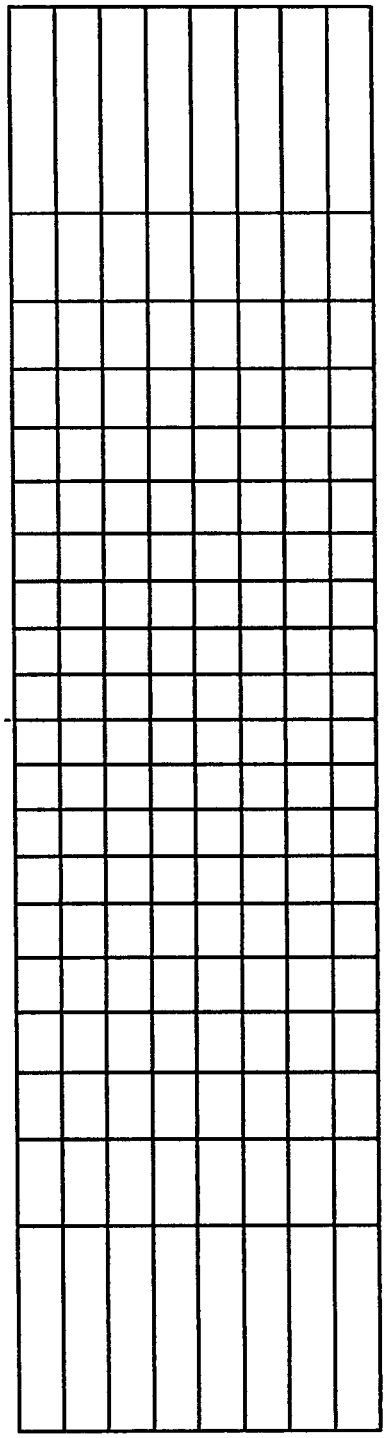
FIG. 18 shows a pre-warped watermark grid.

An illustration of such an approach is shown in the Figures. FIG. 17 shows an unwarped grid—as would commonly be used in watermarking planar objects. FIG. 18 shows the same grid—prewarped to account for optical distortion due to can curvature. The artwork (e.g., label) center-line is shown by the dotted lines.

More typically the grid is square rather than rectangular. Moreover, the illustrated distortion contemplates that the depicted grid spans +/−90 degrees from the can front. Also, the grid is typically smaller (e.g., one inch on a side), so several grids are tiled adjacent each other in a span of +/−90 degrees.) Still further, the illustrated pre-warping is based on an infinite projection (i.e., the can surface as viewed from a distance of infinity—encompassing a full +/−90 degrees from the center line). More typically, the warp would be computed based on a finite projection—using a typical lens-to-object distance (e.g., 2-24 inches), resulting in a view that encompasses less than a full +/−90 degree range from the center line.

Figure 19:
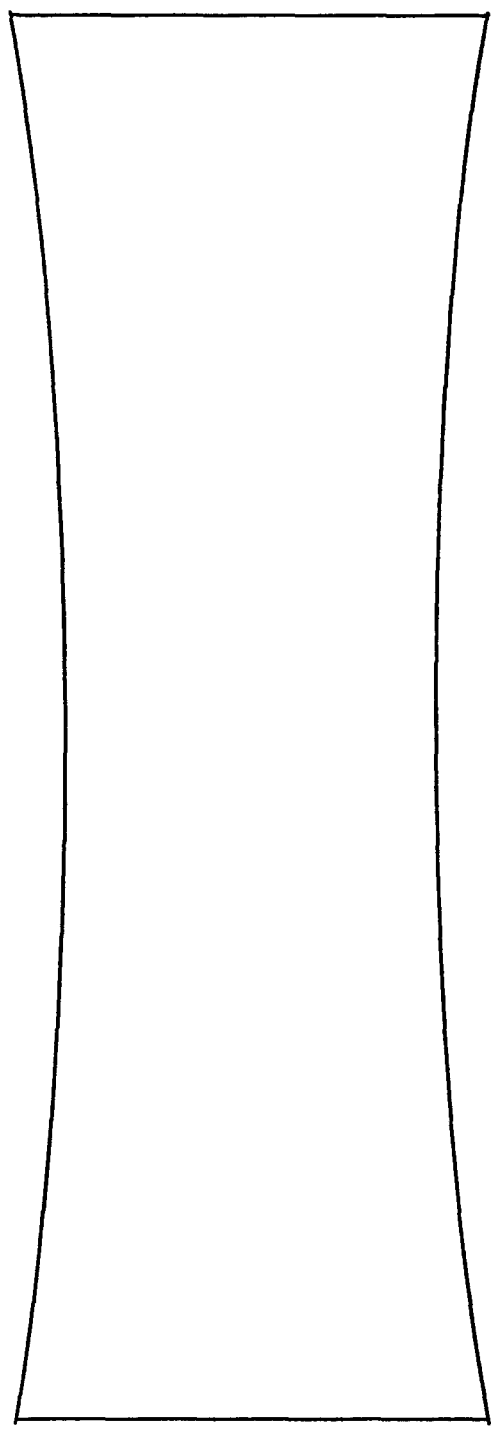
FIG. 19 shows another pre-warped watermark grid.

The illustrated grid is pre-warped only in the horizontal direction, and only in accordance with a curvature-induced geometrical distortion. Another apparent geometrical distortion is also present—one due to different parts of the can being further from the camera. The further away, the smaller the appearance. Accordingly, grid elements expected to be positioned further from the camera should be made commensurately larger in order to pre-compensate for this distance-induced geometrical distortion. Such distance-induced geometrical distortion is manifested equally in the horizontal and vertical directions. Thus, a more accurate pre-warp would also progressively swell the grid cells both in vertical and horizontal dimensions at progressive displacements from the center line, so as to counter-act the further-looks-smaller effect. FIG. 19 shows the basic nature of such a pre-warp.

The degree of this latter pre-warping will be heavily dependent on the distance from the camera lens to the front of the can. If the distance is on the order of two inches, the further-looks-smaller effect will be much more pronounced than if the distance is a foot or more. In the latter case, the distance to the most remote portion of the imaged object may be 110% the distance to the closest portion, whereas in the former case, the ratio may be more on the order of 200%.

The illustrated pre-warping is exemplary of that which may be applied when the watermark is applied in the pixel domain using a grid pattern. It is geometrical pre-warping—i.e., in the spatial domain. Other watermarking approaches would naturally require pre-warping of other sorts, corresponding to the anticipated warping of the watermark data representation. For example, watermarking techniques that rely on changing image coefficients in transformed domains would require different adjustments. Conceptually these adjustments are the same (i.e., resulting in an apparent image having the intended watermark information), but the manifestation is not susceptible to illustration like that given in FIGS. 17 and 18 (i.e., since transform coefficients are being changed—rather than grid layout, warping in a transform domain—rather than in a spatial domain, would be required).

Although the foregoing description focused on pre-warping the image, the problem can be handled otherwise. If a rectilinear watermark—not pre-warped—is applied to a cylindrical can, the watermark detector can apply an unwarping operation to counteract the applicable distortion. That is, the detector can virtually remap the raw pixel data to effectively stretch the pixels away from the center line to restore them to their proper rectilinear relationship.

In one embodiment, the sensed image data is first trial-decoded without unwarping—assuming the imaged subject is planar. If no watermark is detected, the same data (or a subsequent frame of image data) is trial-unwarped to see if perhaps the data so yields a readable watermark. Several successive unwarpings of different characters may be tried. In some embodiments, a detector may continuously cycle through several different unwarping functions (including no unwarping) to try and happen on an unwarping function that permits a watermark be discerned from the image data.

If the application permits, the user may specify the shape of the object so that a single, or limited range, of unwarping functions is applied. Or the user can simply provide a gross cue to the detector (e.g., by selecting between "magazines" or "grocery products' on a user interface associated with the watermark detector). In the former case, the medium is known to be flexible and may assume random simple curvatures other than planar. In such case the detector may spend most of its time trying to decode the watermark assuming the imaged page is planar, and occasionally try applying one of four or eight different unwarping functions as would be appropriate if the magazine page were slightly drooping in different directions. In the latter case, grocery products are generally fairly unflexible and thus have relatively predictable shapes—most commonly planar or cylindrical. In such case the detector may spend half its time trying to decode assuming the object is planar, and spend the other half of its time cycling among a variety of cylindrical unwarping functions.

While the foregoing discussion particularly addressed image watermarking, counterparts of these principles are likewise applicable to audio watermarking.

Smart Elevators

In accordance with another embodiment, a building elevator is provided with one or more optical capture devices. Each device examines monitors the contents of the elevator chamber, looking for Bedoop encoded objects, such as ID badges.

On sensing a Bedoop-encoded object, the elevator can determine—among other data—the floor on which the wearer's office is located. The system can then automatically direct the elevator to that floor, without the need for the person to operate any buttons. (The elevator's button panel can be provided with a new, override button that can be operated to un-select the most recently selected floor(s), e.g., in case a user wants to travel to a different floor.)

To aid in identification, the Bedoop objects (e.g., badges) can be colored a distinctive color, permitting the system to more easily identify candidate objects from other items within the optical capture devices' field of view. Or the object can be provided with a retro-reflective coating, and the elevator can be equipped with one or more illumination sources of known spectral or temporal quality (e.g., constant infra red, or constant illumination with a single- or multi-line spectrum, or a pulsed light source of known periodicity; LEDs or semiconductor lasers, each with an associated diffuser, can be used for each the foregoing and can be paired with the image capture devices). Other such tell-tale clues can likewise be used to aid in object location. In all such cases, the optical capture device can sense the tell-tale clue(s) using a wide field of view sensor. The device can then be physically or electronically steered, and/or zoomed, to acquire a higher resolution image of the digitally-encoded object suitable for decoding.

Magazines

Magazine (and newspaper) pages can be steganographically encoded with Bedoop data to provide another "paper as portal" experience. As with the earlier-described office document case, the encoded data yields an address to a computer location (e.g., a web page) having the same, or related, content.

In one exemplary embodiment, the blank magazine page stock is Bedoop-encoded prior to printing. The watermarking can be performed by high speed ink-jet devices, which splatter a fine pattern of essentially imperceptible ink droplets across each page. Each page can be differently watermarked so that, on decoding, page 21 of a magazine can be distinguished from page 22 of the same magazine (and page 106 of the Jun. 21, 1999, issue can be distinguished from page 106 of the Jun. 28, 1999, issue). If desired, each page can be further segregated into regions—either in accordance with the actual boundaries of articles that will later be printed on the pages, or in a grid pattern, e.g., of 3 columns across by 5 rows high. Each region conveys a distinct Bedoop code, permitting different portions of the page to lead to different web data.)

After watermarking and printing, the pages thus produced are bound in the usual fashion with others to form the finished magazine. (Not all pages in the magazine need to be watermarked.)

Of course, the watermarking can be effected by processes other than ink-jet printing. For example, texturing by pressure rollers is another option well suited for the large volumes of paper to be processed. Or the artwork presented in the advertisement can be digitally watermarked using commercial watermarking software (as is available, e.g., with Adobe Photoshop and Corel image editing products).

On presenting a magazine to the optical scanner device of a Bedoop-compliant computer, the computer senses the Bedoop data, decodes same, and launches a web browser to an internet address corresponding to the Bedoop data. If the magazine page is an advertisement, the internet address can provide information complementary to the advertisement. For example, if the magazine page is an advertisement for a grocery item, the Bedoop data can identify a web page on which recipes that make use of the advertised item are presented. If the magazine page includes a photo of a tropical beach, the Bedoop data can lead to a travel web page (e.g., hosted by Expedia or other travel enterprise) that presents fare and lodging information useful to a reader who wants to vacation at the illustrated beach. (The fare information can be customized to the reader's home airport by reference to user profile data stored on the user's computer and relayed to the web site to permit customization of the displayed page.)

The data to which the Bedoop data leads needn't be static; it can be updated on a weekly, daily, or other basis. Thus, if a months-old magazine page is presented to a Bedoop device, the resultant data can be up-to-the-minute. The linked data can include audio and/or video presentations.

In the case of advertising, the inclusion of Bedoop data increases the value of the ad to the advertiser, and so merits a higher charge to the advertiser from the magazine publisher. This higher charge may be shared with the enterprise(s) that provides the Bedoop technology and infrastructure through which the higher value is achieved.

Business Card Applications

Conventional business cards can be steganographically encoded with Bedoop data, e.g., by texturing, watermark tinting, ink-jet splattering, text steganography, etc. As with many of the earlier-described embodiments, the steganographic encoding is tailored to facilitate decoding in the presence of arbitrary rotation or scale distortion of the card introduced during scanning. (Some such techniques are shown, e.g., in applicant's earlier patents and publications identified above. Various other techniques are known to artisans.)

When a recipient of a business card holds it in front of a Bedoop sensor, the operating system on the local system launches a local Bedoop application. That local Bedoop application, in turn, establishes an external internet connection to a remote business card server. The address of that server may already be known to the local Bedoop application (e.g., having been stored from previous use), or the local Bedoop system can traverse the above-described public network of DNS servers to reach the business card server.

A database on the business card name server maintains a large collection of business card data, one database record per UID. When that server receives Bedoop data from a local Bedoop system, it parses out the UID and accesses the corresponding database record. This record typically includes more information than is commonly printed on conventional business cards. Sample fields from the record may include, for example, name, title, office phone, office fax, home phone, home fax, cellular phone, email address, company name, corporate web page address, personal web page address, secretary's name, spouse's name, and birthday. This record is transmitted back to the originating Bedoop system.

The local Bedoop system now has the data, but needs further instruction from the user as to how it should be processed. Should a telephone number be dialed? Should the information be entered into a personal contact manager database (e.g., Outlook) on the local system? Etc.

In an exemplary embodiment, the local system presents the available choices to the user, e.g., by textual prompts, synthesized voice, etc. The user responds by manipulating the business card in a manner prompted by the system (e.g., move down to telephone office; move up to telephone at home; move right to access corporate web page; move left to access personal web page; rotate left to enter certain elements from the database record (filtered in accordance with a template) into personal contact manager database, etc. The local Bedoop system responds accordingly.

Some card givers may choose to make additional information available to card recipients—information beyond that known in prior art contact-management software applications. For example, one of the choices presented by a local Bedoop system in response to presentation of a business card may be to review the card-giver's personal calendar. (The card-giver can maintain his or her personal calendar on a web-accessible computer.) By such arrangement, the card-recipient can learn when the card-giver may be found in the office, when appointments might be scheduled, etc., etc.

Typically, access to this web-calendar is not available to casual web browsers, but is accessible only in response to Bedoop data (which may thus be regarded as a form of authentication or password data).

Some users may carry several differently-encoded cards, each with a different level of access authorization (e.g., with different UIDs). Thus, some cards may access a biographical page without any calendar information, other cards may access the same or different page with access enabled to today's calendar, or this week's calendar, only, and still other cards (e.g., the "spouse" card) may access the same or different page with access enabled for the card-giver's complete calendar. The user can distribute these different cards to different persons in accordance with the amount of personal information desired to be shared with each.

In accordance with a related embodiment, the database record corresponding to Bedoop business card data can include a "now" telephone number field. This field can be continually-updated throughout the day with the then-most-suitable communications channel to the card-giver. When the card-giver leaves home to go to the office, or leaves the office for a trip in the car, or works a week at a corporate office in another town, etc., this data field can be updated accordingly. (A pocket GPS receiver, with a wireless uplink, can be carried by the person to aid in switching the "now" number among various known possibilities depending on the person's instantaneous position.) When this database record is polled for the "now" number, it provides the then-current information.

Consider a Bedoop-enabled public telephone. To dial the phone, a business card is held in front of the Bedoop sensor (or slid through an optical scanner track). The phone interrogates the database at the business card server for the "now" number and dials that number.

To update the any of the fields stored in the database record, the card giver can use a special card that conveys write-authorization privileges. This special card can be a specially encoded version of the business card, or can be another object unique to the card-giver (e.g., the card-giver's driver's license).

The reference to business cards and personal calendars is illustrative only. Going back a century, "calling cards" were used by persons whose interests were strictly social, rather than business. The just-discussed principles can be similarly applied. Teenagers can carry small cards to exchange with new acquaintances to grant access to private dossiers of personal information, favorite music, artwork, video clips, etc. The cards can be decorated with art or other indicia that can serve purposes wholly unrelated to the Bedoop data steganographically encoded therein.

Gestural Input

A Bedoop system can determine the scale state, rotation state, X-Y offset, and differential scale state, of an object by reference to embedded calibration data, or other techniques. If the scan device operates at a suitably high frame rate (e.g., five or ten frames per second), change(s) in any or all of these four variables can be tracked over time, and can serve as additional input.

In an earlier-discussed example, moving an object to the left or right in front of the Bedoop scanner caused a left- or right-positioned button in a dialog box to be selected. This is a change in the X-Y offset of the scanned object. In that earlier example, moving the object inwardly towards the camera caused the selected button to be activated. This is a change in the scale state of the scanned object.

In similar fashion, twisting the object to the left or right can prompt one of two further responses in a suitably programmed Bedoop application. (This is a change in the rotation state.) Likewise, tilting the object so that one part is moved towards or away from the camera can prompt one of two further responses in the application. (This is a change in the differential scale state.)

In the business card case just-discussed, for example, the card can be held in front of the Bedoop scanner of a computer. If the card is twisted to the left, the computer opens a web browser to a web page address corresponding to Bedoop data on the card. If the card is twisted to the right, the computer opens an e-mail template, pre-addressed to an e-mail address indicated by the card.

In other examples, twisting an object to move the right edge towards the scanner can be used to effect a right mouse click input, and twisting the object to move the right edge away from the scanner can be used to effect a left mouse click input.

Simultaneous changes in two of these four positioning variables can be used to provide one of four different inputs to the computer (e.g., (a) twisting left while moving in; (b) twisting left while moving out; (c) twisting right while moving in; and (d) twisting right while moving out). Simultaneous changes to three or all four of these variables can similarly be used to provide one of eight or sixteen different inputs to the computer.

Simultaneous manipulations of the object in two or more of these modes is generally unwieldy, and loses the simple, intuitive, feel that characterizes manipulation of the object in one mode. However, a similar effect can be achieved by sequential, rather than simultaneous, manipulation of the card in different modes (e.g., twist left, then move in). Moreover, sequential manipulations permit the same mode to be used twice in succession (e.g., move in, then move out). By such sequential manipulations of the object, arbitrarily complex input can be conveyed to the Bedoop system.

(It will be recognized that a digitally-encoded object is not necessary to the gestural-input applications described above. Any object (talisman) that can be distinguished in the image data can be manipulated by a user in the manners described above, and an appropriate system can recognize the movement of the object and respond accordingly. The provision of digital data on the object provides a further dimension of functionality (e.g., permitting the same gesture to mean different things, depending on the digital encoding of the object being manipulated), but this is not essential.

Moreover, even within the realm of digitally-encoded gestural talismans, steganographic encoding is not essential. Any other known form of optically-recognizable digital encoding (e.g., 1D and 2D bar codes, etc.) can readily be employed.

In an illustrative embodiment, a business card or photograph is used as the talisman, but the range of possible talismans is essentially unlimited.

Dynamic gestures are not the only communications that can be effected by such talismans. Static positioning (e.g., presenting the talisman at different orientations) can alternatively be employed.

Consider a magazine advertisement. When presented to the sensor with the top of the page up, a first response can be invoked. If the page is presented at a rotation of 90 degrees, a second response can be invoked. Similarly with 180 degrees rotation (i.e., upside down), and 270 degrees rotation. The Bedoop detector can detect these different rotational states by reference to attributes of the watermark signal discerned from the magazine page (e.g., by reference to the rotation state discerned from the subliminal grid signal detailed in applicant's prior patents).

Gestural Decoding Module

There are various ways in which the Bedoop system's decoding of gestural input can be effected. In some Bedoop systems, this functionality is provided as part of the Bedoop applications. Generally, however, the applications must be provided with the raw frame data in order to discern the gestural movements. Since this functionality is typically utilized by many Bedoop applications, it is generally preferable to provide a single set of gestural interpretation software functions (commonly at the operating system level) to analyze the frame data, and make available gestural output data in standardized form to all Bedoop applications.

In one such system, a gestural decoding module tracks the encoded object within the series of image data frames, and outputs various parameters characterizing the object's position and manipulation over time. Two of these parameters indicate the X-Y position of the object within current frame of image data. The module can identify a reference point (or several) on the object, and output two corresponding position data (X and Y). The first represents the horizontal offset of the reference point from the center of the image frame, represented as a percentage of frame width. A two's complement representation, or other representation capable of expressing both positive and negative values, can be used so that this parameter has a positive value if the reference point is right of center-frame, and has a negative value if the reference point is left of center frame. The second parameter, Y, similarly characterizes the position of the reference point above or below center-frame (with above-being represented by a positive value). Each of these two parameters can be expressed as a seven-bit byte. A new pair of X, Y parameters is output from the gestural decoding module each time a new frame of image data is processed.

In many applications, the absolute X-Y position of the object is not important. Rather, it is the movement of the object in X and Y from frame-to-frame that controls some aspect of the system's response. The Bedoop application can monitor the change in the two above-described parameters, frame to frame, to discern such movement. More commonly, however, the gestural decoding module performs this function and outputs two further parameters, X' and Y'. The former indicates the movement of the reference point in right/left directions since the last image frame, as a percentage of the full-frame width. Again, this parameter is represented in two's complement form, with positive values representing movement in the rightward direction, and negative values representing movement in the leftward direction. The later parameter similarly indicates the movement of the reference point in up/down directions since the last frame.

The scale, differential scale, and rotation states of the object can be similarly analyzed and represented by parameters output from the gestural decoding module.

Scale state can be discerned by reference to two (or more) reference points on the object (e.g., diagonal corners of a card). The distance between the two points (or the area circumscribed by three or more points) is discerned, and expressed as a percentage of the diagonal size of the image frame (or its area). A single output parameter, A, which may be a seven-bit binary representation, is output.

As with X-Y data, the gestural decoding module can likewise monitor changes in the scale state parameter since the last frame, and produce a corresponding output parameter A'. This parameter can be expressed in two's complement form, with positive values indicating movement of the object towards the sensor since the last frame, and negative values indicating movement away.

A differential scale parameter, B, can be discerned by reference to four reference points on the object (e.g., center points on the four edges of a card). The two points on the side edges of the card define a horizontal line; the two points on the top and bottom edges of the card define a vertical line. The ratio of the two line lengths is a measure of differential scale. This ratio can be expressed as the shorter line's length as a percentage of the longer line's length (i.e., the ratio is always between zero and one). Again, a two's complement seven-bit representation can be used, with positive values indicating that the vertical line is shorter, and negative values indicating that the horizontal line is shorter. (As before, a dynamic parameter B' can also be discerned to express the change in the differential scale parameter B since the last frame, again in two's complement, seven bit form.)

A rotation state parameter C can be discerned by the angular orientation of a line defined by two reference points on the object (e.g., center points on the two side edges of a card). This parameter can be encoded as a seven-bit binary value representing the percentage of rotational offset in a clockwise direction from a reference orientation (e.g., horizontal). (The two reference points must be distinguishable from each other regardless of angular position of the object, if data in the full range of 0-360 degrees is to be represented. If these two points are not distinguishable, it may only be possible to represent data in the range of 0-180 degrees.) As before, a dynamic parameter C' can also be discerned to express the change in the rotation state parameter C since the last frame. This parameter can be in seven bit, two's complement form, with positive values indicating change in a clockwise rotation The foregoing analysis techniques, and representation metrics, are of course illustrative only. The artisan will recognize many other arrangements that can meet the needs of the particular Bedoop applications being served.

In the illustrative system, the Bedoop application programs communicate with the gestural decoding module through a standardized set of interface protocols, such as APIs. One API can query the gestural input module for some or all of the current position parameters (e.g., any or all of X, Y, A, B, and C). The module responds to the calling application with the requested parameter(s). Another API can query the gestural input module for some or all of the current movement data (e.g., any or all of X', Y', A', B' and C'). Still another API can request the gestural decoding module to provide updated values for some or all of the position or movement data on a running basis, as soon as they are discerned from each frame. A complementary API discontinues the foregoing operation. By such arrangement, all of the gestural data is available, but the Bedoop application programs only obtain the particular data they need, and only when they ask for it.

In Bedoop applications that communicate with external servers, just the Bedoop data (i.e., CLASS, DNS, and optionally UID) may initially be sent. If the remote server needs to consider gestural data in deciding how to respond, the remote server can poll the local Bedoop system for the necessary data. The requested gestural data is then sent by the local Bedoop system to the remote server in one or more separate transmissions.

In other embodiments, since the gestural data is of such low bandwidth (e.g., roughly 56 bits per image frame), it may routinely and automatically be sent to the remote computer, so that the gesture data is immediately available in case it is needed. In an illustrative implementation, this data is assembled into an 8-byte packet, with the first byte of the packet (e.g., the X parameter) being prefixed with a "1" sync bit, and subsequent bytes of the packet being prefixed with "0" sync bits. (The sync bits can be used to aid in accurate packet decoding.)

In some embodiments, it is useful to provide for an extension to the normal 64-bit Bedoop length to accommodate an associated packet of gestural data. This can be effected by use of a reserved bit, e.g., in the UID field of the Bedoop packet. This bit normally has a "0" value. If it has a "1" value, that indicates that the Bedoop data isn't just the usual 64 bits, but instead is 128 bits, with the latter 64 bits comprising a packet of gestural data.

Similar extension protocols can be used to associate other ancillary data with Bedoop data. A different reserved bit in the UID field, for example, may signal that a further data field of 256 bits follows the Bedoop data—a data field that will be interpreted by the remote computer that ultimately services the Bedoop data in a known manner. (Such bits may convey, e.g., profile data, credit card data, etc.) The appended data field, in turn, may include one or more bits signaling the presence of still further appended data.

Grandmothers

It is a common complaint that computers are too complex for most people. Attempts to simplify computer-user interaction to facilitate use by less experienced users usually serve to frustrate more experienced users.

In accordance with this aspect of the present technology, the sophistication of a computer user is steganographically indicated on a talisman used by that user to interact with the system. The computer detects this steganographically-encoded data, and alters its mode of interacting with the user accordingly.

Consider internet browser software. Experienced users are familiar with the different functionality that can be accessed, e.g., by various drop-down menus/sub-menus, by the keyboard shortcuts, by the menus available via right-clicking on the mouse, by manipulating the roller mouse scroll wheel and scroll button, etc., etc. Grandmothers of such users, typically, are not so familiar.

Although gestural interfaces hold great promise for simplifying user-computer interaction, the same dichotomy between experienced users and inexperienced users is likely to persist, frustrating one class of user or the other.

To help close this gap, a computer system can respond to gestures in different manners, depending on the expertise level indicated by encoding of the talisman. For an expert user, for example, the gestural interface active in the internet browser software may display the stored list of Favorite web addresses in response to tipping the left edge of the talisman towards the optical sensor. Once this list is displayed, the expert user may rotate the talisman to the right to cause the highlighting to scroll down the list from the top. Rotating the talisman to the left may scroll the list of Favorites up from the bottom. The speed of scrolling can be varied in accordance with the degree of rotation of the talisman from a default orientation.

In contrast, for the novice user, these talisman manipulations may be confounding rather than empowering. Tipping the left edge of the talisman towards the sensor may occur as often by mistake as on purpose. For such users, a more satisfactory interface may be provided by relying on simple X-Y movement of the talisman to move an on-screen cursor, with a movement of the talisman towards the sensor to serve as a selection signal (i.e., like a left-mouse click).

(In the example just-cited, the expert user summoned a list of Favorite web sites. Different "Favorites" lists can be maintained by the computer—each in association with different talismans. A husband who uses one talisman is provided a different "Favorites" list than a wife who uses a different talisman.)

Printed Pictures

A printed photograph can be steganographically encoded with Bedoop data leading to information relating to the depicted person (e.g., contact information, biographical information, etc.).

Such a photograph can be presented to a Bedoop sensor on a telephone. In a simple embodiment, the telephone simply processes the Bedoop data to obtain a corresponding default telephone number, and dials the number. In other embodiments, various options are possible, e.g., dial home number or dial work number. On presenting the photograph to the telephone, for example, moving the photo to the left may dial the person at home, while moving the photo to the right may dial the person at work.

As telephones evolve into more capable, multi-function devices, other manipulations can invoke other actions. In a computer/telephone hybrid device, for example, rotating the photo counterclockwise may launch a web browser to an address at which video data from a web cam at the pictured person's home is presented. Rotating the photo clockwise may present an e-mail form, pre-addressed to the e-mail address of the depicted person. Moving the photo to the right may query a database on the system for other photographs depicting the same individual or subject, which can be presented in response to further user input. Etc.

In this and other embodiments, it is helpful for the Bedoop device to prompt the user to aid in manipulating the object. This can be done audibly (e.g., "move photo left to dial at home") or by visual clues (e.g., presenting left- or right-pointing arrows).

Bedoop data in photographs can also be used to annotate the photographs, as with notes on the back of a photograph, or printed under the photograph in a photo album. The Bedoop data can lead to a remote database, where the photograph owner is permitted to enter a textual (or audio) narrative in association with each photograph's UID. Years later, when some of the names have been forgotten, the photograph can be positioned in front of a Bedoop sensor, and the system responds by providing the annotation provided by the photograph owner years earlier.

Drivers Licenses and Other Cards

Drivers licenses, social security cards, or other identity documents may be encoded by the issuing authority with Bedoop data that permits access to the holder's personal records over the web. On presenting the document to a Bedoop system, the system directs a web browser to a private address corresponding to data encoded on the document. At that address, the holder of the document can review governmental records, such as state or federal tax return data, social security entitlements, etc., as well as privately-maintained records, such as credit records, etc. User selection among various functions can be effected by spatial manipulation of the document. (Entry of additional data, such as social security number or mother's maiden name, may be required of the user to assure privacy in case the document is lost or stolen.)

By manipulating a driver's license in front of a Bedoop sensor, a user can request renewal of the driver's license, and authorize payment of the corresponding fee.

Bank cards (debit, credit, etc.) can similarly be encoded with Bedoop data to permit the holder to access bank records corresponding to the bank card account. (Entry of a PIN code may be required to assure privacy.)

Such documents can also be used to access other personal data. One example is e-mail. A traveler might pause at a Bedoop kiosk at an airport and present a driver's license. Without anything more, the kiosk may present email that is waiting for the traveler on an associated display screen.

On recognizing a driver's license, the kiosk can access a remote site (which may be maintained by the Department of Motor vehicles, another government entity, a private entity, or by the traveler), authenticating the operation by presenting Bedoop data encoded on the license, and obtain information that the person has pre-approved for release in response to such authorized access. This information can include e-mail account and password information. Using this information, the kiosk queries the corresponding e-mail server, and downloads a copy of recently received mail for presentation at the kiosk. (A user-entered PIN number may be required at some point in the process, e.g., in querying the remote site for sensitive e-mail password data, before presenting the downloaded e-mail for viewing, etc., to ensure privacy.)

Other cards carried in wallets and purses can also be encoded to enable various functions. The local sandwich shop that rewards regular customers by awarding a free sandwich after a dozen have been purchased can encode their frequent-buyer card with Bedoop data leading to the shop's web-based sandwich delivery service. Or the frequent-buyer card can be eliminated, and customers can instead wave their business card or other identity document in front of the shop's Bedoop sensor to get purchase credit in a tally maintained by the sandwich shop's computer.

Food stamps, health insurance cards, and written medical prescriptions, can likewise be encoded with digital data to enable the provision of new functionality.

At large trade shows, such as COMDEX, vendors needn't publish thick, glossy brochures to hand out to visitors. Instead, they may print various stylish promo cards for distribution. When later presented to a Bedoop sensor, each card leads to a web-based presentation—optionally including persuasive video and other multi-media components. The user can be prompted to provide data to customize, or focus, the presentation to the user's particular requirements. If the user wants further information, a request can be made by the click of a mouse (or the twist of a card).

Prizes and Product Promotions

Product packaging (e.g., Coke cans, Snapple bottles, Pepsi 12-pack boxes) can be encoded for contest purposes. The encoding can be customized, item to item, so that selected items—when Bedoop scanned—are recognized to be the one in a hundred that entitles the owner to a cash or merchandise prize. A remote server to which the item's Bedoop data is provided queries the user for contact information (e.g., address, phone number) so the prize can be awarded or, for smaller prizes, the system can print out an award certificate redeemable at local merchants for products or cash. Once a winning item is identified to the remote server, its UID on the server is marked as redeemed so that the item cannot later be presented to win another prize.

In other such embodiments, all of the items are encoded identically. Winners are determined randomly. For example, during a contest period, persons around the world may present Coke cans to Bedoop systems. The corresponding Bedoop application on each user computer submits Bedoop data to a corresponding web address. The user's e-mail address may also be included with the submission. As this data is relayed to the corresponding server computer(s), every $N^{th}$ set of data is deemed to be a winner, and a corresponding award notification or prize is dispatched to the Bedoop system from which the winning set of data originated.

The server computer that receives such contest submittals from client Bedoop systems can be arranged to prevent a single user from bombarding the server with multiple sets of data in an attempt to win by brute force. (This may be done, for example, by checking the included e-mail address or received IP address, and not considering a data submittal if the same address was encountered in data submitted within the past hour. Similar anti-brute-force protection can be provided on the user's computer, preventing, e.g., repeated contest data to be sent more frequently than once per hour. More sophisticated anti-brute-force measures can of course be provided.)

Non-planar product packaging, such as cylindrical soda cans, present certain optical issues in encoding and decoding which are detailed further below.

Product Information and Ordering

Product packaging and product advertisements can be encoded with Bedoop data that, when presented to a Bedoop system, initiates a link to a web page from which that product can be purchased, or more information obtained. Once the link has been established, the user can be instructed to manipulate the object in different of the earlier-described modes to effect different functions, e.g., move towards camera to order the product; move away from camera for product information. If the object is moved towards the camera to effect an order, the user can be prompted to further manipulate the object to specify delivery options (e.g., rotate left for overnight mail, rotate right for regular mail). If the object is moved away from the camera to request product information, the user can be prompted to further manipulate the object to specify the type of information desired (e.g., rotate left for recipes, rotate right for FDA nutritional information, move up for information on other products in this family, move down to send an email to the product manufacturer).

Credit card or other customer billing information, together with mailing address information, can be stored in a profile on the Bedoop system, and relayed to the transactional web site either automatically when a purchase action is invoked, or after the user affirms that such information should be sent (which affirmation may be signaled by manipulation of the packaging or advertisement in one of the earlier-described modes). Other modes of payment can naturally be employed.

Computer Access Cards

This disclosure earlier considered access cards used to gain access to secure buildings. Related principles can be used in conjunction with computer access.

A driver's license, employee photo ID, or other such document can be presented to a Bedoop sensor on a computer. The computer recognizes the user and can take various steps in response.

One response is to log onto a network. Another is to set load a user profile file by which the computer knows how to arrange the desktop in the user's preferred manner. By manipulating the Bedoop-encoded object, the user can further vary the environment (e.g., rotate left to launch standard business productivity applications and software development applications; rotate left to launch lunchtime diversions—stock update, recreational games, etc.)

Hotel rooms are increasingly providing computer services. By presenting a driver's license, a Bedoop-equipped computer in a hotel room can link to a remote site indicated by the Bedoop data, obtain preference data for that user, and launch applications on the hotel computer in an arrangement that mimics that user's familiar work computer environment.

Audio/Video Disks, Software, and Books

Bedoop data can be conveyed by indicia or texturing on the surfaces of CD and DVD disks, on the labels (or authenticity certificates) or inserts or artwork for same, on the enclosures for same (e.g., jewel box, plastic case, etc.), on book dust jackets, on book pages, etc. Any of these objects can be presented to a Bedoop device to establish a link to a related web site. The consumer can then manipulate the object (or otherwise choose) to select different options.

For music, one option is to receive MP3 or other clips of songs by the same artist on other CDs, or of songs from other artists of the same genre. Another is to view music video clips featuring the same artist. Still another is to order tickets to upcoming concerts by that artist. In-store kiosks can permit tentative customers to listen to sample tracks before they buy.

Similar options can be presented for video DVDs. In the case of video, this can include listings of other movies with the same director, with the same star(s), etc. In the case of software, the options can include advisories, bug fixes, product updates and upgrades, etc. Naturally, the user can make purchases from these sites, e.g., of other music by the same artist, other videos with the same star, software upgrades, etc.

Similar options can be accessed using Bedoop data associated with printed book materials.

Children learn the mechanics of turning book pages at an early age. Children learn to look at pictures on the pages of a book and they enjoy hearing the story that is related to the images. Generally, adults read the words and the child follows along looking at the pictures. Children enjoy repeatedly hearing the words of a story. The association of seeing pictures and repeatedly hearing the words is an excellent mechanism for learning to read and learning to enjoy books.

Embedded digital watermark data can automate the above process so that a child can see the pictures, and hear the words independently. Such an arrangement provides enjoyment for the child while teaching reading and love for books, and at the same time giving the child independence and familiarity with an automated mechanism.

More particularly, images in the book, or the paper substrates of the pages, contain digital watermarks. As a child turns the pages of the book, a camera captures the image and an associated computer reads the watermark. The watermark is then used to index a data store—either local or remote—to obtain text corresponding to the page being viewed. A text-to-speech converter is then employed to voice the text to the child. (Alternatively, the data store can contain digitized speech, rather than simple text—permitting different story characters to be given different voices, etc.) Thus, as a child turns the pages of the book, the child hears the words that are printed on the page. By turning pages, the child controls the process. The child will naturally make an association between the printed words and the words that are played by the computer.

Ad Tracking

Advertisers commonly use different advertisements for the same product or service, and employ means to track which ad is more effective within which demographic group. Bedoop can provide such functionality.

Consider a travel service web site that is promoting Hawaiian vacations. Bedoop data from several advertisements can lead consumers to the site.

Identical advertisements can be placed in several different magazines. Each is encoded with a different Bedoop UID. By monitoring the UIDs of the Bedoop inquiries to the site, the travel service can determine which magazines yield the highest consumer response (e.g., per thousand readers).

Likewise, within a single magazine, two or more advertisements may be encoded with Bedoop data leading to the site—again, each with a different UID. Again, analysis of the UIDs used in accessing the site can indicate which advertisement was the more effective.

The two UIDs in the foregoing examples may both lead to the same internet destination, or may lead to different destinations.

The instantaneous nature of the internet links permits advertisers to learn how consumer responses to print advertisements vary with time-of-day, yielding information that may assist in making ads for certain products more effective.

More elaborate variants and combinations of the foregoing are, of course, possible. If the consumers provide personal information in response to the ads (either by permitting access to pre-stored personal profile data, or by filling in web-based forms, or by manipulation of the ad (e.g., "please move the ad towards your Bedoop sensor if you drank coffee this morning")), still richer statistical data can be gleaned.

Rolodex of Cards

Bedoop-encoded business cards as detailed above can be accumulated and kept near the telephone or computer in a Rolodex-like arrangement. If a refrigerator ice-maker malfunctions, a homeowner can find the card for the appliance repairman used a few years ago, and present it to a Bedoop sensor. A link is established to the repairman's company (e.g., web site or via telephone). At a web site, the repairman may provide basic information, such as hours of availability, current fee schedule, etc. The homeowner may select an option (by card gesture or otherwise) to invoke a teleconference (e.g., NetMeeting) to consult about the problem. Or the homeowner may select another option to send e-mail. Still a further option may permit the homeowner to schedule a house call on the repairman's weekly calendar. Still a further option may permit the homeowner to view one or more short videos instructing customers how to fix certain common appliance problems.

Stored Value Cards

An electronic money system (e.g., of the sort detailed in U.S. application 60/134,782, filed May 19, 1999) may encode Bedoop data on a card that leads to storage at which random-number tokens (which represent increments of money) are stored. Presenting the card to a Bedoop system launches an application that reads and encrypts the tokens and forwards the encrypted data to the clearinghouse computer of the corresponding bank to learn their remaining value. There the tokens are decrypted and checked for validity (but not redeemed). The bank computer responds to the Bedoop system, indicating the remaining value of the tokens on the card.

For security reasons, the storage containing the random-number tokens should not be generally accessible. Instead, the user must provide authentication data indicating authorization to gain access to that information. This authentication data may be a PIN code. Or the user may provide authentication by presenting a second Bedoop-encoded object, e.g., a driver's license to the Bedoop system. (Many other Bedoop systems may advantageously use, or require the use of, two or more Bedoop objects—either presented one after the other, or all at the same time. The Bedoop system can provide visual or audible prompts leading the user to present the further Bedoop object(s) as necessary.

Ski Lift Tickets

In accordance with another embodiment, ski lift tickets are Bedoop encoded to provide various functionality.

For example, instead of buying a lift ticket good for a day, a skier may purchase a ticket good for eight lifts. This data is encoded on the ticket, and sensed by a Bedoop sensor at each lift. The sensors are networked to a common server that tracks the number of lifts actually purchased, and updates the number as used. The skier is informed of the number of rides remaining on entering or leaving the lift. Statistical data can be collected about trail usage (e.g., N % percent of skiers ski all day along just two lifts, etc.).

Off the slopes, back at home, the used lift ticket may be presented to a Bedoop sensor to obtain current snow conditions and lift hours, or to review trail maps, or to order ski vacation packages. If the ticket is encoded with the owner's name, UID, or other information of commercial/marketing interest, local merchants may give the bearer discounts on selected goods in response to Bedoop scanning of the ticket and recovery of such information.

REI Membership Cards

Membership cards for certain stores can be Bedoop-encoded to provide added value to the member. For outdoor gear stores such as REI, presentation of the card to a Bedoop sensor can lead to a library of USGS maps, to web pages with current fishing and hunting regulations, etc. Naturally, the store's on-line ordering site is just a quick twist away.

Theme Park Tickets

Theme park tickets can be encoded with the age and gender of the visitor, and with additional data permitting the experience to be customized (e.g., from a roster of theme park personalities, the visitor's favorite is Indiana Jones). Throughout the park are kiosks to which the visitor can present the ticket to orchestrate the visit to follow a particular story line. Some kiosks issue premiums matching the age/gender of the recipient.

Car Keys

Car keys (or key ring fobs) are Bedoop encoded. When the car is taken to a shop for service, the mechanic presents the key to a Bedoop sensor, and thereby obtains the car's maintenance history from a remote server on which it is maintained. At home, the key can be presented to a Bedoop sensor and manipulated to navigate through a variety of automotive-related web sites.

In some embodiments, the Bedoop-encoded object is not used to navigate to a site, but is instead used to provide data once a user's computer is otherwise linked to a web site. A user surfing the web who ends up at a car valuation site can present a key to the Bedoop scanner. The Bedoop data is used to access a remote database where the make, model, options, etc., of the car are stored. This data is provided to a database engine that returns to the user the estimated value of the car.

While visiting a mechanic's web site, presentation (and optionally manipulation) of a key or key ring fob can be employed to schedule a service appointment for the car.

Fashion Coordination

Some department stores and clothing retailers offer "personal shoppers" to perform various services. For example, a customer who is purchasing a dress may ask a personal shopper for assistance in selecting shoes or accessories that complement the dress.

A Bedoop-encoded garment tag on the dress can be employed to obtain similar assistance. In response to such a tag, a Bedoop system can query a database to obtain a mini-catalog of clothes and accessories that have previously been identified as complementing the dress identified by the tag. These items can be individually displayed on a screen associated with the system, or a virtual model wearing the dress—together with one or more of the recommended accessories—can be synthesized and depicted. The shopper may quickly review the look achieved by the model wearing the dress with various different pairs of shoes, etc., by repeatedly activating a user interface control (by mouse, touch screen, or garment tag gestures) to cycle through different combinations.

A shopper's credit card can be Bedoop-encoded so as to lead Bedoop systems of particular stores (i.e., stores pre-authorized by the shopper) to a profile on the shopper (e.g., containing size information, repeat purchase information, return history, style/color preferences, etc.).

Credit Card Purchases

When a consumer visits a commercial web site and wishes to purchase a displayed product, the transaction can be speeded simply by presenting a Bedoop-encoded credit card to a Bedoop sensor on the user's computer. The Bedoop data on the card leads to a database entry containing the credit card number and expiration date. The Bedoop application then sends this information (optionally after encrypting same) to the web site with instructions to purchase the depicted product.

(Impulse purchases are commonly deterred by the hurdles posed between the purchase impulse and the completed purchase. This and other Bedoop applications aid in reducing such hurdles.)

Product Marketing

Bedoop data relating to one product or service can be used to cross-market others products and services. Consider a consumer who purchases a pair of golf shoes. The box is Bedoop encoded. By presenting the box to a Bedoop system, the consumer is linked to a web page that presents various promotional offers. The consumer may, for example, elect to play a free round of golf at one or more identified local golf courses, or print a coupon for ten percent off any order of socks from an on-line sock merchant. (Various means can be employed to prevent multiple redemptions from a single box. One is a serial number that is tracked by the web page or cross-marketed merchant, and only honored once. Another is identification data corresponding to the consumer that is tracked to prevent multiple redemptions.)

Product tags can likewise be Bedoop-encoded. A tag from an article of Nike apparel can lead to the Nike on-line store, where the user can buy more merchandise. If the tag is from a soccer jersey, a certain tag manipulation (e.g., rotate left) may lead the user to a special-interest soccer page, such as for the World Cup. A tag on a golf glove may lead to a website of a local golf course. Twist left to reserve a tee time; twist right to review course maps and statistics. Bedoop kiosks can be provided in retail stores to let consumers use the Bedoop features.

Travel Planning Services

After making a reservation at a resort, a consumer is typically mailed (by email or conventional mail) various confirmation information. If not already printed, the consumer can print this information (e.g., a confirmation card).

Bedoop-encoding on the printed object can lead to web-based information relating to the reservation (e.g., reservation number, the consumer's name, arrival/departure dates, etc.). If the consumer wishes to make dinner or golf reservations, this object is presented to a Bedoop system—either at the user's home, at an airport kiosk, etc. The system recognizes the object type and encoded data, and establishes a link to a remote computer that provides various information and scheduling services for the resort. By manipulating the object (or otherwise) the consumer selects desired dinner and golf tee times. The system already has the reservation number (indexed by the UID), so tedious provision of such data is avoided.

In some embodiments, the remote computer is not maintained by the resort, but is rather maintained by an independent travel service. (The travel service may also maintain the DNS leaf node server.) The computer can present a web page (branded by the travel service or not) that offers the scheduling options desired by the user, and also presents links to other information and services (e.g., offering entry tickets to nearby attractions, and advertising nearby restaurants).

Airline tickets (or e-ticket confirmations) can be similarly encoded with Bedoop data. These items may be presented to Bedoop systems—at a traveler's home or in airports—to permit review and changing of travel itinerary, reserve hotels and rental cars, secure first-class upgrades, check the airplane's seating arrangement, review frequent flier status, scan tourist information for the destination, etc.

Movie Tickets

As indicated earlier, movie tickets can be encoded with Bedoop data identifying, e.g., the movie title and date. When a movie viewer returns home, the ticket stub can be presented to a Bedoop system. One of the options presented by the corresponding Bedoop application can be to launch a pay-per-view screening of the just-seen movie at a discounted rate. Another is to download the movie onto a writeable DVD disk at the viewer's home, perhaps serialized to permit playback only on that viewer's DVD player, or enabled for only a few playbacks, etc. (again, likely for a discounted fee). Still another option is to present web-delivered video clips from the movie. Another is to offer related merchandise for purchase, possibly at discount to retail. (These features may be available for only a limited period after the date encoded on the ticket stub.) Another is to alert the consumer to upcoming movies of the same genres, or with the same director or stars, or released by the same studio. Still another is to direct a web browser to an on-line ticket merchant for tickets to other movies. The consumer may navigate among these options by manipulating the ticket stub, or otherwise.

The same, or related, options can likewise be provided in response to Bedoop data detected from a book jacket presented to a Bedoop system.

Video Recording

A video recording device can be programmed to record a broadcast program by presenting a Bedoop sensor with a printed promotion for the program (e.g., an advertisement in a newspaper or TV Guide). Bedoop-encoded within the printed document is data by which the Bedoop system (which may be built into the video recorder or separate) can set the recording time, date, and channel.

Set Top Boxes

Many entertainment-related applications of Bedoop data can be implemented using television set top boxes. Such boxes include processors, and typically include a return channel to a control facility. The provision of a Bedoop chip and optical sensor can vastly increase the functionality these devices presently provide.

Special Event Tickets

Consider a ticket to a basketball game. By presenting the ticket to a Bedoop system, a user may access the web site of either team so as to review recent scores and statistics. The user may also obtain a web-based virtual tour of the arena, and review seating maps. The view of the playing field as seen from the user's seat location may be presented. Tickets for upcoming games may be ordered, as well as pay-per-view games and team souvenirs. For high-priced tickets, the user may be entitled to premium web features, such as on-line text-, audio-, or video-chat session with a team star on the day before the game.

Unlike conventional tickets, Bedoop-encoded tickets need not limit the user to a predetermined seat. While the ticket may be printed with a nominal seat, the user may present the ticket to a Bedoop sensor and access a web site at which a different seat can be reserved. On attending the event, the consumer presents the ticket to a Bedoop sensor that reads the ticket UID and looks up the seat assignment most-recently picked by the consumer. It then prints a chit entitling the consumer to take the seat earlier selected from the transactional web site.

Signet Rings

Signet rings have historically been used to indicate a person's identity or office. Such rings, or other items of personal jewelry, can be encoded with Bedoop data (either by texturing or printing) and presented as necessary to Bedoop systems. The extracted Bedoop data can lead to a secure web site indicating the person's name and other information (i.e., a web site that has anti-hacking measures to prevent illicit change of the stored identification information). Such a signet ring can be presented to Bedoop systems that require a high-confidence confirmation of identity/authorization before proceeding with a Bedoop function.

Tattoos

Temporary tattoos are well known and typically include an ink or printed film that is transferred to a wearer's skin through some application process (e.g., wetting or otherwise). The artwork on the tattoo can be arranged to steganographically encode Bedoop data, facilitating machine recognition of the persons (or objects) tattooed. Youths can compile a contacts database simply by snapping digital photos of friends using an imaging-capable personal digital assistant. Such a computer device can decode the watermark, access a corresponding web dossier of information on the person photographed, and add such information to a contacts database.

E-Paper

While it is doubtless evident that a great variety of printing technologies can be employed in Bedoop applications, it should be noted that e-paper can be employed as well. E-paper, developed by Nicholas K. Sheridon of Xerox, and mass produced by 3M, is a thin layer of transparent plastic in which millions of small beads, somewhat like toner particles, are dispersed. The beads, each contained in a fluid-filled cavity, are free to rotate within those cavities. The beads are "bichromal," with hemispheres of contrasting color (e.g. black and white). Under the influence of a voltage applied to the surface of the sheet, the beads rotate to present one colored side or the other to the viewer. A pattern of voltages can be applied to the surface in a bit-wise fashion to create images such as text and pictures. The image persists until new voltage patterns are applied to create new images. The reader is presumed familiar with the US patents issued to Sheridon on this technology.

It will further be recognized that epaper can be used to convey digital data according to essentially any known watermarking method, and is also suitable for conveying digital information in data glyph form.

Post-It® Notes

Pads of Post-It® notes, or other pads of paper, can be marked by the manufacturer (either by texturing, watermarked tinting, ink-jet spattering, etc.) to convey steganographic data (e.g., Bedoop data). When such a note is presented to a Bedoop system, the system may launch an application that stores a snapshot of the note. More particularly, the application may mask the note-portion of the image data from the other image data, virtually re-map it to a rectangular format of standardized pixel dimensions, JPEG-compress the resulting image, and store it in a particular computer subdirectory with a name indicating the date of image acquisition, together with the color and/or size of the note. (These latter two data may be indicated by data included in the Bedoop payload.) If the color of the note is indicated by digital data (e.g., in the file name), then the image itself may be stored in grey-scale. When later recalled for display, the white image background can be flooded with color in accordance with the digital color data.

The Bedoop system may buffer several past frames of image data. When the object is recognized as a Post-It note whose image is to be saved, the system may analyze several such frames to identify the one best-suited for storage (e.g., check the spatial frequency content of the note as imaged in each frame, to identify the one with the finest detail), and store that one.

When a Post-It note is recognized by the Bedoop system, the system may emit a confirmation tone (or other response) to indicate that the object has been recognized, but not immediately execute the snapshot operation. Instead, the system may await a further instruction (e.g., gesture) to indicate what operation is desired.

By moving the note towards the sensor, for example, the user can signal that a snapshot operation is to be performed. (This closer presentation of the note may also permit the imaging system to capture a more detailed frame of image data.)

By moving the note away, the system may respond by reading, decompressing, and displaying the six most-recently stored Post-It note images, in tiled fashion, on the computer screen. The individual notes can be displayed at their original dimensions, or each can be re-sized to fill the full height or width of a tile. A user interface control (responsive to gestures, mouse operation, keyboard scroll arrows, etc.) allows the user to scroll back in time to any desired date.

The full 64-bit Bedoop payload of other embodiments may not be needed for Post-It notes. In the just-given example, for example, the Bedoop system responds to all Post-It notes in the same fashion. Thus, an abbreviated Bedoop format that indicates simply 'I'm a Post-It note, yellow, size 3"×3"' can suffice. The twelve bit CLASS ID, with eight further bits to indicate color/size combinations, may be sufficient. Reducing the payload permits it to be more robustly encoded on small objects. (As noted below, Bedoop decoding systems can look for several different data formats/protocols in trying to extract Bedoop data from an object.)

Alignment of Documents for Other Purposes

While the just-described pre-marked paper triggered a Bedoop response when presented to a Bedoop sensor (i.e., take a snapshot of the paper), the markings can be used for purposes other than to trigger Bedoop responses.

Regardless of the particular data with which the paper is encoded, the embedded subliminal graticules, or other steganographically-encoded registration data, can be used by other applications to correct misalignment of scanned data. In a photocopier, for example, a document need not be placed exactly squarely on the glass platen in order to yield a properly-aligned photocopy. The scanner scans the skewed document and then detects the steganographic registration markings in the resulting scan data. This data is then processed to virtually re-register same, so that the registration markings are in a desired alignment. The processed scan data is then provided to the xerographic reproduction unit to yield a photocopy in which the skew effect is removed.

The same technique is likewise applicable to video recorders, digital cameras, etc. If such a device images an object (e.g., a photograph) with steganographic registration markings, these markings can be used as a guide in re-registering the resulting data to remove mis-alignment effects.

Postal Mail Information

Many contexts arise in which data to be presented to a consumer is valuable only if timely. The postal service mail is ill-suited for some such information due to the latency between printing a document, and its ultimate delivery to a recipient. Bedoop principles, however, allow the recipient to take a postal object that was printed well before delivery, and use it on receipt (i.e., present to a Bedoop system) to receive up-to-the-minute information. In this and other embodiments, the Bedoop data can also uniquely identify the addressee/recipient/user, so the web site can present data customized to that user.

Distributors of printed advertising can reward Bedoop-driven consumer visits to their web sites by issuing digital tokens or coupons that can be redeemed for premiums, cash-back, etc. Every millionth visitor wins a million pennies (with appropriate safeguards, e.g., preventing more than one entry an hour).

Classes of Bedoop Encoding

The above-described embodiments focused on use of Bedoop data after decoding. Additional insight may be gained by examining the earlier part of the process—encoding.

Encoding can be performed in many contexts, which may be conceptualized as falling into three broad classes. The first is static marking, in which a document designer, pre-press service bureau, advertising agency or the like embeds Bedoop data. The second is dynamic marking, in which automated systems encode, or vary, Bedoop data "on the fly." Such systems can tailor the Bedoop data to particularly suit the context, e.g., to the moment, place, user, etc. The third is consumer marking, in which Bedoop data is added to a document at the time of printing.

The second class of encoding enables features not available from the first. Consider an American Express travel web page with information about travel to Hawaii. A DNS leaf node server points to this page in response to certain Bedoop data—e.g., data encoded in a magazine photograph of a Hawaiian beach scene.

Actually, all Bedoop data having a certain CLASS and DNS ID may lead to this web page, irrespective of the UID data. If the magazine photo is encoded with a particular "don't care" UID field (e.g., 1111111111111111111111111), this may signal the originating Bedoop system—or any intervening system through which the Bedoop data passes—that arbitrary data can be inserted in the UID field of that Bedoop packet. The originating Bedoop system, for example, can insert a dynamically-configured series of bits into this field. Some of these bits can provide a profile of the user to the remote server, so that the Bedoop response can be customized to the user. (The user would naturally pre-approve information for such use so as to allay privacy concerns.)

As one example, the local Bedoop system can set the least significant bit of the UID field to a "0" if the user is male, or to a "1" if the user is female. The next four bits can indicate the user's age by one of sixteen age ranges (e.g., 3 or less, 4-5, 6-7, 8-9, 10-11, 12-13, 14-15, 16-17, 18-20, 21-24, etc.).

Alternatively, or in addition, the local Bedoop system can stuff the don't-care UID field (all of it, or in part) with signature data tending to uniquely identify the local Bedoop system (e.g., system serial number, a hash code based on unchanging data unique to that system, etc.) By reference to such data, the remote server can identify repeat visits by the same user, and can tailor its responses accordingly (e.g., by recalling a profile of information earlier entered by the user and stored at the remote server, avoiding the need for data re-entry).

More on Optical Input Devices

It is expected that image input devices will soon become commonplace. The provision of digital cameras as built-in components of certain computers (e.g., the Sony Vaio laptops) is just one manifestation of this trend. Another is camera-on-a-chip systems, as typified by U.S. Pat. No. 5,841,126 and detailed in Nixon et al., "256×256 CMOS Active Pixel Sensor Camera-on-a-Chip," IEEE J. Solid-State Circuits, Vol. 31(12), pp. 2046-2051 (1996), and Fossum, "CMOS Image Sensors: Electronic Camera-on-a-Chip," IEEE Transactions of Electron Devices, vol. 44, No. 10, October 1997. Still another is head-mounted cameras (as are presently used in some computer-augmented vision systems). These and other image input devices are all suitable for use in Bedoop systems.

Camera-on-a-chip systems can be equipped with Bedoop detector hardware integrated on the same chip substrate. This hardware can be arranged to find and decode Bedoop data from the image data—notwithstanding scale, rotation, differential scaling, etc. Gestural decoding can also be provided in hardware, with the resulting data output in packet form on a serial output bus. Such a chip can thus provide several outputs—image data (either in raw pixel form, or in a data stream representing the image in one of various image formats), 64 bits of Bedoop data (serially or in parallel), and decoded gesture data.

In other embodiments, the Bedoop detector (and/or the gestural decoder) can be on a substrate separate from the camera system.

To accommodate different Bedoop data formats and protocols, the hardware can include RAM or ROM in which different format/protocol information is stored. (These different formats/protocols can relate, e.g., to Bedoop systems employing different data payload lengths, different subliminal grids, different encoding techniques, etc.) As the Bedoop system stares out and grabs/analyzes frames, each frame can be analyzed in accordance with several different formats/protocols to try and find a format/protocol that yields valid Bedoop output data.

Movable Bedoop Sensors

Although the illustrated Bedoop systems are generally stationary, they need not be so. They can be portable. Some such systems, for example, employ palmtop computers equipped with optical sensor arrays. If the palmtop is provided with live network connectivity (e.g., by wireless), then Bedoop applications that rely on remote computers can be implemented just as described. If the palmtop is not equipped with live network connectivity, any Bedoop applications that rely on remote computers can simply queue such communications, and dispatch same when the palmtop next has remote access (e.g., when the palmtop is next placed in its recharger and is coupled to a modem through which internet access can be established).

Another variant is a Bedoop sensor with a 1D or 2D photosensor array (e.g., CCD or CMOS) that is movable around a desk or other work-surface, like a mouse. Such a sensor can be coupled to the associated computer by cabling, or a wireless interface can be used. The peripheral may be arranged for placement on top of an item in order to read digital data with which the object is marked. (Built-in illumination may be needed, since the device would likely shadow the encoding.) Some forms of such peripherals are adapted to serve both as general purpose digital cameras, and also as Bedoop sensors.

Such a peripheral would find many applications. In "reading" a magazine or book, for example, it may be more intuitive to place a Bedoop reader "on" the object being read, rather than holding the object in the air, in front of a Bedoop sensor. This is particularly useful, e.g., when a magazine page or the like may have several differently-encoded Bedoop sections (corresponding to different articles, advertisements, etc.), and the user wants to assure that the desired Bedoop-encoded section is read.

The "bookmark" paradigm of internet browsers might be supplemented with paper bookmarks, e.g., Bedoop data encoded on one or more pages of paper. To direct a browser to a particular bookmarked destination, the peripheral is simply placed on top of the page (or part thereof) that is marked with the corresponding Bedoop data. A user may print a "map" comprised of postage stamp-sized regions tiled together, each of which regions represents a favorite web destination.

Such a map may be printed on a mouse pad. Indeed, mouse pads with certain maps pre-encoded thereon may be suitable as promotional materials. A company may offer to print a family photograph on such a pad. Encoded within the photograph or the pad texture are addresses of web sites that have paid a fee to be accessible in this manner on a user's desk.

In this and other contexts, it will be recognized that the gestural input concepts detailed earlier involve relative movement between the sensor and the encoded object. In most of the earlier examples, the sensor is stationary, so gesticulation is effected by moving the object. Naturally, if the sensor is moveable (e.g., as a mouse or cell phone), the gestural movement can be effected by moving the sensor instead.

One particular embodiment of the arrangement detailed above is a modified version of the Microsoft IntelliMouse with IntelliEye technology. That device includes a multi-element optical sensor integrated on an IC with various detector and processing circuitry, operating in conjunction with a short focal length imaging lens and an LED illumination source (all available from Agilent, as detailed below). The circuitry tracks movement of patterns across the sensor's field of view, by which the mouse's movement can be deduced. The Microsoft product collects 1500 data sets per second—a frame rate much higher than is generally needed for the present applications. Some such embodiments combine the functionality of a mouse with that of a Bedoop image sensor.

Such a mouse-like peripheral can omit the buttons and position-sensing features commonly provided on traditional mice, yielding a simple desk-facing palm camera that generates frames of data corresponding to a small area under the sensor portion of the mouse. More typically, however, the peripheral includes the buttons, roller wheels, and/or X-/Y-position sensing arrangements of traditional mice so that button and positional forms of data input can be exploited in interacting with the Bedoop application.

The optical data collected by the sensor can be processed within the peripheral's processor to extract the steganographically encoded binary Bedoop data therefrom. Or this processing burden can be undertaken by the associated computer system, with the peripheral simply processing and formatting the raw sensor data into sequential frames of image data to be output to that system.

While scanning peripherals of the type described above are typically wired to an associated host system, wireless links (e.g., radio, infrared, ultrasonic, etc.) can of course be used, freeing the user from the constraint imposed by the cable.

Hand Scanners—More

To elaborate on the concepts introduced above, the following paragraphs particularly detail a hand scanner modeled after the Hewlett-Packard CapShare 920. The scanner may be configured for use with any type of identifier, e.g., watermark, barcode, OCR, etc.

The reader is presumed familiar with the workings of the HP CapShare scanner. Such information has been published in the technical literature, e.g., Allen, Ross R. et al, "Processes for Freehand Image Capture: HP CapShare Technology," The Society for Imaging Science & Technology PICS Conference, pp. 43-46, Mar. 26, 2000. The CapShare scanner employs an optical sensor tracking engine assembly, comprised of part Nos. HDNS2000 (IC sensor chip), HDNS-2100 (lens with light pipe), HDNS-2200 (LED clip), and HLMP-ED80 (639 nm LED), the use of which is detailed in Agilent Application Note 1179, all available from Agilent Technologies, Palo Alto, Calif.

Figure 13:
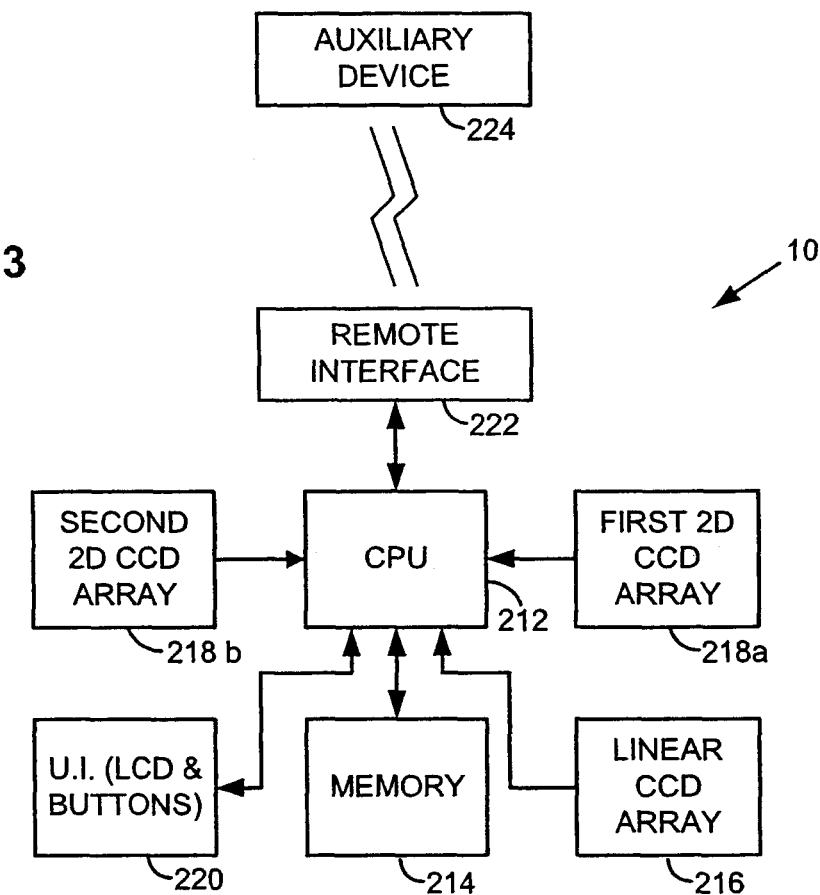
FIG. 13 is a block diagram of a prior art scanner.

As shown in FIG. 13, the CapShare scanner 210 functionally includes a CPU 212, a memory 214, a linear CCD array 216, first and second 2D CCD arrays 218a, 218b, a user interface (including an LCD screen and associated buttons) 220, and an interface 222 (e.g., a serial port and an IRDA port/transceiver) to an auxiliary device 224. Although not particularly shown, each of the CCD sensors has an associated LED system for illuminating the object being imaged.

A further enhancement to the CapShare scanner is to provide a wireless internet interface for interface 222, permitting direct communication between the device 210 and the internet.

The linear sensor 216 operates in a conventional manner, acquiring successive pixilated line-scans of imagery under the scanner at a pixel data rate of about 18 Mbits/second (permitting full accuracy scanning even at instantaneous scanner motion speeds of up to 16 inches per second).

The two 2D CCDs 218a, 218b, are spaced apart, adjacent the linear sensor, and are used to track the scanner's movement. The areas scanned by these CCDs are illuminated obliquely by IR light, highlighting microscopic media surface features. The CPU identifies patterns in the surface features detected by each of these CCDs, and tracks their movement from one frame to the next to discern the movement of the two CCDs. By knowing the movement of the two CCDs, the movement of the scanner itself can be determined. This scanner motion information is used to re-map the swathed scan data acquired from the linear scanner array into composite pixel data with uniform scanline spacing. This remapped data is the final scan data that is typically provided to the end user or application.

The sizing of the linear and 2D CCD arrays is left to the designer. If 600 dpi line scan resolution is desired across a four inch scan swath, a 2400 element linear CCD would be used. The 2D CCDs are typically smaller in extent, e.g., having an aperture of 0.25 inches×0.25 inches. The spacing of the CCD elements is selected based on the size of surface features to be tracked.

The memory 214 includes both RAM and ROM. The RAM is used both for raw data storage, and for storage of final results. The scanner's operating system, pattern matching and data processing algorithms, and other program code are stored in the ROM.

In accordance with the illustrated embodiment, the ROM code also includes instructions for examining the final-result scan data (i.e., after re-mapping) for watermark data. In one particular embodiment, this is a two-step process. The final-result data is first screened by the CPU to determine whether it has certain hallmarks associated with watermarked data (e.g., the presence of a calibration signal, as detailed in U.S. Pat. No. 5,862,260). If such hallmarks are found, a more computationally-intense watermark decoding algorithm is performed. By checking for watermark information in such a two-step process, CPU time isn't spent needlessly trying to extract a watermark from image data that apparently has no watermark.

In some embodiments, the watermark processing operation(s) occurs without user intervention—each time the raw scan data is processed and remapped into final-result form. In other embodiments, the watermark processing is invoked in response to a user command entered through the user interface 220. In still other embodiments, the watermark processing is invoked in response to a command provided to the scanner from an associated auxiliary device 224 (e.g., a local personal computer, a remote server computer, a specialized internet appliance, etc.).

In some embodiments, the decoded watermark payload data is transferred to an associated auxiliary device whenever such data is detected. In other embodiments, the data is not sent unless the auxiliary device 224 first asks for it. Such an auxiliary device request may be made by a software program that is executing on the auxiliary device, e.g., through an API call.

A watermark decoded by the scanner can be presented to the user on the scanner's LCD display 220. Or the scanner can forward the decoded watermark to a remote device 224, which can then reply with supplemental data for presentation to the user, as detailed elsewhere in this specification.

In some embodiments, the information obtained by the 2D CCDs 218a and/or 218b can be used to augment the information provided to the CPU so as to aid in the watermark detection/decoding process. For example, the 2D sensors provide 2D information immediately—without the time delay associated with remapping the 1D data from the linear CCD array into final form. This immediate 2D information may be analyzed for the presence of a calibration signal—perhaps shortening or obviating analysis for the calibration signal in the final data.

The 2D data can also be used to characterize the texture of the imaged substrate. Knowing the substrate texture allows the CPU to apply filtering or other watermark-enhancing/image enhancing steps as best fits the particular circumstance.

Figure 14:
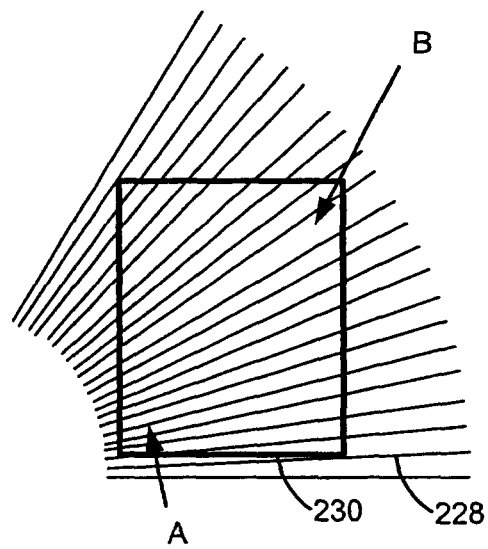
FIG. 14 shows an object being scanned along an arced path.

The 2D data also allows the CPU to assess the relative quality of different regions of line-scan data in the final scan data. In FIG. 14, an object 230 is scanned by a scanner 210 traveling an arced path, yielding successive lines of raw scan data 228. The geometry of the arc is revealed by data collected by the two 2D CCDs (which serve as motion encoders). Where the successive lines are spaced closer together (as at region A), the raw scan data is of higher resolution (relatively "oversampled"). In contrast, where the successive lines are spaced further apart (as at region B), the raw scan data is of lower resolution (relatively "undersampled"). In its screening or analysis for subtle watermark data, the CPU can be instructed to look first in region A, reasoning that the higher quality of the raw data in this region is most likely to include usable watermark information. (In some embodiments, watermark screening and/or detection may proceed by reference to the raw scan line data, rather than waiting for the data to be remapped into final form.)

Figure 15:
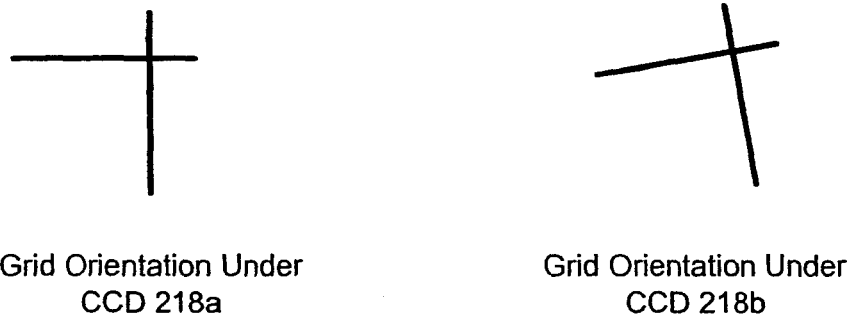
FIG. 15 shows how object warping may be detected.

The two CCDs 218a, 218b also permit various binocular processing to be performed so as to enhance, or allow for more intelligent processing, of the linear scan data. Consider, for example, the case where the image being scanned doesn't convey a perfectly planar (e.g., rectilinear) signal. The substrate could be warped, or the image may have been printed in a skewed manner, or some other transformation may have taken place that creates an image that changes orientation/scale over its extent. One such example is shown in FIG. 15, which depicts a watermark calibration signal (here presented as an overt grid, for clarity of illustration). Each of the two 2D CCDs 218a, 218b senses a differently-oriented calibration signal. By reference to differences in the data sensed by the two spaced-apart CCDs, the CPU can infer scale, rotation, or other image transformation at intermediate points, and apply a compensation to the scan data so as to counteract such distortion.

Such compensation need not be based on a watermark calibration signal. Any other optically-sensed attribute at the two spaced-apart points may be used to infer the same, or related attributes, at intermediate positions, permitting appropriate compensation(s) to be applied.

Figure 16:
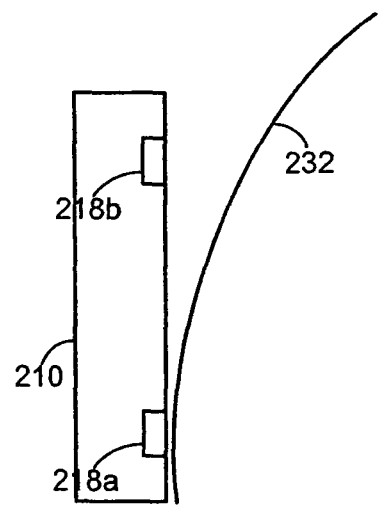
FIG. 16 shows use of binocular processing to determine certain object attributes.

Another application of the spaced-apart sensors 218 is to bi-optically determine the distance from the scanner to the object being imaged. Consider FIG. 16, which shows a scanner 10 with two spaced-apart CCD sensors 218a, 218b, imaging a warped object 232 (e.g., a warped paper substrate, or a curved object such as a drink can). In the depicted example, the first CCD 218a detects a very crisp image of surface texture or imagery, whereas the second CCD 218b detects an image similar to the first CCD, but blurred—as if low-pass filtered. Software instructions for CPU 212 can cause the scanner to recognize that the part of the object 232 under CCD 218a is immediately adjacent the scanner (and adjacent the nearby portion of the linear CCD array 216), whereas the part of the object under CCD 218b is spaced somewhat from the scanner.

Having information about the spacing of the object 232 from different parts of the linear sensor array permits certain compensations to be made in the data collected by the linear scanner. In the case of watermark detection, the CPU may recognize that data from the end of the linear scanner 216 remote from the object 232 will be devoid of meaningful high frequency information. In many watermark detection algorithms, the CPU can disregard data from such portion of the linear scanner—allowing it to focus on portions of the image data with the necessary high frequency components, thus producing more reliable results more quickly.

In other watermarking systems, two watermarks may be present—one conveyed in reliance on high frequency image components, and another encoded mostly with low frequency image components (i.e., in anticipation of circumstances where the object is imaged slightly out-of-focus). Upon recognizing that the linear scan data is weak in high frequency components, the CPU can be programmed to look just for the low frequency watermark data.

Just as the scanner 210 can perform watermark decoding, it can similarly perform barcode decoding. Conventional pattern-recognition algorithms can be applied by CPU 212 to either the raw or final scan data to identify barcode patterns. Once the pattern is identified, decoding is straightforward by applying known barcode alphabets. As in the watermark case, barcode decoding can be performed autonomously, or in response to user/auxiliary device command. Similarly, the decoded barcode data can be provided to the auxiliary device whenever detected, or in response to an auxiliary device query. The 2D data can likewise be used to augment the information provided to the CPU so as to aid in the barcode detection/decoding process.

In similar fashion, the above-described benefits associated by use of the two 2D CCDs can similarly be applied in the barcode context.

As earlier described, once the identifier information is extracted from the image data, internet links can be based thereon to provide supplemental information, e-commerce opportunities, etc. In many implementations, the scanner UI 220 is used to present this supplemental information to the user, e.g. by software instructions that render HTML instructions for presentation on the UI display screen. The UI controls (e.g., buttons) can likewise be used to receive user instructions and commands, for linking back to the internet.

Cell Phones as Bedoop Devices: GPS Receivers

Bedoop technology can be integrated into portable telecommunication terminals, such as cell phones (manufactured, e.g., by Motorola, Nokia, Qualcomm, and others). Such a phone can be equipped with a 1D or 2D image sensor, the output of which is applied to Bedoop decoding circuitry within the phone. This decoding circuitry can be the phone's main CPU, or can be a processing circuit dedicated to Bedoop functionality. (In this as in other embodiments, the decoding can be effected by dedicated hardware, by decoding software executing on a general purpose CPU, etc.)

Cell phones are already equipped with numerous features that make them well suited for Bedoop operation. One is that cell phones typically include an LCD or similar screen for display of textual or graphic information, and additionally include buttons or other controls for selecting among menu options presented on the screen (e.g., by moving a cursor). Moreover, cell phones naturally include both audio input and output devices (i.e., microphone and speaker). Still further, the protocol by which cell phones transmit data includes data identifying the phone, so that such data need not be separately encoded. And finally, cell phones obviously provide ready links to remote computer systems. Collectively, these capabilities rival those of the most fully-equipped desktop computer system. Thus, essentially all of the applications detailed elsewhere in this specification can be implemented using cell phone Bedoop systems.

As with the other Bedoop systems, when Bedoop data is sensed, the phone can respond to the data locally, or it can forward same over the cellular network to a remote system (or computer network) for handling.

One application that may be invoked locally (i.e., within the phone) is the dialing of a corresponding telephone number. In some embodiments, the phone number is literally encoded as part of the Bedoop data payload. In others, the phone number is stored in a memory within the phone, and indexed in accordance with an identifier decoded from the Bedoop data.

The variety of operations that can be handled remotely is virtually limitless. Some entail interaction with the user. For example, the remote system may initially respond by presenting to the user a menu of options on the display screen (e.g., Purchase, Add to Shopping List, Request Sample, Add to Notepad, etc.) The user then responds by providing further input (e.g., by manipulating one or more buttons on the phone, by providing spoken instructions to a voice recognition sub-system within the phone, etc.). This further data is then dispatched from the phone, and the requested action undertaken. Other operations don't require further interaction with the user, but immediately invoke a corresponding action.

While the just-described arrangement included the Bedoop decoding function within the phone, in other embodiments the image data can be transmitted from the phone and decoded at a remote location.

Reference was earlier made to GPS receivers as permitting the location of a person to be tracked, and contact information updated accordingly. GPS receivers find many other applications in Bedoop contexts. For example, the response of a Bedoop system can be tailored, or vary, in accordance with the location of the person invoking the operation. To illustrate, if a user presents a newspaper insert or coupon for a Dominos pepperoni pizza meal to the Bedoop sensor on a GPS-equipped cellular phone, the GPS data can be encoded in the Bedoop data dispatched to the Domino's Bedoop server. That server can identify, by reference to the GPS data, the location of the nearest Domino's franchise, and can forward the order to that franchisee. The franchisee, in turn, can telephone the user (by reference to telephone number data from the cell phone) to confirm the order, inquire if additional items are desired, inform the user of the final price, and to obtain the delivery address. (The latter step can be omitted; the franchisee can employ the GPS data to obtain the corresponding street address, e.g., from map data licensed through NavTech of Chicago.)

The protocols by which the Bedoop data, GPS data, and cell phone identification data are conveyed from the phone to the cellular network can take various forms; the design of such systems are familiar to those in the relevant arts. In one embodiment, the protocols by which some cell phones are now provided with email or internet access are further adapted to convey Bedoop and GPS data. The protocols for conveying telephone identification data are already well established. Once received by the cellular network, the Bedoop data can be formatted into packets, either incorporating the GPS data and telephone data into the same packet structure, or by formatting such data into separate packets accompanying the Bedoop packets.

The provision of image sensors in cell phones enables other functionality. One is the capture of still or video imagery. Such image data can be compressed (typically by lossy processes such as MPEG, JPEG, or the like, implemented with dedicated hardware CODECs) and transmitted with the audio data. The screens on such phones can likewise be used for display of incoming image or video data.

Another function enabled by image sensors in cell phones is user-verification, e.g., by retinal scanning or other optically-sensed biometrics, before the phone will permit a call to be placed. A great number of such biometric verification techniques are known.

Cell phone Bedoop sensors may not always be in communication with the cell phone network. The phone may be out of range of a cell site, or may be in operational mode in which an RF link is not then established. In such events, any Bedoop data sensed by the phone that is to be handled remotely is desirably stored locally within the phone, and queued for transmission to the cellular network the next time communication is established (a so-called "store and forward" form of operation).

Catalog Advertising

Any form of hand-held scanner—whether of the type just described or others known in the art—offers a convenient way to interact with catalog advertising. Imagine a traditional paper catalog, e.g., from L.L. Bean, Inc., or Lands End. Each image in the catalog is Bedoop-encoded with a code that identifies the depicted product (and, if necessary, the manufacturer, etc.). A user browsing through the catalog, on seeing a product of interest, places the scanner over the picture (and optionally may be required to push a button or otherwise signal to initiate further processing). The scanner detects the Bedoop data and relays it to an associated computer (optionally with data identifying the consumer). The computer polls a remote server computer maintained by the merchant, which responds with data corresponding to the item depicted in the scanned image. This returned data can include data indicating the sizes available, data indicating the colors available, data indicating the variant styles available, flag bits indicating whether each item is in stock, etc. This returned data can be presented to the consumer—typically on a display device but alternatively in audible form.

Preferably, the customer's body measurements (waist size, inseam length, neck size, etc.) are stored in a user profile, either on the local computer, at the merchant's server computer, or at the computer of a third party service provider. This allows the system to customize the data presented to the user—e.g., showing the color options and availability only for the depicted shirt in a 16 inch neck and a 34 inch sleeve length.

If necessary, the user can select among the color or style options, using the handheld input device (either buttons, gestures, etc.), or any other input device. Or the item may be one for which no further specifications are needed. In either event, once the desired product has been sufficiently specified, the user can signal the system to place the order. Payment and shipping details can be arranged through any of the great variety of techniques known in the art, e.g., by charging to a credit card number and shipping to an address on-file with the merchant.

Revenue Sharing

When a consumer presents a Bedoop-encoded object to a sensor, and as a result of the link(s) thereby established, purchases a product or service, the revenue from that transaction may be shared with the participants who made it possible. In the case of a Bedoop-encoded magazine ad, some of the participants may include (1) the photographer or graphic designer who produced artwork used in the ad; (2) the advertising agency whose creative talent led to the ad; (3) the publisher of the magazine in which the consumer encountered the ad; (4) the service provider(s) who provided the transport channel(s) between the consumer and the vendor; and (5) the service provider who maintained the server that ultimately linked the Bedoop data to the vendor's web site.

Gambling Applications

Casinos around the world deploy considerable resources each year to deter cheating. To that end, playing cards and chips used for gaming and betting could be encoded with digital watermarks and used to enhance security. In order for the application to work, playing cards and chips would be encoded with data unique to each casino, game, card deck and/or face value. Then, cameras placed above gaming tables would be used to read the information off the cards and chips. The information from the cards could be used to alert security or keep records of suspicious activity in the following ways.

A camera placed above a card gaming table (like Blackjack) could read the data encoded in the backs of the cards determining the authenticity and face value of those cards. This means the camera could catch anyone trying to replace cards after they were dealt—either by flagging cards as not being part of the deck currently in use or by flagging them as being a different face value than those dealt to the player. If a player switches cards after they are dealt, the watermark reader in the camera can alert security of the fraudulent activity.

Additionally, the data encoded in the cards can be used to track the winner(s) at the table. If the dealer and the player are in collusion, that player may be dealt winning cards on a regular, predetermined basis (based on tricky shuffling by the dealer). By watching the pattern and face value of cards that are dealt, it can be determined if a player wins at a much higher than average rate. Again, security personnel can be alerted to suspicious activity.

Cameras placed above gaming tables where chips are used (certainly not limited to card games) can be programmed to watch for watermarks in chips. Any chip that does not include the appropriate watermark can signal that a chip might be counterfeit. In another situation, the face value of the chips can be determined as they are placed on the table such that any switching of the chips after play begins will be noted.

The foregoing principles are more generally applicable to monitoring and surveillance systems employing digital watermark technology to identify monitored objects.

Part II

As noted, the following disclosure focuses on one particular application—a system for linking print media to electronic content. It should be reiterated, however, that the technology is not so limited, and may more generally be viewed as a system for linking any object (physical or electronic) to a corresponding networked or local resource.

In accordance with an exemplary application of the below-detailed technology, digital watermarking is employed to convey a plural bit identifier within print media, such as magazine advertisements or articles, direct mail coupons or catalogs, bank- or credit-cards, and business cards. This identifier is read by software in a user's computing device and forwarded to a remote database. The remote database identifies a URL corresponding to the identifier, and provides the URL back to the user's computer—permitting a browser on the user's computer to display the URL-identified web page. That web page can provide additional information or services—more timely and/or more extensive than that provided by the print material. By such arrangement, more efficient internet navigation and access is provided to consumers, and more effective means for linking readers to e-commerce points of sale is provided to advertisers.

Before beginning a detailed exposition, it may be helpful to provide an overview of the larger system of which the present technology forms a part. As shown in FIG. 1, the larger system entails four basic processes—registering, embedding, detection and response.

Registering refers to the process of assigning an ID to an object, and associating that ID with a corresponding action or response. Additional steps can be included, such as logging the name and/or organization of the registrant, the name of the product, a description of the object and a context in which it is found (magazine, book, audio track, etc.), etc.

Embedding refers to the process of encoding of an object with a digital identifier (e.g., a watermark conveying a serial number in its payload).

Detection is the complementary operation to embedding, i.e., discerning a digital identifier from an object.

Response refers to the action taken based on the discerned identifier.

The middle two steps—embedding and detection—can employ any of myriad well-known technologies, including 1D and 2D barcodes, magnetic ink character recognition (MICR), optical character recognition (OCR), optical mark recognition (OMR), radio frequency identification (RF/ID), data glyphs, organic transistors, magnetic stripe, metadata, file header information, UV/IR identifiers, and other machine-readable indicia and techniques for associating plural-bit digital data with an electronic or physical object. The detailed embodiment employs watermarking technology, although this is illustrative only.

Figure 2:
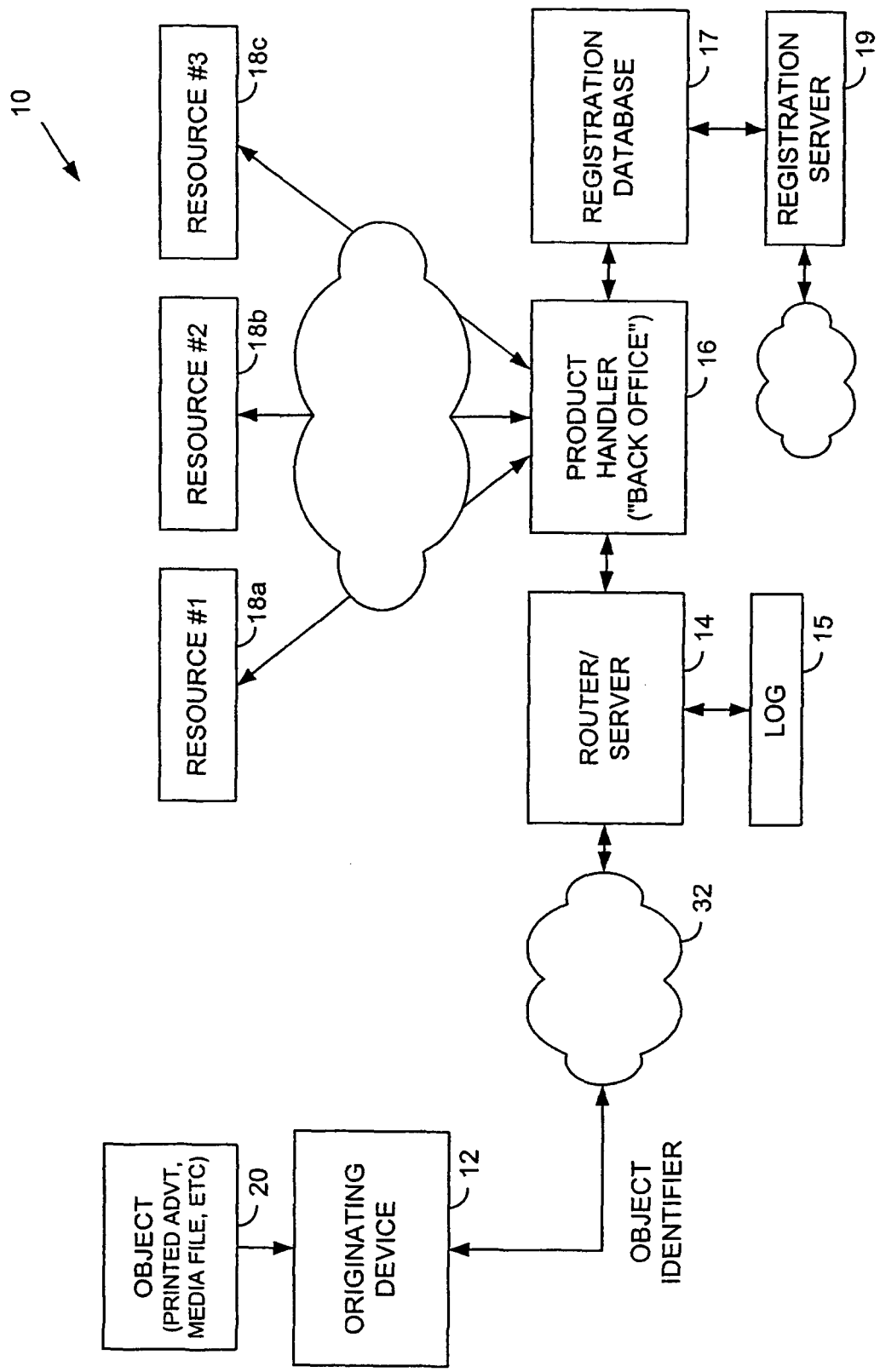
FIG. 2 is a block diagram showing an illustrative system for performing the response process of FIG. 1.

Referring to FIG. 2, a system 10 according to the exemplary embodiment includes an originating device 12, a router/server 14, a product handler 16, a registration database 17, and one or more remote resources 18.

The originating device 12 can take many different forms, e.g., a cell phone, a personal digital assistant (e.g., a Palm Pilot), a personal computer, a barcode scanning system, etc. For expository convenience, the embodiment is described with reference to a personal computer for device 12.

Device 12 interacts with an object 20. The object can be electronic or not. Electronic objects 20 can include computer files, representations of audio, video, or still imagery (e.g., files or in streaming form), etc. Non-electronic objects can include physical objects such as newspapers, magazine pages, posters, product packaging, event tickets, credit cards, paper currency, etc. Non-electronic objects can also include sounds produced by loudspeakers.

When used with non-electronic objects, device 12 (FIG. 2) typically includes some form of sensor or transducer 22 to produce electronic signals or data corresponding to the object. Examples include CCD- or CMOS-based optical sensors (either as part of still- or video cameras, flatbed scanners, mice, or otherwise), microphones, barcode scanners, RF ID sensors, mag stripe readers, etc. In such cases, the sensor 22 may be coupled to associated interface electronics 24, which in turn may be coupled to device driver software 26, which in turn may be coupled to one or more application programs 28. Device driver software 26 serves as a software interface, communicating at a relatively high level with the application programs 28 (e.g., through API instructions whose content and format are standardized to facilitate application programming), and at a relatively low level with the interface electronics 24.

The detailed embodiment contemplates that the object 20 is a magazine advertisement encoded with a steganographic watermark conveying a plural bit object identifier. The watermark is hidden in the advertisement's image in a manner indiscernable to human observers, but detectable by computer analysis. That analysis is performed by a watermark detector 30.

Watermark detector 30 can be implemented in various different locations in the system of FIG. 1. Typically, the detector is implemented in the originating device 12, e.g., in the driver software 26, or in application software 28c that serves to link to external resources based on detected watermarks. But it may be implemented elsewhere, e.g., in hardware in the interface electronics 24, in an operating system associated with the device, or outside device 12 altogether. Some systems may have plural watermark detectors, implemented at different locations throughout the system.

In an illustrative system, the watermark detector is implemented in the device driver 26. Functionality of the detector is made available to the application program 28c through one or more APIs specific to watermark-related functions. One function is reading of the watermark data payload from the object 20.

The illustrated application 28c is a software program that serves to communicate the watermark data from the device 12 to the router/server 14 through one or more communications links 32 (e.g., the internet). Application 28c also receives information from the communication links 32 and presents same to the user (or otherwise uses same).

The router/server 14 is a high capacity computer including one or more CPUs, memory, disks, and I/O ports. As is familiar to artisans, the disks store operating system software and application programs, together with data, that are transferred to the memory as needed by the CPU. The router essentially serves as a middleman between the application 28c and the product handler 16. As detailed below, the router receives requests from the application, logs them in a transaction log 15, and passes them on to the appropriate product handler.

As more particularly detailed below, the handler 16 provides a response in accordance with the particular watermark payload. The response may be provided directly by the product handler to the device 12, or the handler may respond by communicating with a remote resource 18 (which may be, e.g., a data repository or service provider).

In the former case, the handler 16 may identify a URL corresponding to the watermark (using the database 17), and return the URL to the application 28c. Application 28c can then pass the URL to a web browser 28b in the device 12, and initiate a link to the internet site identified by the URL. Or the handler may have some locally stored data (e.g., audio or video, or software updates) and send it to the device 12 in response to the watermark.

In the latter case, the handler 16 does not respond directly to the device 12. Instead, the handler responds by communicating with a remote resource 18. The communication can be as simple as logging receipt of the watermark message in a remote repository. Or it can be to authenticate device 12 (or a user thereof) to a remote resource in anticipation of a further transaction (e.g., the communication can form part of an on-line licensing or digital rights management transaction). Or the communication can request the remote resource to provide data or a service back to device 12 or to another destination (e.g., to initiate an FTP file transfer, or to request that a song selection identified by the watermark be downloaded to a user's personal music library, or to update software installed on device 12).

In still other cases, hybrids of the two foregoing cases can be employed, e.g., handler 16 can send some data back to device 12, while also communicating with a remote resource 18.

In some cases, the response returned to the device 12 by handler 16 (or a remote resource 18) can serve to trigger some further action by the device 12. For example, the response returned to device 12 can include a WindowsMedia audio file, together with a request that the device 12 launch the WindowsMedia player installed on the device. (The launching of a browser pointed to a URL is another example of such triggering.)

The illustrated product handler 16 comprises essentially the same hardware elements as the router 14, e.g., CPU, memory, etc. Although FIG. 2 shows just one product handler, several product handlers can be included in the system—either co-located or geographically distributed. Different handlers can be dedicated to different functions (e.g., serving URLs, serving music, etc.) or to different watermark sources (e.g., one responds to watermarks found in audio, another responds to watermarks found in print advertising, etc.). Further specialization may also be desirable (e.g., one handler may respond to advertising placed by Ford, another may respond to advertising placed by Chevrolet; or one handler may respond to advertising appearing in Wired magazine, another may respond to advertising appearing in Time magazine, etc.). In one particular implementation, the router 14 dispatches the incoming data to one of several handlers in accordance with (1) the vendor of the originating application 28c, and (2) the particular identity of the application 28c.

The following discussion focuses on the data exchanged between the application 28c, the router/server 14, the product handler 16, and the associated protocols, in one illustrative embodiment.

Concept of Operation

When shown a watermarked image, the application 28c analyzes the image and extracts the embedded watermark payload (more particularly detailed below) from the image. The application sends some or all of this information in a message format to the router 14.

The router 14 decodes the received message, looking for vendor and product information. Based on this information, it passes the message to a corresponding product handler 16.

The product handler receives the message and attempts to match the detected watermark serial number to a registered watermark serial number earlier stored in the database 17. If a match is found, the product handler performs the desired action. As noted, typical actions include returning a URL for web redirection, serving up an HTML page for initial user navigation, initiating software downloads, etc. If a match is not found, the product handler returns an error code and message to the application 28c. If a match is found, but the corresponding action is unavailable, incomplete, inactive or invalid, the product handler returns an error code and message to the calling application.

Figure 4:
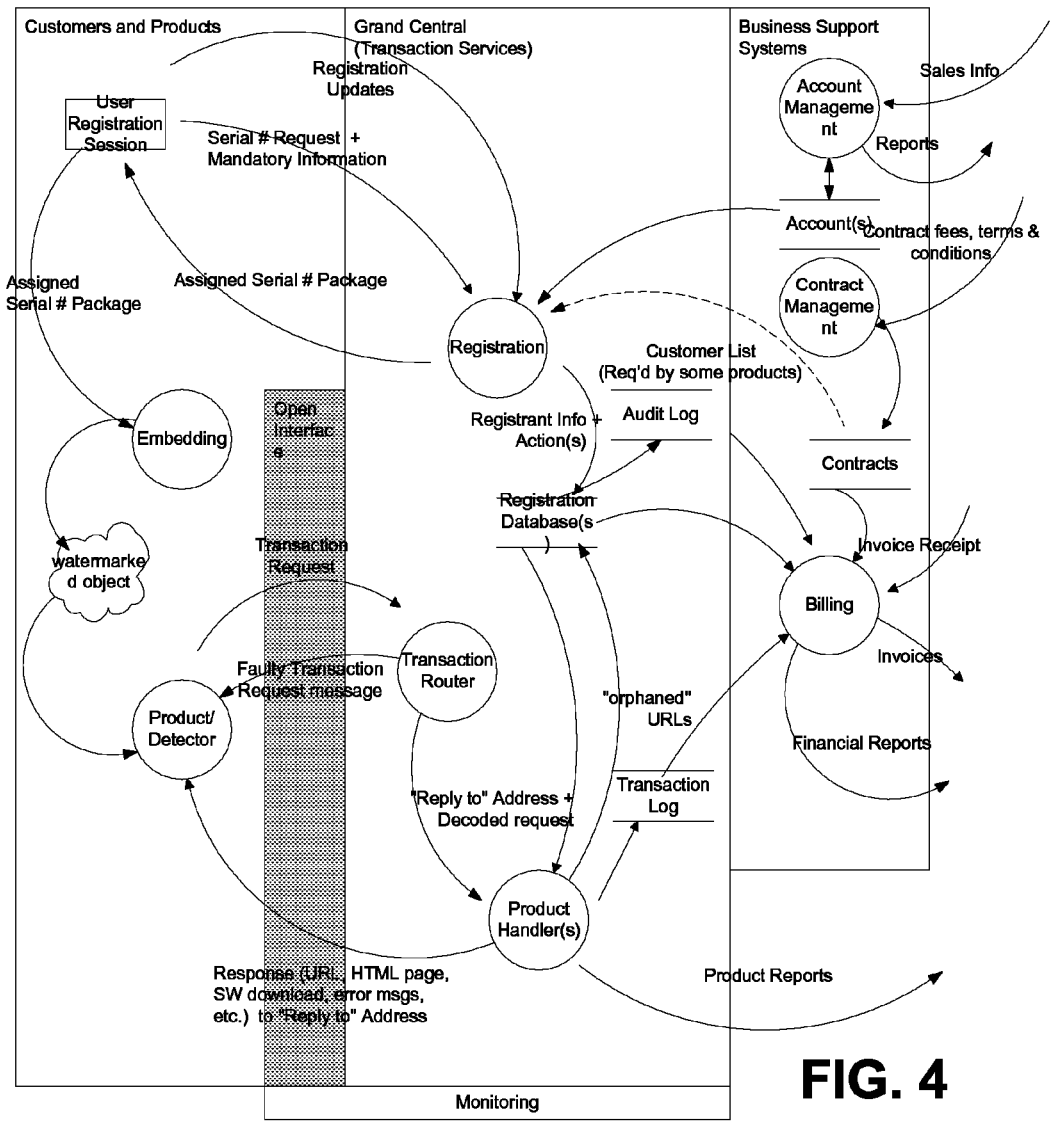
FIG. 4 illustrates certain top level data flows in the system of FIG. 2.

A generalized view of the foregoing is provided in FIG. 4.

(Note that while the system may concentrate on a certain type of object 20, and a certain vendor's application 28c, the architecture is constructed to support accessing product handlers from other vendors and corresponding to other objects. This concept makes the system suitable as a clearinghouse for processing all machine-readable indicia on web-enabled devices.)

An exemplary detection and response cycle is illustrated below.

| User | Application | Router | Product Handler |
|---|---|---|---|
| Shows object to sensor 22 | | | |
| | Acquires watermark<br>Creates message packet<br>Sends packet to product handler | | |
| | | Receives message packet<br>Logs transaction<br>Decodes packet<br>Identifies product sending packet<br>Passes packet to Product Handler corresponding to product | |
| | | | Logs received packet<br>Validates packet serial number<br>If not found, returns error packet to application<br>Else, returns packet with data/action back to application (e.g., URL) |
| | Receives packet<br>If error, display error message<br>Else, display data or perform the requested action (e.g., launch browser and link based on received URL) | | |
| Sees the data/action associated with the object (e.g., views web page) | | | |

The present system generalizes this example to support any product from any vendor that is capable of sending a message via the Internet that complies with the expected request format (e.g., a product code, message type, and identifier) and receiving a message in a corresponding response format. One set of message formats suitable for use in such a system are described in more detail below.

Watermark Registration—the First Step in the Process

In order for the system to identify the response (e.g., a URL) that corresponds to an object identifier (e.g., a watermark), this data must first be associated within the database 17 in association with the watermark to which it corresponds. The watermark registration process captures some basic identification information used later to validate the incoming message, and identifies the associated information/action. In the illustrated example the identification information includes:

Customer Account,
Object and associated attributes (name, description, expiration, etc.),
Action, and
Registered Serial Number (for registration updates)

The Customer Account identifies the watermark registrant. In most cases, this is also the party to be billed for services. For validation and security reasons, the Customer Account is required to be a known, existing account. Account information, including the account's password, is maintained by an Account Management system.

The Object and associated attributes identifies the object to be watermarked. The object attributes typically include the name and description of the object and a list of accounts authorized to access the object's registration. These authorized "supporting" accounts are typically the ad agencies, pre-press houses, etc. involved in the watermark embedding process in the print advertising example contemplated herein.

The Action defines the response the customer desires when the watermark is detected. It varies by product, but in the illustrative embodiment involves the return of some additional information regarding the watermarked object. In the illustrative system, the action is return of a URL or HTML to be used to display a web page associated with the watermarked object. For other products, the desired response may be display of the object's owner & rights information, software/data downloads, delivery of streamed audio or video, presentation of an advertisement, initiation of object-based actions, etc.

The Registered Serial Number forms the last component of the registration. It is this assigned vendor and product-unique identifier that allows the system to acquire the specific information/action for the object in question.

A Few Key Product Registration Concepts—

Watermark Registration is a Product-Specific Process—

To allow each of the products the freedom to upgrade their capabilities without impacting any other product function or schedule, the registration process is product-specific.

Watermark Registration is Web-Enabled—

The exemplary registration is a web-enabled process that requests the basic identifying information from the object owner (publisher, ad agency, studio, etc.) and returns to the registrant a packet with a unique identifier to be embedded within the object. A watermark embedding application (i.e., software) uses this packet to embed the watermark type and serial number within the client's object. In the illustrative system, only one watermark may be embedded within a single object. In other embodiments, multiple watermarks may be embedded into a single object.

When a customer registers a watermark, the system associates the watermark serial number with the information provided by the customer during the registration process. The associated information may vary with different products. One set of associations, for the exemplary magazine advertisement objects, is shown in the following table:

TABLE 1

Registration Database Elements

| Mandatory? | Information | Comments |
|---|---|---|
| Mandatory | Customer | Typically, the publisher |
| Mandatory | Publication(s) | Magazine(s) containing the ad |
| Mandatory | Issue Date | First date of the magazine/publication period |
| Optional | Volume | Magazine/publication volume information |
| Optional | Region Code | Optional information for regional publications |
| Optional | Location Code | Location of the object within the publication (e.g., page and, optionally, finer location data) |
| Mandatory | Watermark Type | Watermarks may have varying type. The type defines how to interpret the Serial Number |
| Mandatory | Serial Number | Assigned watermark number |
| Mandatory | Object Name | Customer's name for the object |
| Mandatory | Object Description | Customer's textual description of the object |
| Mandatory | Object Type | Ad or Editorial (and in other systems: Direct Mailer Card, Product Packaging, Coupon, Catalog, Business Card, Credit Card, etc.) |
| Optional | Campaign | For ads and promotions, the campaign name |
| Optional | Object size | Stated in fractions of the page (full page, half, etc.) |
| Mandatory | Effective Date | Date on which the user will first be able to initiate any actions. For publications, typically this is the "on stand" date |
| Mandatory | Expiration date | Date/time when the watermark expires |
| Mandatory | Primary Action | Initially the URL used for redirection |
| Mandatory | Primary Effective | Date the Primary action becomes effective |
| Mandatory | Primary Expires | Date the Primary action expires |
| Optional | Default Action | Reserved for future use (e.g., backup to the Primary action) |
| Optional | Default Effective | Date the Default action becomes effective |
| Optional | Default Expires | Date the Default action expires |
| Optional | E-mail address | Used to automatically notify the Customer of problems with the registration/Action |
| Mandatory | Status | Incomplete, active, inactive |
| Optional | Problem Indicator | Bad URL, slow site, etc. |
| Optional | Supporting Accounts | This field and its sub-fields are repeated for each supporting account |
| Optional | User Fields (4) | |
| Optional | Text | User Field free text |
| Optional | Viewable by Others? | Y/N. N hides the field form any other accounts |

Watermark Registrations Expire—

For some products, watermarks are granted only for a limited period of time. For these watermarks, the Registration process employs an expiration date for the assigned serial number. When the system receives a message requesting action for a serial number that has expired, an error is returned. Registrants may extend their watermark serial number expirations by updating the expiration date. Expiration extensions may result in customer charges.

Watermark Registration can be Completed in One or More Web Sessions—

Registration can be a single or multi-step process. If the media owner has all of the required information at the start of the process, the system can provide a simple web-enabled method for requesting a watermark serial number(s) on-line. With all of the information provided, the registration is considered "active." That is, it is available for immediate use by the consumer. If the registrant does not have all of the required information available at the initial session, by providing a minimum set of information (e.g., name and/or organization name+product), a product watermark serial number may still be issued for the registrant to use in the embedding process. The most typical use of this partial registration occurs when the actions associated with the media to be watermarked (e.g., URL, etc.) are not yet known. The partially registered serial number is considered "inactive" until all of the required registration information has been completed. The system will issue an error message if requested to process an "inactive" serial number. Whether active or inactive, these registrations may be considered billable items subject to the terms and conditions of the applicable contract(s).

Registrations can be updated by the customer to reflect new information and/or to complete a previous registration session. For example, a registered customer may request a watermark serial number without specifying the URL used to redirect the consumer. The system will assign a serial number so that the customer can continue with the embedding process, but the registration will not be considered complete until the customer updates the registration with the URL and any other mandatory information regarding this serial number.

Watermark Registrations are Secure—

Only the registrant and those accounts that the registrant authorizes can access specific watermark registrations.

In the illustrated system, the customer account that registers a watermark may grant permission to a specific ad agency and/or pre-press house to change certain fields within the registration as a normal part of their work. Each customer, agency and pre-press house needs an account on file to be granted access to watermark registrations. The Customer account is established as part of the contract process. For ad agencies and pre-press houses, the accounts are established on an as-needed basis, through a controlled web site accessible to the customer.

For all products, the same basic tenet holds—access to the registration information is limited to only explicitly authorized accounts. Accounts are password protected. For ad agencies and pre-press houses, a single password may be shared. In other embodiments, each part may be assigned a unique password.

Watermark Registration Changes are Logged—

All registration actions—creation, modification and deletion—are logged in an audit log. The authenticated username, the date/time of the action, and the action itself are all stored to provide a complete audit trail.

Figure 6:
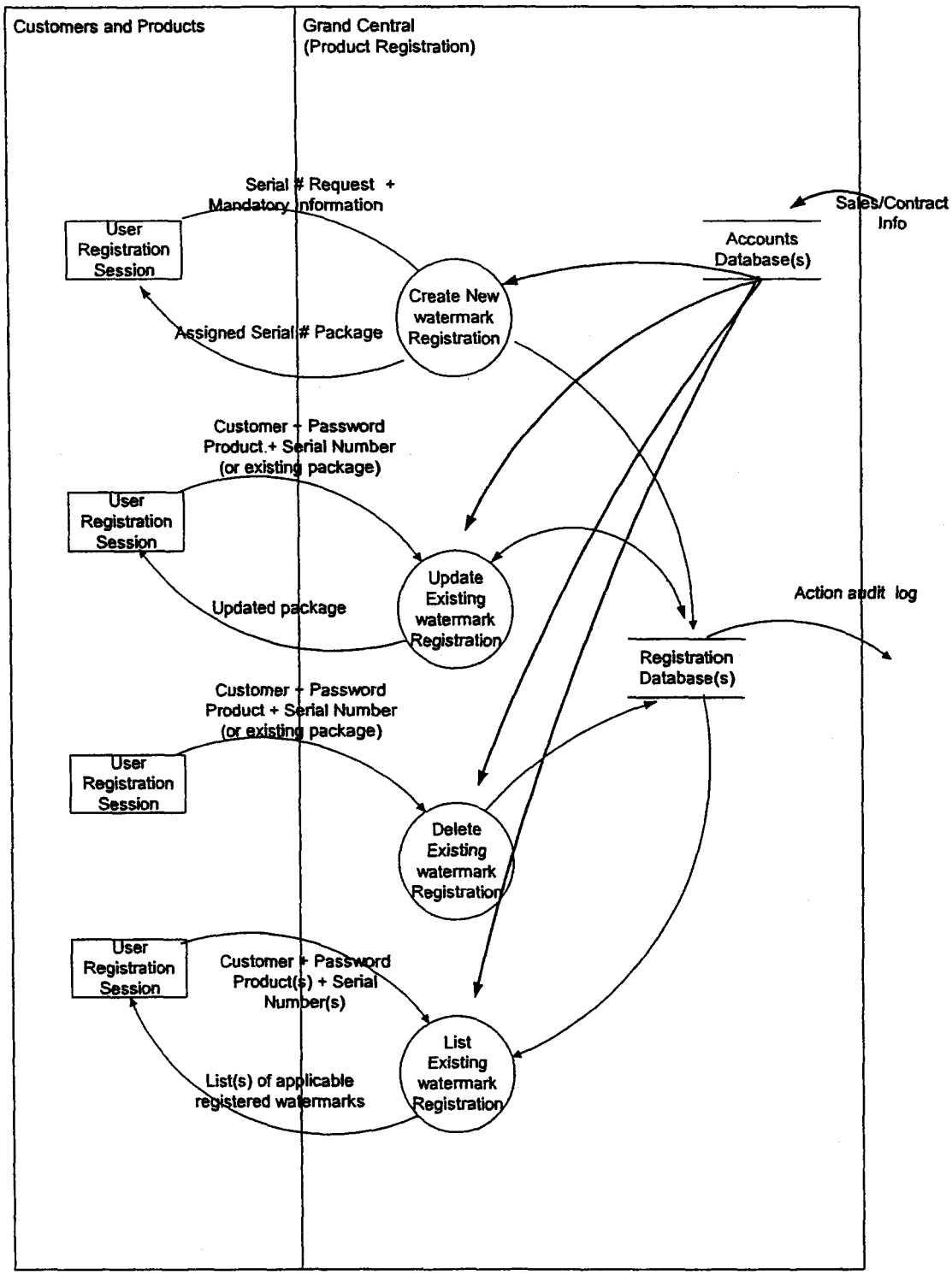
FIG. 6 illustrates certain data flows associated with the registration process of FIG. 2.

Processes and data flows associated with registration are illustrated in FIG. 6.

Entering Data into the Registration Database

While the client application, router, and product handler have initially been described in connection with responding to watermark information sensed from media objects, the same infrastructure can be employed earlier in the process, to enter data into the registration database 17. That is, a suitably configured variant of application 28c can be used by publishers, ad agencies, pre-press houses, etc., to (a) provide initial data to the database; (b) update such data; and (c) query the database for current values. Alternatively, a dedicated registration server 19 (FIG. 2) can be employed.

The involvement of plural parties in the registration process can be facilitated by encapsulating the database record contents for a given watermark in a file to which information is successively added (or updated) by different entities, and used to convey data between the database 17 and the cited entities.

Consider a case where Nike advertises in Wired magazine. The ad department at Wired agrees to sell space in response to a request from a media buyer at Nike. Wired may start the related watermark work by securing from the operator of system 10 a particular watermark identifier. (This, and most of the following procedures, are effected by computers talking to computers in accordance with instructions provided by suitable software used by the various participants, etc. In the discussion that follows, this software is the registration server 19 although, as noted, product handler 16 could be arranged to perform these functions.) Wired provides the operator an issue identifier (e.g., San Francisco edition of the July, 2000 issue), and internal tracking information used by the magazine. Registration server 19 responds by sending Wired a confirmatory file, by email, that encapsulates the information thus-far (i.e., the watermark identifier, the issue ID, and the magazine tracking information). Server 19 creates a new database record, and parses the received information into corresponding fields of the record.

Wired forwards the file received from the registration server to the media buyers at Nike. Nike supplements the information with its additional data, including the name of the advertisement and internal tracking information. It then forwards the updated file to server 19. Again, this server processes the file and updates the database record with the new information. It emails a confirmatory data file to both Nike and Wired, so each has the latest set of information.

The process continues in this fashion. Each entity provides new data to the registration server 19 via an emailed encapsulating file. The server updates the corresponding database record, and dispatches updated versions of the encapsulating file to the identified participants so each has the latest information.

Once Nike has entered its data via this process, it may forward the encapsulating file to its outside ad agency. The ad agency uses the file similarly, adding its particular information, and forwarding the file to the server. The server updates the database record accordingly, adds the ad agency to its email distribution list for encapsulating files, and dispatches the latest version of the file to Wired, Nike, and the ad agency.

A pre-press house may be the next party involved, and so forth.

Identification of the URL to which the watermark ID corresponds, and updating of the database record accordingly, may not happen until near the end of the process.

At any time, any of the parties can provide additional information to the database, and share such information with others, via the same process. (Some information may not be suitable for distribution to all involved parties, and can be flagged accordingly.)

Server 19 needn't always be the hub through which all communication takes place. The file as updated by Nike, for example, can be forwarded by Nike directly to its ad agency. The ad agency can add its information, and then provide the twice-updated file to the server, etc.

By using distributed files as proxies for the actual database record, a number of advantages accrue. One is local availability of the latest information by all parties without the need for an internet connection. Thus, if a creative director wants to work on the beach, or otherwise disconnected from the net, the needed information is still available. Another is the ease of integrating software tools at each of the parties with a file of local data specific to a particular advertisement, rather than requiring the architectural hassles of interfacing with a remote database and navigating its attendant authentication and security hurdles.

While the foregoing discussion made reference to emailing files, a typical email program would not normally be used. Instead, to better manage the attendant logistics, a specialized file management/mail program is used by each of the parties. Such program would track the latest file for each advertisement, making same readily available for updating as desired, and index the files by various content fields. The user interface could thus present a list of files, grouped or sorted by any of the database fields, permitting editing or adding of information just by clicking on a given field or tab.

Of course, the file-distribution system just-described isn't essential to the system. A great variety of other arrangements can naturally be employed. One is for each party to log-on to server 19 as needed to inspect, or update, database fields for which it has appropriate permissions.

Numbering Schemes

The payload information encoded into objects (e.g., by watermarking) can take a number of forms and sizes. Four exemplary classes are discussed below:

a) Domain-based payload segmentation;
   b) Customer/usage-based payload segmentation;
   c) Unsegmented payload; and
   d) Unique ID Domain-Based Payload Segmentation Domain-based payload segmentation approaches divide the payload into fields, each with a distinct meaning. The CLASS/DNS/UID arrangement earlier detailed is exemplary of this type of approach.

Consider a payload of 60 bits. Twelve bits may form a Class ID. These bits serve as an identifier for a top-level domain. 24 other bits may form a DNS ID. These bits identify an intermediate level domain. Together, the Class and DNS IDs fully identify the class of objects from which the data originates, the customer, and the server that should respond to the payload. (Some responses may be handled by the client computer, rather than dispatched to a remote server.)

The remaining 24 bits are a User ID, and serve as the most granular identifier, indicating the particular source of the payload. Based on this ID, the responding server knows exactly which response is to be provided.

This payload is embedded, in its entirety, into the customer's object. When sensed by the client computer, the application 28c parses (decodes) the payload into Class ID, DNS ID and User ID fields. The Class ID is used to trigger one or more of the client- or server-side programs. Once "launched" these products then use the Class ID in conjunction with the DNS ID and the User ID to complete the desired action.

One of the Class IDs may signify the object is a magazine page. Based thereon, the application 28c may direct the payload to the router/handler described above for response. Another Class ID may signify that the object is music. Again, the application may direct the payload to the same router. Or the application may direct the payload to a service maintained by a music industry consortium for response. Still another Class ID may signify that the object is a grocery package, and the payload should be routed to an on-line grocer for response. Yet another Class ID may signify that the object is a business card, and the payload should be processed locally, at the client machine. The mapping between Class IDs, and the corresponding response mechanism to which the application 28c should direct the payload, may be maintained by a database associated with the client computer's operating system (e.g., the Windows Registry), as detailed earlier.

Once the payload has been dispatched to a proper response destination, that entity examines the DNS ID to further classify the correct responding entity. For example, different IDs may correspond to different classes of servers within a tree of servers.

Once the payload has been directed to the correct class of servers, the User ID defines the terminal "leaf" in the tree (e.g., a database record) that finally defines the response.

Customer/Usage-Based Payload Segmentation

A second approach again employs a segmented payload technique. In this arrangement, however, a first field defines the interpretation of the following bits (e.g., their segmentation into different fields).

Again, consider an exemplary payload of 60 bits. Twelve bits can be a Version ID. These bits indicate how the succeeding bits are to be parsed and interpreted, and may indicate (like the Class ID in the foregoing approach) the particular application program 28c that should be used. The Version ID bits thus serve to indicate the payload type. In the illustrated embodiment, one of these types signifies that the payload is coming from a magazine page and should be handled accordingly. In this case, the remaining 48 bits can be parsed into three fields: Owner ID (15 bits), Publication ID (15 bits), and Media ID (18 bits).

The Owner ID identifies the customer to whom the watermark is registered (e.g., Nike). This is used for ad effectiveness analysis and billing purposes. The Publication ID identifies the particular publication (e.g., July, 2000, San Francisco edition of Wired Magazine). The Media ID identifies a particular page location within that publication.

As before, the payload is embedded in its entirety into the customer's object. The payload is first parsed to determine the Version ID. If the user's device 12 has been programmed to handle such objects locally, further parsing is performed in accordance with data corresponding to that Version ID, and associated processing of the parsed data is performed. If the device has been instructed to dispatch such payloads to remote locations for service, the complete payload can be dispatched with only such further parsing (if any) as may be required to correctly identify the corresponding remote servicing entity.

Unsegmented Payload

An unsegmented payload consists only of two parts: a Version ID (as described above) and an Object ID. In an illustrative case, a 60-bit payload is again used, with 12 bits serving as the Version ID, and the remaining 48 serving as the Object ID.

In this approach the relationships of owner/customer, publication, issue, and media are all maintained in database 17 rather than literally represented in some fashion within the object identifier.

Unique ID

This case is akin to the unsegmented payload, but consists of just a single field—a unique identifier. The same application 28c is always used, and always treats the payload data consistently (e.g., processing locally, or dispatching to a predetermined destination) regardless of the payload contents.

Combinations and hybrids of the foregoing approaches can of course be used. Moreover, the 60 bit payload length is illustrative only. Longer (e.g., up to 1024 bits) or shorter (e.g., down to 8 bits) payloads can naturally be used.

In a particular embodiment, a 32-bit unsegmented payload is used, consisting of 10 bits of payload type and 22 bits of watermark serial number. Some materials (e.g., advertisements including composite graphics) may be encoded with several serial numbers. The mapping between this payload and the customer/publication/etc., is maintained in database 17.

(As noted below, the data sent from the application 28c typically includes information other than the identifier payload, e.g., the type and version number of the application 28c, the electronic address of the dispatching application, etc.)

Router

The router 14 permits any number of different products to be used by the indicia detection and response model. By keeping this function separate and generalized, new products can be added without design changes to the existing products or the product handlers 16. There are two keys to making this approach successful—speed and flexibility. By using a standardized, open interface, the router is able to facilitate both of these goals.

A premise of an exemplary interface is an enveloping technique that allows the router to "open" the outer transaction envelope and extract the vendor and application ID without decoding the remainder of the transaction (message). Given these two pieces of information, the router uses a simple lookup table to determine the product handler appropriate to complete the transaction. The router then passes the vendor, application, remainder of the transaction and the Internet "reply to" address on to the appropriate product handler. The simplicity of this handling keeps the routing delay to a minimum, while deferring the actual response processing to vendor/product-specific handlers. By including the "reply to" address in the data passed on to the product handlers, the router is freed from the responsibility of return routing for the product's response(s).

To review, the router:

1. decodes the request packet received from the client products into the packet's base components—Vendor ID, Application ID and message;

2. validates the request packet base components against a list of known, good values;

3. if a request packet component is found to be invalid, issues an error message noting the invalid components and returning same to the calling session (e.g., product);

4. sends the decoded request packet contents and any required identification of the calling session to the appropriate product handler; and 5. reports any errors encountered, including invalid packets received, to a system monitor.

Figure 5:
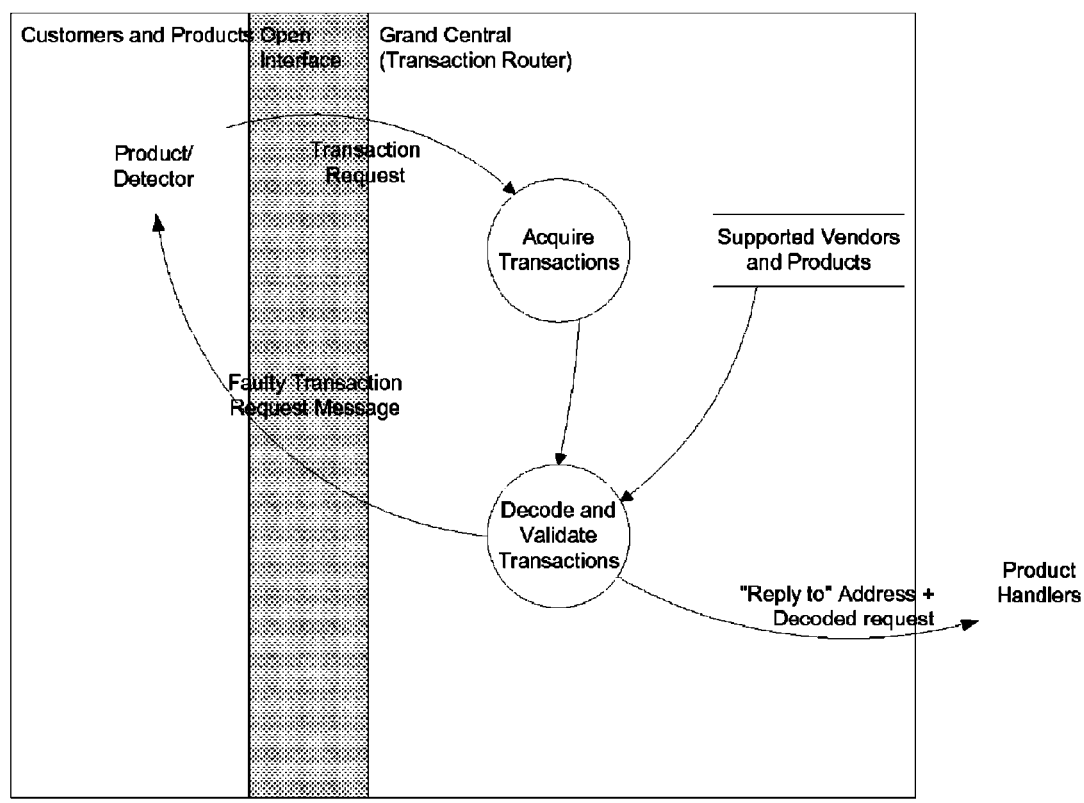
FIG. 5 illustrates certain data flows associated with the router of FIG. 2.

Certain data flows associated with the router are shown in FIG. 5.

Product Handler

The primary function of the illustrative product handler 16 is to process requests received from the application 28c, via the Internet and router 14, and return the requested information/action to the originating device 12. In the illustrated embodiment, the information requested is the URL associated with the watermark payload sent by the application. In other embodiments, other actions and/or information may be requested.

Each received watermark payload is validated using information in the database 17. If the watermark payload ID is found and is active, the requested action is performed. If the watermark payload ID is not found or is in an inactive state, an error message is returned to the requesting application.

All requests are logged in a transaction log for tracking and billing purposes. This includes any secondary payload information (zip code, Demographic Household ID, etc.) passed in by the application 28c. The log can be maintained by the product handler 16, or elsewhere.

To speed system response, the product handler 16 may anticipatorily send URLs to the application corresponding to watermark payloads the handler foresees may be coming. These URLs can be cached in memory associated with the application 28c, and quickly recalled if needed by the application.

Consider, for example, a magazine containing watermarked advertising. If the user presents a first ad to the device 12, the watermark is decoded and forwarded to the product handler 16, which responds with a URL corresponding to that ad. The application 28c then passes that received URL to a web browser 28b on the device 12, which initiates a link to that internet address. But the handler now knows the magazine the user is reading. By reference to the watermark first received, the handler may discern, for example, that the user is reading the San Francisco edition of the Mar. 14, 2000, Time magazine, and just looked at page 85. Based on this information the handler can query the database 17 for URLs associated with other advertising in that issue. (The database index is structured to permit fast queries identifying all ads in a given magazine issue or other collective data source.) These URLs are passed back to the application 28c and cached. If the user next presents an advertisement from page 110 to device 12, the application 28c finds it already has the corresponding URL locally cached. The application then passes the corresponding URL to the web browser. The web browser initiates the link immediately, obviating a data round trip between the application and the remote system.

The caching can be optimized in a variety of ways. One is to first send URLs corresponding to pages that are next-expected to be encountered. For example, if the user just presented page 85 to the sensor 22, after sending the URL for that page, the handler 16 would next send the URLs associated with pages 86, 87, etc. On sending the URL for the last page of the magazine (typically the rear cover), the handler could start from the beginning (typically the front cover) and send further URLs up to that for page 84. Another optimization is to first cache URLs for the most conspicuous ads, e.g., first send URLs for any 2-page spread ads, then for each full page add, then for each successively smaller fractional-page ad. Still another approach is for handler 16 to dispatch URLs to device 12 for caching in accordance with a contractually-agreed priority. One advertiser, for example, may pay a premium ad rate in exchanged for being cached before other advertisers who don't pay the premium. Other caching priorities, and combinations of such priorities, can naturally be employed.

In some systems, the advertisers or publishers may be charged for use of the system based on the number of URLs served by the system for linking. If local caching of URLs (e.g., at device 12) is employed, it is desirable for device 12 to report to router 14 (or handler 16) the URLs that are actually retrieved from the local cache and used for linking, so that the remote system can log same. Thus, each time the user presents an object to sensor 22 for which a corresponding URL is already cached, application 28c dispatches a message to router 14 reporting the event (and, usually, the particular URL involved). This event is then logged in the transaction log.

This anticipatory dispatching of URLs is one alternative function that may be performed by a product handler. Another is if the application 28c queries the product handler to determine if a more recent version of the application is available for download. If so, the application—through interaction with the user—can request that the product handler respond with a software download.

In greater detail, application 28c can periodically query the product handler as to the identity of the latest version of application 28c (e.g., the first time the application is used each day). Device 12 may have version 3.04, and the remote system may respond that version 3.07 is the most current. In such case the application 28c can alert the user—by suitable text, graphics, or other means—that a more recent version of the program is available, and query whether such updated version should be obtained. If the user so-instructs, handler 16 can serve to device 12 the latest version of the application (or a patch permitting the presently-installed version to be updated).

Sometimes it may not be necessary to update the application version. Instead, data from the remote system may indicate the desirability, or necessity, of changing just one or more parameters in the application 28c. For example, new security keys can be dispatched periodically by handler 16 to device 12, and used to change the security configuration of the application. Or the application 28c can be instructed to direct further outgoing watermark traffic—either for the next hour, day, or until instructed otherwise—to a different router 14. Such instruction can be used to optimize system performance, e.g., for router load balancing purposes, to avoid internet routes that are found to be slow, etc.

In summary, the detailed handler:

1. validates the received identifier (e.g., watermark serial number) against the list of active identifiers; and, if the serial number is not found, return an error message to the calling session, and log the error to an error handling routine;

2. for each received, valid watermark serial number, finds the corresponding active primary action from the database;

3. for each received, valid watermark serial number, if the handler finds the corresponding primary action is currently not active, it performs an alternative, "default" action instead;

4. if the handler finds an active primary action associated with the received valid watermark serial number, it returns the URL for application use in redirection (round trip approach), or serves the HTML page found to the calling session;

5. if the handler does not find an active primary action associated with the received valid watermark serial number, but does find an associated default action, it returns that URL for application use in redirection (round trip approach), or serves the HTML page found to the calling session;

6. if the handler does not find a valid, active primary or default action associated with the watermark serial number, it returns an error message to the calling session, and logs the error to the error handling routine;

7. records each transaction, including those that result in error messages, for billing and analysis purposes (in other embodiments, this function may be performed by the router, instead);

8. responds to a "software version request" by returning the most recent available application software version number to the calling session;

9. responds to a "software download request" by initiating a file transfer of the most recent available application software to the calling session;

10. responds to a valid Request for Registration packet upload (proper format, an existing serial number, an account ID and a valid corresponding account password) by returning a current registration packet for the provided watermark serial number;

11. responds to an invalid Request for Registration packet by returning an error message to the calling session noting the failure;

12. responds to a local transaction cache flush request by writing the locally cached transactions to the transaction log; and 13. responds to a multiple URL request by returning the URL associated with the provided serial number first, followed by all other active serial numbers and URLs for the publication, issue and region code (optional) provided.

Certain of the above-described processes associated with the product handler are shown in FIG. 6.

URL Performance Monitoring

Returning to operation of the system, the URLs identified in database 17 may, from time to time, become inoperative or impaired due to equipment problems at the remote web site or otherwise. If desired, the handler 16 (or another component of the system) can be programmed to periodically test each of the links registered as active in the database (e.g., once per day), and measure the time for the associated web page to load. If the web page doesn't load, or takes much longer to load than usual (and re-tests confirm that the condition isn't an anomaly), those conditions can be flagged in the corresponding database record. If the handler is requested to provide such a URL to a device 12, the handler can send a message—either with or without the URL—indicating to the device that the URL is misbehaving.

If the URL is working, but is unduly slow to load (either compared to its historical performance, or compared to other URLs), handler 16 can provide an interim diversion to the device 12. For example, it can instruct the device to launch a second browser window, and direct that browser to an alternate destination to entertain the user while waiting for the intended page to load. When the intended page is finally loaded, the first browser window can be displayed—either by closing the second, diversionary window, or by bringing the first window to the front while keeping the second window alive in the background.

This alternate destination is desirably a low bandwidth page, so that it will not unacceptably further slow loading of the desired URL. This alternate page can be one selected by the handler, for which the URL is sent after the desired URL. Or instead of providing a URL from the handler, the handler can serve an HTML or other page directly to the device 12. Or the alternative URL can be stored at device 12 and used to invoke the second browser window upon receipt of data from handler 16 indicating that the desired content will be slow in coming. In some embodiments the user can identify several alternate URLs (e.g., weather, stock info, jokes) and the handler or the application 28c may select among them randomly or otherwise. Or an HTML page or other application can be loaded locally at the device 12 in response to a "get ready to wait" indication from the handler 16.

If a URL is marked in the database 17 as slow or inoperative, the scanning operation periodically rechecks the URL to see if its status in the database should be changed (e.g., changed from inactive to active). Inactive URLs are reported to the registrant by email, and flagged for manual follow-up if not restored to action within a predetermined period.

Illustrative Responses by Product Handler

Part I, above, provided a sampling of the great variety of diverse applications enabled by the illustrated system 10. A few more are detailed below.

Consider use of the system 10 to enable personalized greeting cards. A greeting card company may prepare watermarked press-on stickers for use with its cards or other correspondence. The customer shows the sticker to a camera-equipped computer (either at the retail store, at home, or elsewhere). The computer decodes the watermark and sends same to a corresponding product handler 16 through the router 14. The handler—recognizing the watermark as an unregistered greeting card sticker—invites the customer to enter a destination URL, such as the customer's personal web page. This information is entered by the consumer and forwarded to the remote system for entry in the registration database 17. Thereafter, whenever the sticker is shown to a suitably-enabled system (e.g., by the card recipient), a browser window is automatically launched and directed to the web page specified by the purchasing consumer. (The same result can, of course, be effected without use of stickers, e.g., by encoding the greeting cards themselves.)

In some applications, the product handler may have a library of different responses it can provide to a user in a particular context, depending on the user's further selection. Consider a university student having a suitably-watermarked university ID card. When the card is presented to a device 12, the product handler replies with HTML instructions causing an options menu to appear on the device screen, e.g:

1. Review calendar of upcoming university academic events
2. Review calendar of upcoming university sporting events
3. Review Present Class Schedule
4. Select Courses for Next Semester
5. Review Grades When the student makes a selection (e.g., with a mouse, or by moving the ID card in a specified manner), the application 28c dispatches data corresponding to the selected option to the product handler, which then responds with the requested data.

In some cases (e.g., Review present class schedule, Select courses for next semester, Review grades), care must be taken to protect such information from persons attempting access using lost or stolen IDs. Accordingly, when any of these options is selected, the handler 16 may first respond to device 12 by querying for a password or PIN. Only after entry of the correct password/PIN is the requested action performed. (For security reasons, the university may prefer that the password authentication process be performed by a dedicated on-campus server, rather than by product handler 16. Naturally, this and other tasks can be delegated to processors other than handler 16 as best fits the situation.)

In other cases, an option menu needn't be presented—the correct response is inferred from the context or environment. Consider a drivers' license that is watermarked with identification of the owner. If presented to an email kiosk 12 at an airport, the decoded watermark may be used to look-up an email account corresponding to that individual, and download new mail. If the same drivers license is presented to a check-in kiosk, the decoded watermark may be used to look up that person's flight reservation and issue a seat assignment. In both cases the kiosks can be essentially identical. One, however, identifies itself to the router/product handler as an email kiosk, the other as a check-in kiosk. The response undertaken by the router/product handler differs accordingly.

Returning to the university example, there may be cases in which students are tempted to swap photos on a student ID, e.g., to permit an imposter to take a graduate school qualifying exam on behalf of a less-qualified student. In the usual case, such photo-swapping may be difficult to detect. This problem can be combated by an exam check-in procedure that includes having each student present their ID to a device 12. An application 28c specialized for this task can forward a watermark decoded from the ID photograph to a handler 16, which responds by causing an image of the identified student to be displayed on device 12. (The university could compile the requisite database of student images as it issues ID cards.) If the exam proctor sees an image on the device that does not match the image on the ID card, appropriate action may be taken. (This arrangement is applicable wherever photo ID documents are used, including airport check-in, customs, immigration, etc.)

Still another application of the illustrated system is to look-up, or act on, meta-data associated with a marked object. Consider an image, video, or audio file that a user downloads from the internet. Familiar applications such as Microsoft's Windows Explorer (including Internet Explorer) may be configured with watermark decoders activated, e.g., from a Properties panel (accessed, e.g., by right-clicking on the file icon or name and selecting the "Properties" option). When a watermark is detected in a file, the Explorer application can send a corresponding packet to a remote system (e.g., the depicted router/product handler/database). The remote system recognizes the packet as originating through the Properties panel of Windows Explorer, and looks-up the watermark ID in a database 17. Meta-data corresponding to the file (e.g., proprietor, creation date, licensing terms, exposure data, subject, etc.) is returned from database 17 (or from another database identified by the router, handler, or database) to the application 28c, and is displayed in the Properties panel (optionally under an appropriate "tab").

(The present assignee has long offered a "MarcCentre" service that serves as a clearinghouse through which watermark identifiers found in photographs, etc., can be used to identify the proprietors and associated information corresponding to such objects.) In embodiments of the present utilizing this service, the router 14 passes the request to Marc-Centre server (a product handler in this instance), which provides the solicited information back to the originating application. The present assignee's MarcSpider service complements the service provided by the Media Commerce product. The MarcSpider service constantly scans Internet sites evaluating each graphic encountered to determine whether it contains a watermark. (Audio and video can be similarly analyzed.) With each detected watermark, the MarcSpider service records the graphic file name, size, format, date/time and URL where the graphic was found. This information is then made available to MarcSpider customers in report form.)

Instead of simply displaying the meta-data, the application and/or the remote system can make use of it. For example, if the meta-data indicates that the proprietor of a watermarked image is Corbis, and that the image can be licensed for a certain use under certain terms, the remote system can be utilized as a licensing server—receiving payment information from the user, granting the license, and forwarding transaction details to Corbis.

Still another application is the sale or promotion of music or video over the internet. Taking the case of music, an artist may freely distribute a low-fidelity (or otherwise corrupted or abridged) version of a song. The low fidelity can be by reason of bandwidth limitation (e.g., 500 Hz-2.5 KHz), monophonic (as opposed to stereo), or otherwise. The artist can seek to distribute the low-fidelity version as widely as possible, to serve as a marketing agent for the artist's other works. (The free distribution of lower-bandwidth audio may serve to alleviate some of the network bandwidth problems faced by universities whose students actively engage in transferring free music over the internet.)

Each low-fidelity version can be processed to extract an identifier (e.g., a steganographic in-band watermark; a numeric ID or song/artist name field in a file header; a 128-bit hash value obtained by applying a hashing algorithm to the music data, the music file header data, a portion thereof, etc.) If a listener is interested in obtaining a full-fidelity version of the work, the listener can operate a suitably programmed computer or music appliance that extracts the identifier from the work and passes it on to the remote system. The remote system can respond in various ways, e.g., by providing a full-fidelity version of the same work back to the user (such as MP3 download) and charge the user's credit card a fee (e.g., $0.99); or by directing a web browser on the user's computer to an e-commerce/fan web site associated with the music, etc. Such functionality can be provided in general purpose programs such as Microsoft's Internet Explorer, e.g., by right-clicking on a file to obtain a menu that includes this and related functions.

Figure 8:
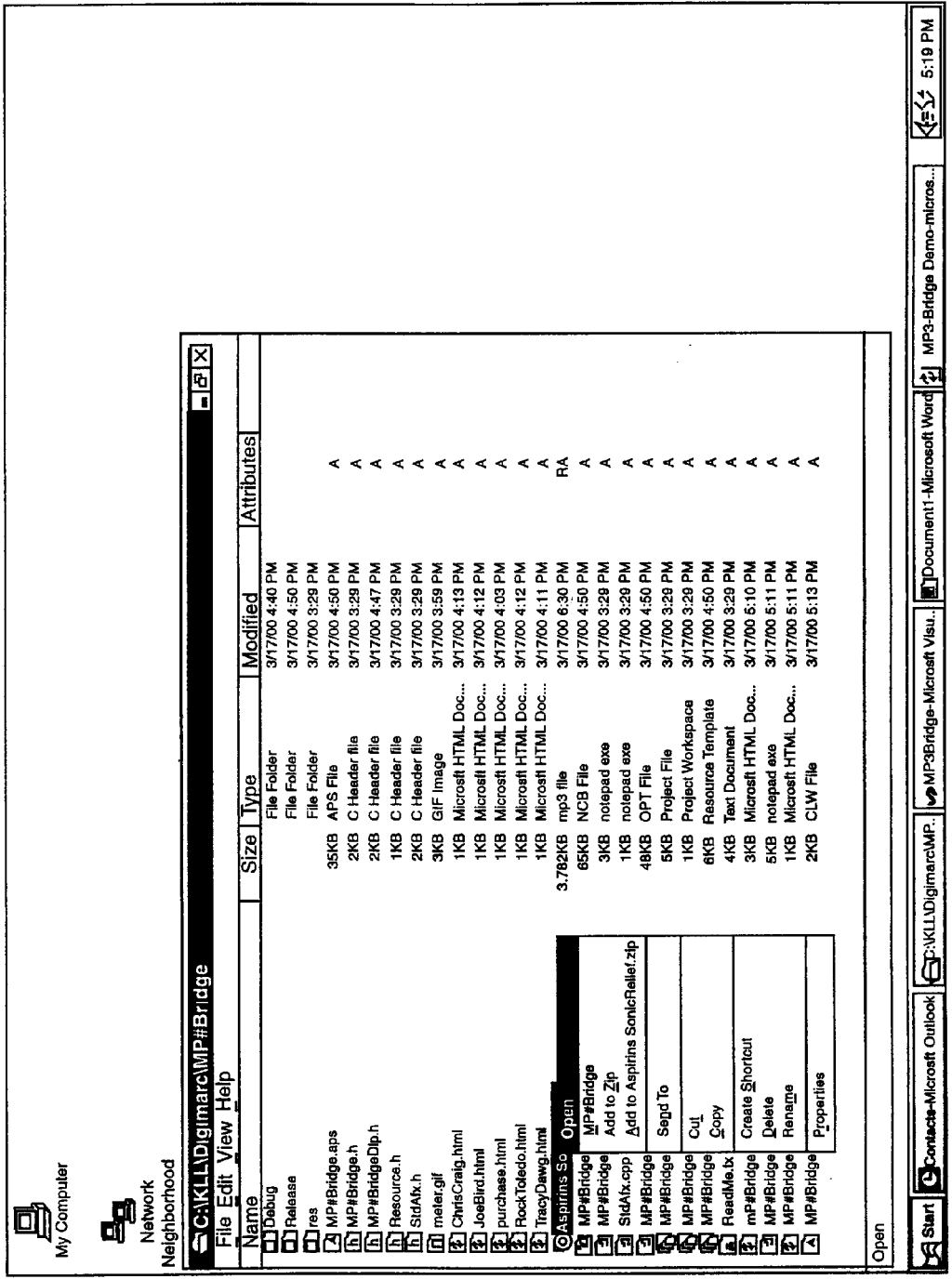
FIGS. 8-10 show a sequence of screen shots from an illustrative system.
Figure 9:
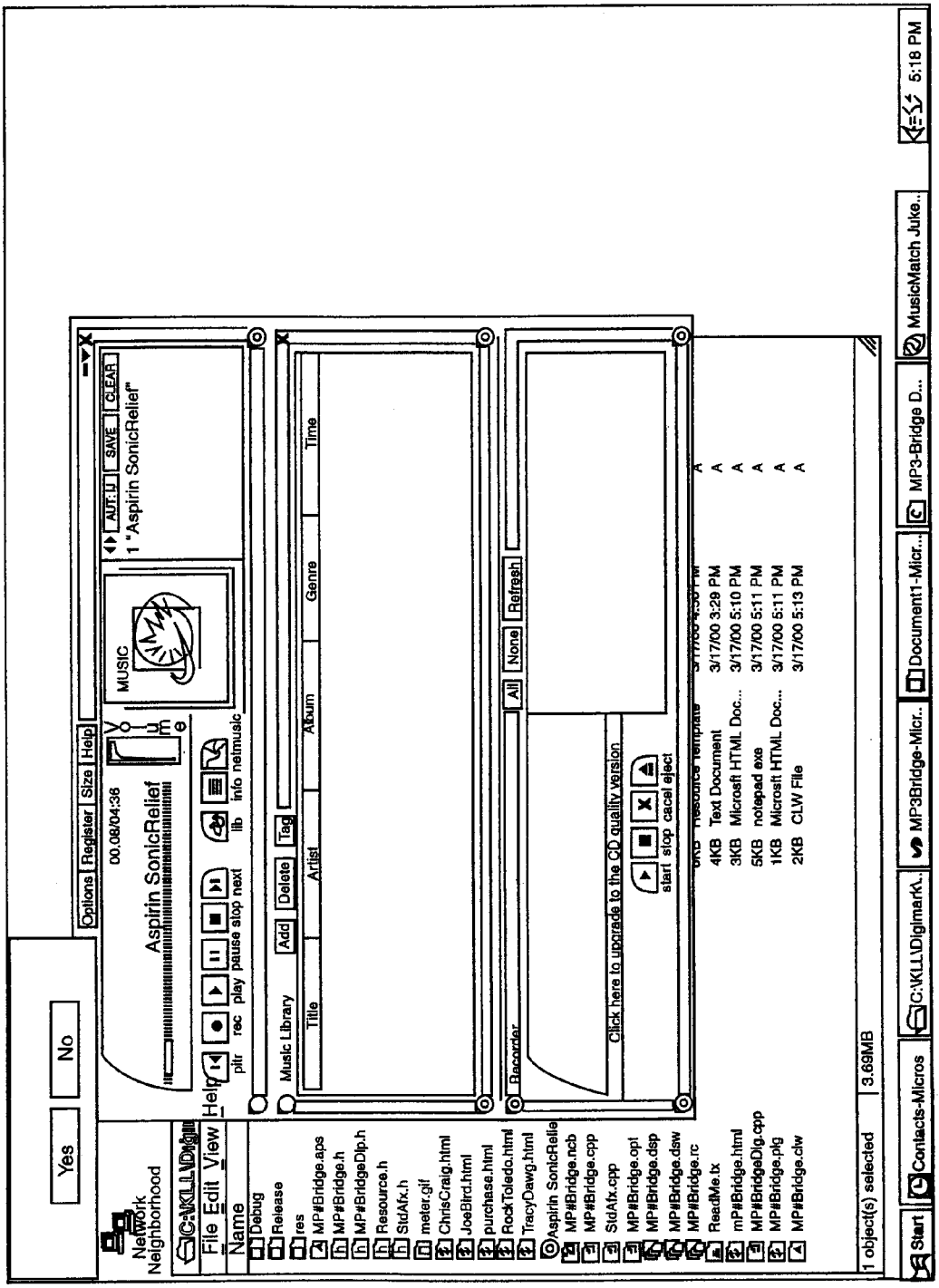
Figure 10:
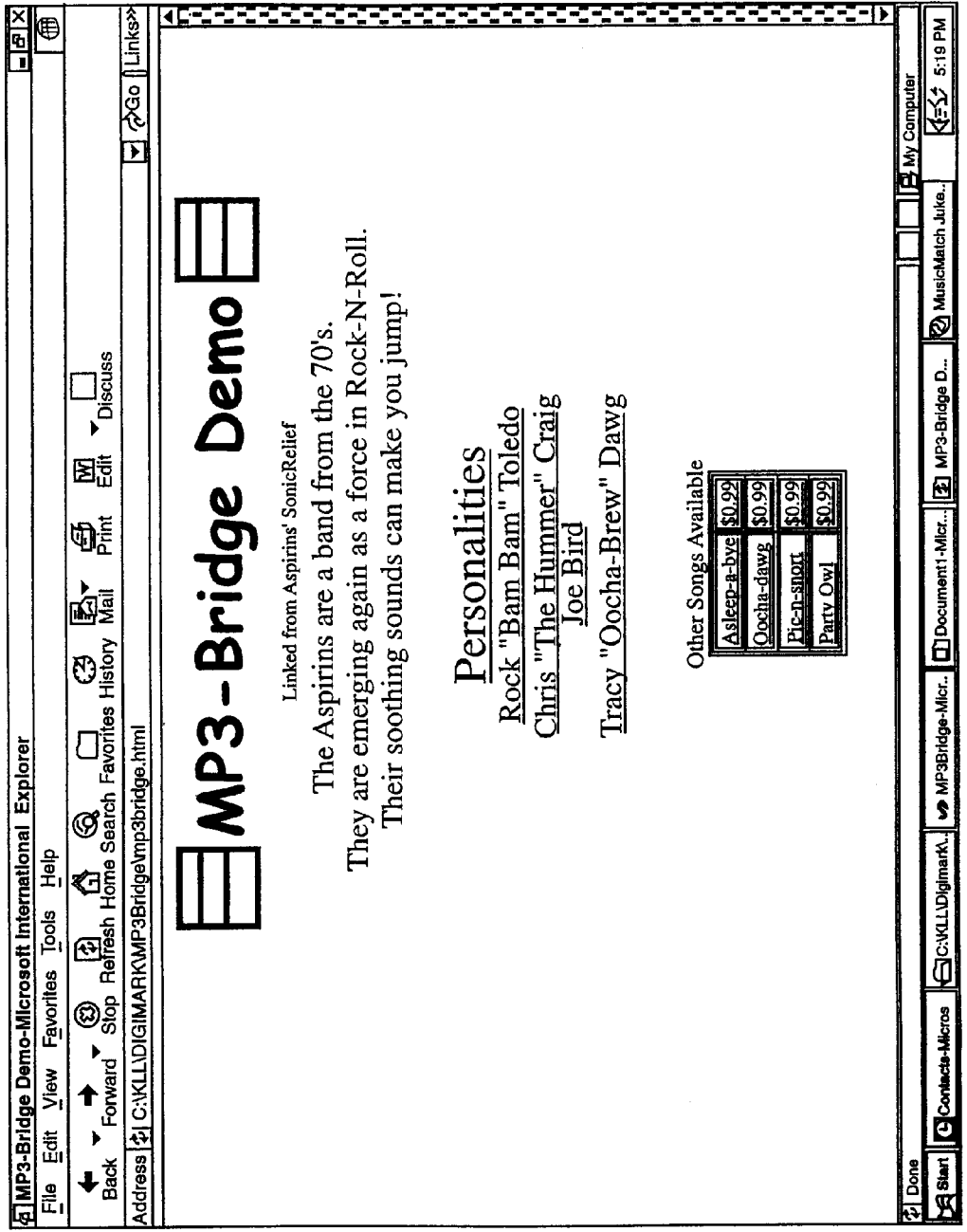

FIGS. 8-10 show a sequence of screen shots from such an embodiment. In FIG. 8, a user has right-clicked on an MP3 file icon in a directory listing 200. A property menu 202 pops up that includes, as its second option "MP3Bridge."

FIG. 9 shows what happens when the user selects the MP3Bridge option. An MP3 player 204 is launched, and a dialog box 206 appears. The dialog box queries the user, "More Information About the Artist? Yes No."

FIG. 10 shows what happens if the user selects "Yes." The software sends the identifier—extracted from the MP3 file—to the remote system. The remote system responds with the address of an associated web page, and instructs the user's computer to launch a new browser window directed to that page.

The same functionality can naturally be invoked through the user interface of the MP3 player (or a Windows Media-Player, etc., rather than through Internet Explorer). The music application can spawn a separate window, or present the options and the associated data within the existing window.

Yet another application of the remote system is as a "net nanny" filter. Links requested through the system can be checked for keywords, adult-content flags, content ratings, or other indicia of age-suitability, and provided to the requesting computer 10 only if they meet certain earlier selected criteria.

Again, it will be appreciated that the foregoing examples are but a few of myriad applications enabled by the detailed system.

Reporting

System software may enable the provision of customer-accessible reports (accessible over the internet) that show detailed and summary usage information by date, customer, publication, issue date, region, product/version, etc. These reports can be both regularly scheduled and ad-hoc. The specification of the content, relationships and the timing of the reports can be defined by the customer on-line.

Illustrative reports detail:

a) Hit rates/Transactions per customer per ad b) Hit rates/Transactions per customer per publication per ad c) Hit rates/Transactions per customer per publication per issue per ad d) Hit rates/Transactions per customer per publication per issue per region per ad e) Hit rates/Transactions rates by originating application (28c)

f) Hit rates/Transactions by originating application vendor g) Hit rates/Transactions rates by originating web domain (e.g., aol.com)

h) Hit rates/Transactions rates by postal/zip codes i) Hit rates/Transactions by country Additional marketing/marketplace reporting can also be produced for internal analysis by the service provider, and for sale to other entities. These reports typically provide a more global view of the impact and usage of the system. Using information stored in a demographic database, in conjunction with these usage patterns, the system can provide customers and research agencies with more detailed demographic/statistical data on the system's usage and effectiveness.

In an illustrative system, certain statistics in the demographic database are compiled using statistics from a sample of users that consent to have their activities tracked in some detail, in consideration for certain perks (e.g., give-away cameras, bar-code scanning pens, or other devices, etc.). These users are termed Demographic Households. A software program included in the systems solicits information detailed in the following table from such users over the internet, with a web-enabled interface. A related program allows such users to update/edit their user/household information previously entered. Each such session is password authenticated for security.

| User Information | Comments |
| --- | --- |
| Name | |
| Address | |
|     Street | |
|     City | |
|     State | |
|     Country | |
|     Postal Code | |
| Phone number | |
| E-mail address | |
| Household Annual Income | Provided as raw $ or as a selection from a range of numbers |
| Occupation | |
| Education | May be per member of household. |
| Profession | If applicable |
| Number of members of household | |
| Member of household | |
|     Age | |
|     Sex | |
|     Internet user? | |
|     User of this linking service? | |
| Internet usage per week | In hours. Sum of entire household |
| Internet business usage per week | |
| Primary Internet usage? | Typical household use of the Internet. May be a selection list |
| Owned a computer since? | Year only |
| Number of computers in the home? | |
| Types of computers in the home? | Mac, PC, etc. Select all that apply |
| Rooms where the computers are located | Home office, bedroom, etc. Select all that apply |
| What ISP do you use? | |
| What is your modem speed? | Select from list that includes ISDN, ADSL, cable + dial up modems. |
| Are you willing to be an official "Demographic Household" and allow us to contact you for feedback on our products and advice on new products? | |
| What other technology devices do you have in your household? | Scanners, PC cameras, digital cameras, DVD, PDAs, etc. Select all that apply |

Audio and Video

As with paper advertisements, the illustrated system provides users of web-connected PCs or other appliances with methods of obtaining information, content, associated products, or associated services using the same principles as detailed above.

For example, an application 28 can "capture" music or other audio using a recording device (note recorder, microphone connected to PC, MP3 player, etc.) and analyze the captured audio to detect an embedded watermark. Once detected, the application passes some or all of the watermark payload information, together with identification of the application and its vendor, to the router. The router forwards the payload information to a handler corresponding to the application. The response of the product handler varies with the context and nature of the data. For example, the handler may return the artist, title, track, album, web URL and purchasing information, to the user. Recorded news and entertainment segments may include transcripts (audio, video and/or text) of the segment along with other related web site information. The handler may simply cause the device 12 to launch a browser window directed to a music commerce web site where the music can be purchased.

Security

The system's basic security philosophy is to grant access to each customer's information only to the users authorized by the customer. To this end, the system desirably should:

1. Create and maintain a list of authorized users (accounts).
2. Employ security methods to deny access to any unauthorized users.
3. Limit users to access only the objects they are authorized to access (typically, the objects belonging to that customer).
4. Report and record all unauthorized access attempts.
5. Maintain a log of all authorized user logins (sessions).
6. Provide the capability for the watermark registrant to grant access rights to other accounts (such as ad agencies and pre-press houses).
7. Establish initial passwords for each account
8. Provide the capability for each authenticated user/account to change their password
9. Provide the capability to reset an authenticated user/account's password in the event the current password is lost.
10. Store all passwords as encrypted values (to prevent theft of passwords).
11. Provide the capability to restrict the creation, modification, deletion, and listing/viewing of account information to authorized users.

Audit Trail

Because of the financial implications of the system's activities, all changes to any registration or customer data need to be recorded. This audit trail provides the operator and its customers with an accurate accounting for the current and previous states of the data.

The audit software desirably records the creation, modification, and deletion of all registration and customer data. The audit software also records the username, date/time of creation/modification/deletion of records, and—for modifications—the before and after images of the data changed.

Application-To-Product Handler Interface Definition

The basics of the interface between the application 28c and the handler 16 are (a) a flexible request and response package structure, and (b) a defined connection method based on industry standards. The illustrated messaging employs the http and/or the https protocol to send and receive messages among the system components. An overview is provided in FIG. 4.

Message Format

The message format is XML-compliant and is defined by the following XML DTD—

```
<!DOCTYPE list [
<!ELEMENT Content (vendor, appl, prod)>
<!ELEMENT vendor (#PCDATA)>
<!ELEMENT appl (#PCDATA)>
<!ELEMENT prod (#PCDATA)>
]>
```

The application 28c appends its data to this header for transmission to the product handler 16. Exemplary messages and product handler responses are detailed in the sections that follow.

Application Message Definitions

The application message definitions can be broken down into Request Code, Primary and Secondary information.

The Request Code instructs the product handler 16 to take a specified action.

The Primary information portion contains the data required to properly service the application's request. The Primary Information varies based on the Request Code.

The Secondary Information is intended for use by analysis and reporting tools and does not instruct nor aid the product handler in servicing the user's request. Secondary Information contents change based on the Request Code and not all Request Codes are required to have associated Secondary Information. In addition, most of the Secondary Information requires the consumer to grant express consent to its collection. If that consent is not given, the application does not send Secondary Information. A special case exists for selected, consenting consumers to become part of a demographic database.

Primary and Secondary information may change by request type, but in general conform to the definitions below. The generic format for the product handler is also defined below.

Primary Information includes the Application Version, Watermark Type, Watermark Serial Number, Context and Environment.

Application Version: used by the product handler to modify its actions, typically for backwards compatibility Watermark Type: top 9 bits of the illustrative watermark payload. Used by the product handler in processing the Watermark Serial Number Watermark Serial Number: remainder of the watermark payload. Provides the index used by the product handler to access the watermark in the registration database Context: instructs the product handler to modify/refine its action based on the consumer request's context Environment: instructs the product handler to modify/refine its action based on the consumer request's environment. (The environment may be specified, e.g., as home, office, car, portable appliance, etc.)

Other Request codes can, of course, be used. Each may have its own list of mandatory and optional Primary Information fields. Optional fields are excluded from the primary Information when there is no value associated.

Secondary Information:

Demographic Household ID: identifier for a selected demographic group. This is used as an index to the actual demographic Input device: Manufacturer, model and version of the device used to detect the watermark (e.g., a TWAIN driver string)

Operating System: operating system in use on the consumer PC

Processor: processor type/class on the consumer PC

Processor speed: processor clock speed, in MHz, of the consumer PC. (May be entered by user, or auto-detected.)

Language: preferred consumer spoken language

Country: Country where the consumer PC resides

Postal Code: Consumer's postal code (used along with the country to pinpoint the location of the consumer).

(In addition to these explicit data, the packet sent from the device 12 also conveys an IP address (inherent in the use of http protocols) so that the remote device (e.g., the router/handler) has an address to which it can respond.)

```
Response from Product Handler
    RtnCode                 Success = 1
    URL                     the active URL for the watermark serial number
                            received
                                or
    RtnCode                 Error <0
    Error Message           text.
Request for URL
    Required Inputs
        Header (XML format)
            Vendor          (e.g., = Digimarc)
            Appl            (e.g., = MB)
        Data
        Required information -
            Req             =RFU
            Ver             = application version number
            Type            = watermark type number
            Ser             = watermark serial number
            Cxt             = context
            Env             = environment
        Optional Information -
            Ctry            =User's Country name
            Lang            =User's preferred Language
            HHID            =Demographic Household Identifier
            Det             = TWAIN string of the sensing/detecting device
            OS              =User PC Operating System string
            Proc            =User PC processor type and class
            Speed           =User processor speed
            Zip             =User postal code
        Example:
            <?xml version="1.0"?>
            <Content>
            <vendor>Digimarc</vendor>
            <appl>MB</appl>
            </Content>
            Req=RFU
            Type=1
            Ser=10001
            Ver=1.0
            Cxt=A
            Env=Q
            Ctry=USA
            Lang=English
            HHID=1234567
            Det=TWAIN string
            OS=Win98
            Proc=Pentium III
            Speed=500
            zip=74008-1234
Response from Product Handler
    RtnCode=Success/Error number (Success = 1)
    URL=URL associated with specified watermark type and Serial number
    Exp=Expiration date/time (GMT) for caching purposes - format of
mm/dd/yyyy hh:mm:ss
        or
    RtnCode=Success/Error number (Error <0)
    MsgText=message text
Error reasons:
    1 Type and Serial Number OK, but no URL in database (both the primary and default URL are missing)
    2 Type and Serial Number OK, but URL is marked as inactive (neither the primary nor the default is active)
    3 No record in database matching the Type and Serial Number
    4 Request format error - incomplete data
Request for Configuration
    Required Inputs
        Header (XML format)
            Vendor          (e.g., = Digimarc)
            Appl            (e.g., = MB)
        Data
        Required information -
            Req             =RFC
            OS              =User PC Operating System
        Example:
            <?xml version="1.0"?>
            <Content>
            <vendor>Digimarc</vendor>
            <appl>MB</appl>
            </Content>
```

```
            Req=RFC
            OS=Win98
Response from product handler
            RtnCode= Success/Error number (Success = 1)
            Ver=Latest Application version# available for download
            https=yes (or n )
            GCURL=URL used to route subsequent Application requests
                or
            RtnCode= Success/Error number (Error <0)
            MsgText=message text
Error reasons:
            5 Unknown Operating System
            4 Request format error - incomplete data
Request for Associated URLs
            Required Inputs
            Header (XML format)
                    Vendor              = Digimarc
                    Appl                = MB
            Data
            Required information -
                    Req                 =RFA
                    Ver                 =application version number
                    Type                =watermark type number
                    Ser                 =watermark serial number
                    Cxt                 =context
                    Env                 =environment
            Example:
                    <?xml version="1.0"?>
                    <Content>
                    <vendor>Digimarc</vendor>
                    <appl>MB</appl>
                    </Content>
                    Req=RFA
                    Type=1
                    Ser=10001
                    Ver=1.0
Response from product handler
            RtnCode= Success/Error number (Success = 1)
            Ser1=watermark serial number
            Type1=watermark type number
            URL1= URL associated with specified watermark type and Serial number
            Exp1=Expiration date/time (GMT)
            Ser2=watermark serial number
            Type2=watermark type number
            URL2= URL associated with specified watermark type and Serial number
            Exp2=Expiration date/time (GMT)
            .... .
            Ser'n'=watermark serial number
            Type'n'=watermark type number
            URL'n'= URL associated with specified watermark type and Serial number
            Exp'n'=Expiration date/time (GMT)
                or
            RtnCode=Success/Error number (Error <0)
            MsgText=message text
Error reasons:
            8 Type and Serial Number OK, but no associated watermarks or URLs in database
            9 Type and Serial Number OK, but all associated URLs are marked as inactive
            3 No record in database matching the Type and Serial Number
            4 Request format error - incomplete data
Request for Transaction Download
(Needed to account for locally cached redirections. One request per local redirection.)
Required Inputs
            Header (XML format)
                    Vendor              = Digimarc
                    Appl                = MB
            Data
            Required information -
                    Req                 =RFT
                    Ver                 =application version number
                    Type                =watermark type number
                    Ser                 =watermark serial number
                    Cxt                 =context
                    Env                 =environment
            Optional Information
                    Ctry                =User's Country name
                    Lang                =User's preferred Language
                    HHID                =Demographic Household Identifier
                    Det                 =TWAIN string of the sensor device
                    OS                  =User PC Operating System string
                    Proc                =User PC processor type and class
```

```
        Speed                =User processor speed
        Zip                  =User postal code
    Example:
        <?xml version="1.0"?>
        <Content>
        <vendor>Digimarc</vendor>
        <appl>MB</appl>
        </Content>
        Req=RFT
        Type=1
        Ser=10001
        Ver=1.0
        Cxt=A
        Env=Q
        Ctry=USA
        Lang=English
        HHID=1234567
        Det=TWAIN string
        OS=Win98
        Proc=Pentium III
        Speed=500
        zip=74008-1234
Response from product handler
    RtnCode=Success/Error number (Success = 1)
            Or
    RtnCode=Success/Error number (Error <0)
    MsgText=message text
Error reasons:
    4 Request format error - incomplete data
```

To provide the fastest possible system response, it is desirable that data exchanges between the originating device 12 and the remote system be as short as possible—preferably of a size that can be transported in a single internet data packet (i.e., less than about 536 bits). Such an arrangement avoids the overhead associated with data division on transmission, and data reassembly on reception.

Generally speaking, the combined elapsed time of the system service (i.e., watermark recognition by application 28c, packet delivery to router, decoding by router, handling by product handler, and return of response to application) for a single request should average no more than 3 seconds as measured from receipt of request to $1^{st}$ byte sent in response to request. Typical speeds are less than 2 seconds, with many responses being provided in less than 1 second.

The immediately following discussion reviews much of the foregoing, but from a different priority case and with additional details.

The MediaBridge digital message is composed of two codes, both of which are embedded in MediaBridge-enhanced images. The media owner code is assigned by the system administrator (e.g., Digimarc) and identifies the entity licensed to add MediaBridge enhancement to images. The routing code is assigned by the media owner (advertisers, publishers, manufacturers, etc.) and determines where the end-user will be directed when the Client Application reads the MediaBridge codes. Two different advertisements embedded with the same codes can take the end-user to the same web page, while the same advertisement in different publications using different codes can go to different web pages and can be used to track which advertisement or magazine is most effective in bringing end-users to the media owner's web site.

There are three major components of the MediaBridge system. The Client Application is used in homes and businesses by consumers (the MediaBridge end-users) to automatically navigate from an image or object to additional information, usually on the Internet. The MediaBridge Router provides the Client Application with the appropriate Internet address for a given image or object. The Embedding System is used by the media owners to embed the MediaBridge codes into images prior to printing.

MediaBridge Client Application

The Client Application can be distributed via OEM relationships with tethered digital camera manufacturers such as Logitech, 3Com, Creative Labs and others. It is installed by the end-user along with the camera driver and supporting software from the camera manufacturer's installation CD.

The MediaBridge Client Application may run on 200 MHz or faster Pentium or PowerPC computers configured with a tethered video camera under the Windows 95/98/NT 4.0 and Macintosh OS 8.6 operating systems.

The MediaBridge Client Application is initially focused on using MediaBridge-enhanced images to directly browse to additional information on Internet web sites. Therefore, it requires a connection to the Internet, either through a dial-up modem or a permanent connection. However, the Client Application desirably has an extensible architecture that also supports browsing to local data, e.g. on a CD, and linking to other applications.

The MediaBridge system can be used almost anywhere that a video camera can show clear, focused, high-quality images. It operates under lighting conditions varying from dim (about 40 lux) to bright (3900 lux). In very dim light it works with the aid of a supplemental light source, and in bright glare it works if the pictures or objects are shielded from the light source.

Operating the End-User Client Application

The first time the Client Application runs it desirably presents the user with a wizard that teaches the best techniques for presenting MediaBridge-enabled images to the Client Application through the video camera. The wizard is tuned for each camera and can use either the sample images or live production images.

Shipped on the installation disk (e.g., CD) can be one or more games that teach users how to best use the Client Application—e.g., focusing the camera, positioning the encoded object in the camera's focal region, holding the object stationary for the second or so needed for decoding, permissible lighting requirements, etc. The camera box, or inserts inside the box, can be MediaBridge encoded and can link through the browser to a corresponding introductory page hosted by the camera vendor or the system administrator. T-shirts or other prizes may be awarded through the web site, either on a random basis, or upon the showing of proficiency in some aspect of MediaBridge operation.

In an illustrative configuration, the MediaBridge Client Application is always running and is either active or inactive. When active, the MediaBridge video camera window is always on top of any other windows and fully visible, and the Client Application is constantly checking the video for a MediaBridge-enhanced image. When a MediaBridge-enhanced image is found, the appropriate information is displayed—most often as a web page—and the Client Application optionally becomes inactive. When the Client Application is inactive, it hides the video window, releases the camera so it is available for other applications, and uses very little memory or computer resources.

In one implementation, the Client treats the camera as a serially re-usable device. That is, when the Client Application is active and checking the video, no other application can access the video camera. Similarly, the Client Application cannot access the video when another application is using the camera.

The MediaBridge Client Application may include the following functionality:

1) Browser/Application Launch. When a MediaBridge-enhanced image is found, the Client launches the user's web browser or another application. When browsing to an Internet web site, the Client provides the site with the identity of the image and the end-user's zip code, if available. This information allows the media owner's web site to display a localized web page to the user. When launching another application, the Client provides the image owner code and the routing code to the application.
2) Destination menu. If multiple URLs are specified for a routing code, the Client Application displays a browser-based menu that allows the end-user to choose what page to display, rather than directly navigating to a web page.
3) Branding. While retrieving the information for displaying a web page, the Client Application displays a local web page with a pre-stored brand (e.g., Digimarc) and explains that the desired information is being retrieved. This branding page is replaced with the media owner's page without causing any delay to the user. (The contents of the branding page may be updated during Automatic Software Update.)
4) Flexible activation. When the Client Application is inactive, the user can activate it by:
   a) Clicking on the application icon.
   b) Pressing a hot-key combination.
   c) Clicking on a tray icon. (Windows.)
   d) Clicking a button on the browser toolbar.
   e) Restoring the minimized MediaBridge Client video camera window. (Windows.)
5) Status display. While active, the Client Application provides feedback to the user through the status display pane, which is displayed in the video camera window, next to the view as seen from the camera. The status includes feedback on the ambient lighting conditions, the distance from the camera (if available) focus, and the current state (preparing to display the image-related information, trying to read the image, or waiting for a MediaBridge-enhanced image to be presented to the camera.)
6) Multiple camera support. An illustrative MediaBridge Client Application uses one camera at a time, but can use any MediaBridge-enabled camera installed. If a computer only has one camera, that camera is automatically selected. If more than one camera, the user can select which camera will be used and can change the selection while the Client is running.
7) Automatic Software Update. The user can automatically install updates to the Client Application by making a simple menu choice. The Client connects to the Internet, and downloads and installs any available updates. In addition, the Client will suggest checking for updates if it finds a MediaBridge-enhanced image that uses a newer protocol (e.g., by reference to a version indicia encoded with the MediaBridge data).
8) User option configuration. Nearly everything in the Client Application can be configured by the user.
   a) Automatically starting the Client whenever the computer starts. (Default.)
   b) Activation by hot key.
   c) The display of an activation icon on the system tray. (Windows.)
   d) Adding a button to the Internet web browser. (Internet Explorer 4 or later, and Netscape 4 or later.)
   e) Selection of the last camera used on startup when multiple cameras are installed.
   f) Reminder to check for software updates periodically.
   g) Running the Wizard at startup. (Default)
   h) Automatic deactivation when a MediaBridge-enhanced image is read.
   i) Automatic deactivation if nothing is presented to the camera for a specified period.
   j) Beep or play sound file upon reading a MediaBridge-enhanced image.
   k) Blocking of sites based upon RSACi ratings. Each media owner is expected to self-rate its site using the RSACi scale for the categories of language, nudity, sex and violence. The Router blocks the end-user from a site if the RSACi rating for any category exceeds what the end-user allows. (The Router relies solely on the media owners' self-ratings and does not actually check web pages for RSACi codes.) Selecting this option also results in the display of information about RSACi (http://www.rsac.org/ratingsv01.html) regarding restricting content within the web browser.
   l) Automatic connection to the Internet over an existing dial-up (modem) connection.
   m) Password protection upon startup.
   n) User registration information. (The user is informed that all information is optional and that specific items will be provided to third parties if provided.)
   o) The end-user zip code, which the user is not required to provide, is used as a basic piece of demographic information passed along to media owners if it is voluntarily provided by the end-user.
9) Wizard. This wizard provides guidance in setting up a particular camera to obtain the best results with MediaBridge and the best techniques for using MediaBridge as a portal to more information. By default the wizard runs each time the Client Application is started. It also runs the first time a new camera is selected by the user.
10) Camera verification. When a new camera is selected as the MediaBridge Client input, the Client verifies that the camera is MediaBridge-enabled. If it is not, the user is warned that the camera is not supported and that it may not work correctly with the Client Application.
11) Extensible architecture. The MediaBridge Client handles reading MediaBridge-enhanced images and connecting to the desired information, usually by displaying Internet or local web pages in a browser window. Its functionality can be extended by MediaBridge-enabled applications that register for the handling of specific data. For example, if a MediaBridge-enhanced business card were presented, the MediaBridge Client could run a MediaBridge-enabled application that downloads business card information from a web site and updates the user's contact list with the new information. Another example would be a page from a MediaBridge-enhanced children's book that causes an audio file to be played for the page.

12) Embedding support. If the Client Application is being used by a media owner to verify that an image has had the correct MediaBridge codes embedded in it, the Client displays the name of the media owner, the routing information and the relative strength of the MediaBridge watermark when a MediaBridge image is read. In order to protect the privacy of each media owner, this information is only provided if the user is able to provide a valid embedding user name and password for the media owner.

MediaBridge Router

The Router is essentially transparent to the end-user. When the Client Application detects a MediaBridge-enhanced image linked to information on the Internet, it communicates with the Router to obtain the Internet addressing information of the web page to be displayed.

The Router also includes the following functionality:
1) Routing information maintenance. Contained within the Router is information linking each unique MediaBridge code to one or more related Internet addresses. In one implementation, the system administrator (e.g., Digimarc) maintains the routing information using information supplied by its advertising customers. In another implementation, the media owners update the information themselves using a secure Internet connection with the Router.
2) Problem handling. If a routing request cannot be satisfied, the Router responds in a way that minimizes the impact on the end-user. For example if the MediaBridge code is unknown, then the Client Application is given the URL for the media owner's home page. In addition, each day the error occurs the Router notifies the media owner by email that the error occurred.
3) Content rating. If the media owner has provided RSACi rating information for the image or its site, and the end-user has specified RSACi ratings that specify that the site is to be blocked, the Router returns a web page to the user indicating that the site contains inappropriate content and does not connect to the media owner site.
4) Validation. Periodically (e.g., on a daily basis) the Router validates all of the active information in its database. If any errors are found, the media owners are notified by email. If the errors are not fixed within one day, Digimarc is notified. The conditions checked are:
  a) Missing URLs on active links.
  b) URLs referring to non-existing pages.
  c) Pages that exceed the acceptable download time as required by Digimarc.
5) Tracking. The Router may log Client Application requests in order to develop marketing information. Such a tracking log could include:
  a) Date and time of the request.
  b) Media owner and image.
  c) Zip code of the end-user, if provided.
  d) IP address that issued the request.
6) Reporting. Using the tracking information, the Router provides the following reports for use by Digimarc:
  a) Number of URL requests for a particular date range.
  b) Number of URL requests by media owner for a particular date range.
  c) Number of URL requests by MediaBridge-enhanced image for a particular date range.

(The tracking and reporting are desirably structured to allow media owners to obtain traffic and marketing reports online from the Router.)

MediaBridge Embedding System

The Embedding System includes:
  a Photoshop-compatible Embedder Plug-in for embedding the MediaBridge codes,
  a Photoshop-compatible Reader Plug-in for verifying MediaBridge-enhanced digital images,
  the Client Application for verifying MediaBridge-enhanced proof and press prints, and
  an Internet-based Router Maintenance Application for obtaining MediaBridge codes and assigning URLs to MediaBridge codes.

The Plug-ins require a connection to the Internet only for authorization and to assign new MediaBridge routing codes. The Router Maintenance Application always requires an Internet connection.

Router Maintenance Application

The Router Maintenance Application's primary purpose is to assign routing information to the MediaBridge codes so that an end-user is presented with the appropriate web page when the Client Application reads an image.

The Router Maintenance Application includes the following functionality:
1) Multiple locations. A single media owner account can be accessed by different people in different locations. It can also be accessed by people in different organizations such as by an advertiser and its advertising agency.
2) Restricted Access. Each media owner has the ability to restrict who can access the Router information and can specify who can create new MediaBridge codes, use existing MediaBridge codes, or change the information for routing codes. The media owner can add, change or revoke access at any time.
3) Secure access. All Internet access to the Router is through secure connections.
4) Routing Codes. The assignment of new routing codes, changing existing routing and deleting or reusing old routing codes.
5) Time-based routing. Each routing code can be assigned multiple URLs, each of which can optionally have an effective date and an expiration date that determines when it is to be used in routing. Expired URLs may automatically be deleted by the router after thirty days.
6) Multiple routing. If multiple URLs are specified for a routing code, the Router returns to the end-user a browser-based menu that allows the end-user to chose what page to display, rather than directly navigating to a web page. In one embodiment, a single routing code may have up to four unexpired URLs. Each URL can have a short description that will be a browser link to the URL, a long description of up to 500 characters, and a URL to an icon to be displayed in the menu. The icon can be no larger than 50 pixels high by 300 pixels wide.
7) Logging. All changes to the routing information are logged and may be reviewed by the media owner.

Plug-In Overview

The first time embedding is done on a computer for a media owner, the Embedder requires the account number for the media owner, and a valid user name and password as defined by the media owner. The Embedder connects via the Internet to the Router, verifies that the user is authorized, and downloads information about the media owner. Further embedding for that media owner can be performed without connecting to the Router. However, each time the user connects to the Router to obtain routing information for embedding, the Router validates the user name and password against the currently valid names and passwords. If the previously used name and password are no longer valid, the user has to provide a valid name and password in order to continue embedding for the media owner.

The media owner account number is only needed for the initial authorization since any future verification is done using the name of the media owner as maintained by the Embedder. Since a graphics artist at an advertising agency can work on projects for two or more media owners, a single graphics artist may have different user names and passwords for each media owner.

The Reader Plug-in is used primarily for verification of images after embedding. It restricts access in the same way as the Embedder Plug-in with the additional restriction that it will provide information about an image only if the user can provide a valid user name and password for the media owner. If the media owner information is not available on the current computer, the Reader will connect to the Router for verification.

The plug-ins share this functionality:
1) Multiple media owners. A user can perform embedding or reading for multiple media owners. The user must have a valid user name and password for each media owner.
2) Multiple users. A single computer can be used by several people. Unless they are using the same user name and password, they do not share information.
3) Automatic Software Update. The user can automatically install updates to the plug-ins by making a simple menu choice. The plug-ins connect to the Internet, and download and install any available updates.
4) Secure access. All Internet access is through secure connections.

Embedder Plug-In

The Embedder Plug-in also includes the following functionality:
1. Routing codes assignment. The user selects a routing code to embed from a list of existing codes provided by the Router via an Internet connection. Each routing code is identified by a unique routing number and description. Once selected through the Router the information about a routing code is retained on the local computer until removed by the user.
2. New routing codes. If authorized, the user can connect to the Router through the Embedder to create a new routing code. The routing code can be created with or without the URL information, which can be added later.
3. Routing code updates. Whenever the Embedder connects to the Router, it downloads any updates that were made to routing codes being cached locally.
4. Masked embedding. The user can mask off a part of the image so that the MediaBridge codes are only embedded in the masked area. In one embodiment, different codes are applied in different mask areas. Typically, the user cannot embed different MediaBridge codes in the same part of an image.
5. Variable intensity. The user can globally vary the intensity (and thus visibility) of the MediaBridge watermark from light to very heavy, and can also locally vary the intensity in different areas of an image (i.e., the intensity is adapted to local image characteristics).
6. Logging. Each time the user embeds in an image, the Embedder records a log of the date, time, information embedded, the embedding settings (e.g., intensity), the user name, the computer name, and the name of the input image file. The log is a text file on each user's computer. It can be viewed in any text editor.

Reader Plug-In

The Reader Plug-in also includes the following functionality:
1) Reading. Reads a digital image, which may have been scanned, and, if the user is authorized, displays the media owner, routing information and a measure of the strength of the MediaBridge watermark.
2) Masked reading. The user can mask off part of the image and read the MediaBridge information only from that part.

Part III

Other Combinations

In addition to the aspects detailed earlier, some of the combinations claimed in the priority cases include the following:

A1. A method comprising:
presenting a business card of an individual to an optical sensor, the optical sensor producing output data;
decoding steganographically-encoded plural-bit data from the sensor output data; and
using said plural-bit data to establish a link to an internet address having data relating to the proprietor of said business card.

A2. The method of claim A1 which includes obtaining from said internet site calendar data detailing certain activities of the individual.

A3. The method of claim A2 in which the amount of calendar data obtained depends on an authorization level.

A4. The method of claim A3 in which the authorization level is reflected in the plural-bit data encoded in the individual's business card, wherein an individual can distribute differently-encoded cards to different recipients, to grant the recipients different access rights to said calendar data.

A5. The method of claim A1 in which the optical sensor is a business card reader that also serves to input textual information from business cards into a personal information manager.

A6. The method of claim A5 which includes storing an internet address discerned from the steganographically-encoded plural-bit data into said personal information manager.

A7. The method of claim A1 in which the optical sensor is a digital camera.

A8. The method of claim A7 in which the digital camera is mounted to a computer display device.

A9. The method of claim A7 in which the digital camera is head-mounted on a user thereof.

A10. A method comprising:
presenting a printed promotion to an optical sensor at a first site, the optical sensor producing output data;
decoding steganographically-encoded plural-bit data from the sensor output data;
using said data to establish a link to an internet site relating to a company, product, or service promoted by said printed promotion; and
transferring from the internet site to the first site additional information relating to said company, product, or service.

A11. A method comprising:
presenting a printed identification badge to an optical sensor, the optical sensor producing output data corresponding to optical characteristics of the face of said badge;
decoding steganographically-encoded plural-bit data from the sensor output data;
checking the plural-bit data to determine whether it corresponds to a valid access card; and unlocking a lock depending on the outcome of the foregoing checking operation.

B1. A method comprising:

presenting a digitally encoded object to an optical sensor, the optical sensor producing output data;

decoding plural-bit data from the sensor output data; and using said plural-bit data to establish a link to an internet address having data relating to said object.

B2. The method of claim B1 in which the object is steganographically encoded with said plural-bit data.

B5. An apparatus comprising a refrigerator;

an optical sensor associated with the refrigerator, the sensor being adapted to provide image data corresponding to an object held in front of the sensor; and an image processor for processing the image data and extracting plural-bit binary data therein;

wherein the apparatus is useful for compiling a listing of groceries.

B6. In a method of operating a computer, the computer including an operating system with a registry database, the registry database associating specific data types with specific software programs particularly corresponding thereto, an improvement comprising:

providing a frame of image data;

decoding plural-bit identifier data from the image data;

consulting the registry database to identify a software program corresponding to said identifier data; and invoking the identified software program.

B7. The method of claim B6 which includes:

steganographically decoding plural fields of data from the image data, one of said fields comprising the identifier data; and providing another of said fields of data to the identified software program for use thereby.

B8. A system for responding to an object encoded to convey plural-bit auxiliary data, the system including:

an optical capture device that produces image data corresponding to a field of view, the field of view including visual clutter as well as the object;

a visual clue-based subsystem for identifying the object from the visual clutter in the image data; and a processor for extracting the plural-bit auxiliary data from the object as identified by said subsystem and for applying the extracted auxiliary data to a response system.

B9. The system of claim B8 in which the visual clue-based subsystem identifies the object from the visual clutter by reference to a spectral attribute.

B10. The system of claim B8 in which the object includes a retro-reflective member, and the system includes a source of illumination of spectral character that is reflected off the retro-reflective member and detected by the optical capture device.

B11. The system of claim B8 in which the visual clue-based subsystem identifies the object from the visual clutter by reference to a temporal attribute.

B14. A method of producing an object customized to authorize a person's entry to a first location, comprising:

providing the person an access code;

generating printable data in which the access code is steganographically encoded; and using a printer at a second location remote from the first location to print said printable data.

B15. The method of claim B14 in which the access code is provided to the person via a networked computer, and the first location is a theater.

B16. A printer responsive to commands from printer driver software, the printer driver software being characterized by being responsive to two types of input data, one of said types comprising text data, the other of said types comprising watermark data, the two types being separately applied to the printer driver software, rather than integrated together prior to application to the printer driver software.

B17. In a method of producing printed output using a computer, the printed output comprising text, the computer including software, the software presenting a print dialog box in response to user control, an improvement wherein the print dialog box has a graphical user interface permitting the user to select steganographic encoding of the printed output.

B18. A method of printing magazines, comprising:

processing blank pages to steganographically encode plural bit data thereon;

thereafter, printing text and/or imagery on the processed pages to yield steganographically-encoded printed magazine pages; and binding at least one of said steganographically-encoded printed magazine pages into each of plural magazines.

B19. A method of travel promotion, comprising:

steganographically encoding a travel photograph to hide plural-bit data therein;

processing the travel photograph to extract the plural-bit data therefrom;

using at least part of the extracted plural-bit data to direct an internet web browser to a web site that provides travel information useful to a consumer who wishes to visit the location depicted in the photograph.

B21. A gestural method for providing input to a system, comprising:

holding an object in the hand of a user, positioning the object to be at least partially within the field of view of an optical scanning device, and manually moving said object;

with the scanning device, grabbing frames of image data plural times per second;

processing the frames of image data to identify the object as represented therein;

analyzing the representation of the object in the frames of image data to detect change over time in at least one parameter selected from the list consisting of: rotation state, scale state, differential scale state, and X-Y offset; and controlling some aspect of the system in accordance with said detected change.

B22. The method of claim B21 in which:

the object is digitally-encoded;

the method includes decoding plural-bit digital data from the object; and the system is responsive to at least some of said decoded digital data.

B23. The method of claim B21 in which the system responds to at least some of said decoded digital data by setting a level of sophistication of the system-user interaction accordingly.

B24. The method of claim B21 which includes analyzing the representation of the object in the frames of image data to detect change over time in rotation state, and controlling some aspect of the system in accordance with said detected change.

B25. The method of claim B21 which includes analyzing the representation of the object in the frames of image data to detect change over time in scale state, and controlling some aspect of the system in accordance with said detected change.

B26. The method of claim B21 which includes analyzing the representation of the object in the frames of image data to detect change over time in differential scale state, and controlling some aspect of the system in accordance with said detected change.

B27. The method of claim B21 which includes analyzing the representation of the object in the frames of image data to detect change over time in X-Y offset, and controlling some aspect of the system in accordance with said detected change.

B28. The method of claim B21 which includes analyzing the representation of the object in the frames of image data to detect a first change over time in one of said parameters, and thereafter to detect a second change over time in one of said parameters, and controlling some aspect of the system in accordance with said detected changes.

B29. The method of claim B21 in which the first and second changes both relate to the same parameter.

B30. In a method of operating a telephone-like appliance that establishes a voice circuit between a caller and a recipient, an improvement comprising: presenting to an optical sensor a substrate having indicia thereon, imaging a field of view that includes at least part of the substrate and producing image data corresponding thereto, steganographically decoding plural-bit digital data from the image data, and establishing the voice circuit in accordance with at least some of said plural-bit digital data.

B31. The method of claim B30 in which the indicia comprises a photographic image depicting the recipient.

B32. A method comprising:
positioning an identity object to be at least partially within the field of view of an optical scanning device, the identity object being selected from the list consisting of: a driver's license, a government identity document, a bank card, and an item of signet jewelry;
with the scanning device, grabbing a frame of image data;
processing the image data to steganographically decode plural-bit data therefrom; and
providing at least some of said steganographically decoded data to a computer system.

B33. The method of claim B32 that further includes obtaining email data from an email account corresponding to a person identified by the identity object, and providing same to a user of the computer system.

B34. An email data terminal for use in public places, the terminal including an input and an output, the output providing email data to users thereof, an improvement wherein the input includes an optical scanning device for generating scan data corresponding to an identity object, the identity object being selected from the list consisting of: a driver's license, a government identity document, and bank card.

B35. A promotional method comprising:
presenting an object within the field of view of an optical sensor device, the object being selected from the list consisting of a retail product, or packaging for a retail product;
acquiring optical data corresponding to the object;
decoding plural-bit digital data from the optical data;
submitting at least some of said decoded data to a remote computer; and
determining at the remote computer whether a prize should be awarded in response to submission of said decoded data.

B36. A method of tailoring the desktop of a first computer to conform to a user's preferences, comprising:
presenting an identity object to an optical sensor associated with the first computer;
analyzing image data produced from the optical sensor to decode plural-bit data therefrom; and
tailoring the computer desktop in accordance with said decoded data.

B37. The method of claim B36 that further includes:
using at least part of said decoded data in communicating from said first computer to a remote computer, the remote computer having profile data stored thereon relating to the user's preferred desktop arrangement;
transferring said profile data from the remote computer to the first computer; and
arranging the desktop on the first computer in accordance with said profile data.

B38. A method comprising:
purchasing a product or service from a first vendor;
receiving evidence of the purchase;
presenting the evidence to an optical scanning device to produce image data;
decoding plural-bit data from the image data;
employing said decoded plural-bit data to derive value from a second vendor unrelated to the first.

B39. The method of claim B38 in which the value is the provision of a free, or discounted, product or service from the second vendor.

B40. A method comprising:
presenting a travel document to an optical scanning device, the travel document having plural-bit data encoded thereon, the optical scanning device providing image data corresponding thereto;
discerning the plural-bit data from the image data; and
based on said plural-bit data, establishing a link to a remote computer, and employing said computer to alter travel plans.

B41. A communications method comprising:
presenting a business card to an optical sensor, the optical sensor producing image data, the business card corresponding to a person;
discerning from the image data plural-bit digital information;
using said discerned digital information to access a remote data store;
obtaining from the data store updated contact information for the person; and
establishing communication with the person using said updated contact information;
wherein the contact information at the remote data store is updated during the day as the person's activities make different contact information appropriate at different times.

B42. The method of claim B41 in which the plural-bit digital information is steganographically encoded on the business card.

B44. A method comprising:
presenting a physical object within the field of view of an optical sensor associated with a first computer, the optical sensor providing image data;
decoding plural-bit digital data from the representation of the physical object within said image data;
using a first part of said plural-bit digital data to establish a link between the first computer and a remote computer;
presenting a second part of said plural-bit digital data to the remote computer; and
providing information from the remote computer to the first computer, said information corresponding to said physical object.

B45. The method of claim B44 which includes using the first part of said plural-bit digital data to traverse a network of plural server computers to thereby identify the remote computer.

B46. The method of claim B44 in which the object is a business card relating to a person, and the information provided from the remote computer includes contact information relating to said person.

B47. A method comprising:
steganographically encoding a print advertisement with auxiliary data;
publishing said advertisement;
charging a fee for said publishing to an advertiser;
providing technology by which the steganographic encoding can be exploited to provide enhanced value to the advertiser; and
sharing a portion of said fee with a provider of said technology.

B48. A method comprising:
steganographically embedding a plural-bit digital identifier in a photograph;
storing an annotation in a database in association with said identifier;
presenting the photograph to an optical sensor, the optical sensor providing image data
decoding the identifier from the image data;
using the decoded identifier to access the annotation stored in the database; and
presenting the accessed annotation.

B49. A method of navigating the internet comprising:
linking to an internet address using a computer, and presenting information to a user of the computer from said address;
presenting an object to an optical sensor associated with the computer, the sensor producing image data corresponding to a field of view;
physically manipulating the object within said field of view;
discerning the manipulation of the object from the image data and producing output data corresponding thereto; and
changing the internet address in accordance with said output data, to thereby change the information presented to the user.

B50. A note pad comprising several sheets removably joined to each other at one edge by adhesive, characterized in that each sheet is encoded with plural-bit digital data.

B51. The note pad of claim B50 in which each sheet is steganographically encoded with plural-bit digital data.

B52. The note pad of claim B50 in which each sheet is encoded with the same plural-bit digital data as other sheets in the pad.

B53. A method comprising:
presenting an object to an optical sensor, the optical sensor producing image data, the object being steganographically encoded with plural bits of digital data;
decoding said digital data from the image data; and
in response to said digital data, storing image data from said sensor depicting the object.

B54. The method of claim B53 in which the object is a sheet of paper and the method includes
capturing several frames of image data from the optical sensor;
identifying one of said frames as having a suitable representation of the object;
masking image data corresponding to the sheet from other image data in the identified frame;
processing the image data corresponding to the sheet to change a geometrical attribute thereof;
discerning the size and color of the sheet from certain of said digital data decoded therefrom; and
storing the masked, processed image data corresponding to the sheet in association with data indicating the date and time at which the image was stored, together with the size and color of the sheet.

B55. A method comprising:
presenting an object to an optical sensor, the optical sensor producing image data, the object being steganographically encoded with plural bits of digital data;
decoding said digital data from the image data; and
in response to said digital data, displaying an image of a like object.

B56. The method of claim B55 in which the object is a sheet of paper, and the method includes displaying images of plural sheets of paper earlier stored, in a display order corresponding to the temporal order in which they were earlier stored.

B57. In a computer operating system, a software module responsive to successive frames of two-dimensional image data to extract gesture data therefrom, the gesture data including at least two data from the list consisting of: X-Y position data, rotation state, scale state, and differential scale state.

C1. A communications method comprising:
presenting a business card to an optical sensor, the optical sensor producing image data, the business card corresponding to a person;
discerning from the image data plural-bit digital information;
using said discerned digital information to access a remote data store;
obtaining from the data store updated contact information for the person; and
establishing communication with the person using said updated contact information;
wherein the contact information at the remote data store is updated during the day as the person's activities make different contact information appropriate at different times.

C2. The method of claim C1 in which the plural-bit digital information is steganographically encoded on the business card.

C3. A method comprising:
presenting a physical object within the field of view of an optical sensor associated with a first computer, the optical sensor providing image data;
decoding plural-bit digital data from the representation of the physical object within said image data;
using a first part of said plural-bit digital data to establish a link between the first computer and a remote computer;
presenting a second part of said plural-bit digital data to the remote computer; and
providing information from the remote computer to the first computer, said information corresponding to said physical object.

C4. The method of claim C3 which includes using the first part of said plural-bit digital data to traverse a network of plural server computers to thereby identify the remote computer.

C5. The method of claim C3 in which the object is a business card relating to a person, and the information provided from the remote computer includes contact information relating to said person.

D1. A method comprising:
presenting a digitally encoded object to an optical sensor, the optical sensor producing output data;
decoding plural-bit data from the sensor output data; and
using said plural-bit data to establish a link to an internet address having data relating to said object.

D2. The method of claim D1 in which the object is steganographically encoded with said plural-bit data.

E1. A promotional method comprising:
steganographically encoding a print advertisement to hide plural-bit data therein;

processing the print advertisement to extract the plural-bit data therefrom;

using at least a part of the extracted plural-bit data to direct an internet web browser to a web site that provides consumer information related to a product or service promoted by the print advertisement.

E2. A method of determining consumer response to print advertising, comprising:

steganographically encoding a first print advertisement with first data;

steganographically encoding a second print advertisement with second data;

decoding the first and second data when consumers present the first and second advertisements to an optical sensor; and tallying the number of decoded first and second data, respectively, to determine consumer response to the advertisements.

E4. A method of travel promotion, comprising:

steganographically encoding a travel photograph to hide plural-bit data therein;

processing the travel photograph to extract the plural-bit data therefrom;

using at least part of the extracted plural-bit data to direct an internet web browser to a web site that provides travel information useful to a consumer who wishes to visit the location depicted in the photograph.

F1. In a mouse having X- and Y-position encoders, and circuitry responsive thereto for generating X- and Y-movement data and providing same to an associated computer, an improvement comprising an optical sensor disposed in said mouse, and circuitry responsive thereto for producing grey-scale optical image data and for providing same to the associated computer, wherein the mouse serves both as a positioning device and as an optical input device.

F2. A semiconductor comprising:

a substrate having formed thereon:

a two dimensional image sensor for producing sensor signals;

first circuitry responsive to said sensor signals for producing image data corresponding thereto, and for providing said image data to an image data output of said semiconductor;

second circuitry responsive to said sensor signals or to said image data for steganographically decoding plural-bit digital data therefrom, and for providing same to a steganographic decoder output of said semiconductor.

F3. In a method of operating a computer system that includes an internet web browser, an improvement comprising:

providing a peripheral device having a sensor;

positioning the peripheral device adjacent a first object to direct the web browser to a first address; and positioning the peripheral device adjacent a second object to direct the web browser to a second address.

G1. A peripheral device for a computer system comprising:

a housing adapted to fit within a user's palm and slide over a medium;

an optical sensor having plural sensing elements and producing image signals;

a lens for imaging the medium onto the sensor;

circuitry coupled to the sensor and disposed within the housing for processing the signals from the sensor and formatting same as frames of output data; and transfer means for relaying the output data from the peripheral device to the computer system.

G2. The device of claim G1 in which the transfer means is a cable.

G3. The device of claim G1 in which the transfer means is a wireless link.

G4. The device of claim G1 in which the circuitry decodes plural bit binary data that is steganographically encoded within image sensed by the sensor, and the transfer means relays the decoded data to the computer system.

G5. An electronic commerce method comprising:

providing a printed catalog that includes an image of an article offered for sale by a merchant, wherein the image is steganographically encoded with plural-bit binary data;

optically sensing the image to produce image data corresponding thereto;

decoding the steganographically encoded data from the image data; and electronically ordering the article from the merchant by use of said decoded data, wherein said ordering makes use of earlier-stored customer profile information.

G6. The method of claim G5 in which the customer profile information includes clothing size data.

G7. The method of claim G6, further comprising:

processing the decoded data for transmission to a remote merchant computer, said processing including supplementing the decoded data with supplemental data corresponding to the customer;

transmitting the processed data to the remote merchant computer;

receiving first order data from the remote merchant computer, responsive to the transmitted processed data;

presenting the first order data to the customer;

receiving from the user further input selecting among options included in the first order data; and transmitting said further input to the remote merchant computer.

G8. The method of claim G7 in which the supplemental data includes the customer profile information.

G9. The method of claim G7 in which the supplemental data includes data identifying the customer.

G10. An access control device comprising:

a badge;

a photograph on the badge;

the photograph having plural-bit auxiliary data hidden therein, said auxiliary data corresponding to an authorized bearer of the badge;

the badge further including further bearer-identification information, said further information being machine-detectable.

G11. The device of claim G10 in which the further information is encoded by an RF proximity circuit formed with the badge.

G12. The device of claim G10 in which the further information is encoded in a bar code on the badge.

G13. The device of claim G10 in which the further information is encoded in a magnetic stripe on the badge.

G14. A method of accessing a secured premise comprising:

presenting a badge to a sensor station;

generating optical data corresponding to a photograph on the badge;

processing the optical data to extract plural-bit auxiliary data steganographically encoded therein;

machine-sensing the ID of the badge from data not encoded in the photograph; and checking correspondence between the machine-sensed ID and the auxiliary data extracted from the photograph to determine whether access to the secure premise is authorized.

I1. An image-based navigation system, comprising:
an optical input device;
a client application responsive to digital data encoded in an image; and
a router responsive to at least a part of said digital data.

I2. A computer storage medium having instructions thereon for causing a camera-equipped computer system to engage in a training exercise with a user to familiarize the user with operation of a camera-based internet navigation system.

I3. An internet navigation device comprising a substrate having an image printed thereon, the image having first and second data encoded therewith, the first data comprising an owner code, the second data comprising a router code, said device being useful in linking a camera-equipped computer system to an internet address.

I4. The device of claim I3 in which the owner and router codes are steganographically encoded in the image.

I6. An image-based network navigation method permitting a user to link to a remote computer, comprising:
detecting encoded data from a printed image;
linking to the remote computer through a network in accordance with said encoded data; and
providing an identity of the image to the remote computer.

I7. In an internet navigation system comprising a client application in communication with a remote router, a method comprising:
providing first data from the client application to the router;
providing plural data from the router to the client application;
at the client application, presenting a menu corresponding to said plural data; and
accepting user input corresponding to one of said plural data.

I8. The method of claim I7 that includes deriving the first data from image data provided from an optical input device.

I9. The method of claim I8 that includes linking the client application to a web page corresponding to the accepted user input.

I10. The method of claim I9 that includes presenting to a user a branded display locally stored at the client application while waiting for the linked web page to display.

I11. A router that accepts a routing code and responds with a URL corresponding thereto, characterized in that at least one routing code corresponds to plural URLs, each of which has temporal information detailing when the URL is to be used.

J2. A database method comprising:
generating a database record including plural data fields;
generating a file corresponding to said database record and including data from at least certain of said fields;
electronically distributing a copy of the file to each of plural recipients;
one of said recipients adding data to a copy of the file, or changing data in a copy of the file, and sending the file to the database;
updating the database record in accordance with said changed file;
generating a new file corresponding to the updated database record and including data from at least certain of said fields; and
electronically distributing a copy of the new file to each of said plural recipients.

J3. A system for linking from physical or digital objects to corresponding digital resources, comprising:
registration means for receiving data relating to an object, including its identity and owner, and associating same in a database with data relating to a corresponding response;
originating device means for sensing data from an input object, processing same, and forwarding same to a routing means;
routing means for processing the processed data from the originating device means, logging information from same, and forwarding at least certain of said processed data to a product handler means; and
product handler means for providing a response to the originating device means in accordance with the information provided thereto by the routing means.

J4. The system of claim J3 in which the routing means includes means for checking information in the database.

J5. The system of claim J3 in which the registration means includes means for generating an encapsulating file and means for distributing said file to predetermined parties.

J13. A networked computer system, responsive to watermark data sent from a remote client application to initiate delivery of audio or video data.

J14. The networked computer system of claim J13, responsive to watermark data sent from a software program on a remote computer, to initiate delivery of audio or video data to said remote computer.

J16. A networked computer system, responsive to watermark data sent from a software program on a remote computer, to initiate delivery of updated software to said remote computer.

K1. In a scanner including a CPU, a memory, a linear sensor array, and first and second spaced-apart 2D sensor arrays serving as motion encoders, the CPU serving to process raw scan data collected by the linear sensor array from an imaged object into final scan data in accordance with scanner motion data provided from said 2D sensors, an improvement comprising software instructions in the memory causing the scanner to discern a machine-readable identifier from scan data acquired from the object.

K2. The scanner of claim K1, further comprising a wireless interface, and a display, said software instructions causing the scanner to relay the identifier by the wireless interface to a remote server, and for processing information returned through the wireless interface for presentation on said display.

K3. The scanner of claim K1 in which the software instructions cause the CPU to process data from the 2D sensor arrays for a purpose in addition to sensing scanner motion.

K4. The scanner of claim K3 in which said purpose includes beginning a watermark detection process before data from the linear sensor array is finally processed.

K5. The scanner of claim K4 in which said purpose includes beginning to sense a watermark calibration signal.

K6. The scanner of claim K3 in which said purpose includes identifying portions of the data collected by the linear sensor array that are relatively more likely to include detectable identifier data.

K7. The scanner of claim K3 in which said purpose is to quantify an object surface characteristic, wherein a filter can be applied to the scan data in accordance therewith.

K8. The scanner of claim K3 in which said purpose is to assess relative distance to the object from different portions of the scanner.

K9. The scanner of claim K3 in which said purpose is to quantify an affine distortion in the scan data, so that compensation may be applied therefore.

K10. The scanner of claim K1 in which the identifier is steganographically encoded as a digital watermark.

K11. The scanner of claim K1 in which the identifier is encoded as a barcode.

K12. A scanner comprising a linear sensor array, a CPU, an interface for coupling to the internet, and a user interface including a display screen and user controls, the scanner being adapted to transmit machine-readable data sensed from scanned objects to the internet, and for presenting to a user HTML information received back from the internet.

L1. In an image watermarking technique that includes changing an optically-sensible pattern on an object, an improvement wherein the object has a non-planar surface, and the watermark applied to said surface is pre-warped to precompensate for said non-planarity.

L2. The method of claim L1 in which the watermark is geometrically pre-warped.

L3. The method of claim L1 in which the object has a cylindrical surface.

L4. The method of claim L3 in which the object is a container for consumer goods.

L5. The method of claim L4 in which the object is a soft drink can.

L6. The method of claim L1 in which the watermark is pre-warped in a transform domain.

L7. The method of claim L6 in which the watermark is pre-warped in the wavelet domain.

L8. The method of claim L6 in which the watermark is pre-warped in the DCT domain.

L9. The method of claim L1 in which the watermark is pre-warped to account for a curvature-induced apparent geometrical distortion.

L10. The method of claim L1 in which said surface is pre-warped to account for a distance-induced apparent geometrical distortion.

L11. The method of claim L10 in which the watermark is pre-warped to account for a curvature-induced apparent geometrical distortion.

L12. In watermark decoding technique that includes analyzing a frame of image data to decode a watermark encoded therein, an improvement comprising applying an unwarping function to the image data prior to decoding the watermark.

L13. The method of claim L12 which includes successively applying different unwarping functions to the image data to attempt to decode valid watermark data therefrom.

L14. The method of claim L12 which includes selecting one or more unwarping functions to apply based on information provided by a user.

L15. The method of claim L14 in which said information identifies a general class of objects to which the object belongs, without specifically identifying a specific object shape.

CONCLUSION

Having described and illustrated the principles of our technology with reference to illustrative embodiments, it should be recognized that our technology is not so limited.

For example, while certain of the embodiments were illustrated with reference to internet-based systems, the same techniques are similarly applicable to any other computer-based system. These include non-internet based services such as America Online and Compuserve, dial-up bulletin board systems, etc. Likewise, for internet-based embodiments, the use of web browsers and web pages is not essential; other digital navigation devices and other on-line data repositories can be similarly accessed.

Similarly, while the details of illustrative systems were particularly given, the underlying principles can be employed in numerous other forms.

For example, one other form is to steganographically encode physical objects with Digital Object Identifiers (DOIs). The Center for National Research Initiatives and the Digital Object Identifier Foundation (www.doi.org) have performed extensive work in establishing an infrastructure by which digital objects can be distributed, tracked, and managed. Some of this same infrastructure and technology can be adapted, in accordance with the teachings provided above, to associate new functionality with physical objects.

Another form is not to reference a remote data repository by data embedded on an object, but instead to encode the ultimate data directly on the object. A photograph, for example, can be literally encoded with a telephone number. On presenting the photograph to an optical sensor on the telephone, the telephone can analyze the optical information to extract the telephone number, and dial the number, without the need for any external data. Similarly, a printed office document (e.g., spreadsheet) can be encoded with the path and file name of the corresponding electronic file, obviating the need for indirect linking (e.g., to a remote database to correlate a UID to a computer address). A person's business card can directly encode that person's email or web address. Most of the above-described embodiments are suitable for such direct encoding of the related data.

In the business card example given above, the detailed techniques can be supplementary to existing optical character recognition techniques. That is, the image data from an optical sensor can be applied both to a Bedoop decoder and to an OCR system. Text characters discerned by the OCR system can be entered directly into a contacts manager personal database. The techniques employed in the Bedoop system to locate the encoded object and handle visual distortion (e.g., the visual artifacts due to scale, rotation, etc.) can advantageously be used in OCR detection as well, permitting extraction of the OCR information without careful placement of the card.

While certain of the foregoing embodiments made reference to ink-jet printing, similar advantages can often be obtained with other printing technologies, e.g., laser/xerographic printing, offset printing, etc.

In the foregoing embodiments, Bedoop decoding generally proceeded from image data obtained from a physical object. However, in some contexts, it is advantageous to Bedoop-decode image data provided electronically, e.g., over the internet.

Likewise, while the foregoing embodiments generally relied on Bedoop image sensors that stared out for an object at an expected point, in alternative embodiments, sensors that seek rather than stare can be employed (as was illustrated above in connection with the elevator example).

Similarly, while the illustrated embodiments generally employed sensors that repeatedly grabbed frames of image data, this need not be the case. Single frame systems, such as flatbed scanners, and video systems arranged to grab single frames—with or without TWAIN interfaces—can alternatively be used.

As indicated above, while steganographic encoding of the digital data is used in the preferred embodiments, visible forms of digital encoding—such as bar codes—can naturally be employed where aesthetic considerations permit.

In certain of the embodiments, digital data conveyed by means other than optical can be used. Electromagnetic detection (e.g., of the sort used in proximity-based card-access systems) can be arranged to decode digital data, permitting "at-a-distance" reading of data from physical objects, just as in the foregoing embodiments.

Since the Bedoop image sensors typically acquire plural frames of data, the extraction of the digital data can be based on more than a single image frame. More confidence in the results may be accumulating decoded data over several frames. Moreover, movement of the object within the sensor's field of view may permit the system to acquire information from other perspectives, etc., enhancing system operation.

While the preferred embodiments employ 2-D image sensors (e.g., CCDs), other optical sensing technology can alternatively be employed. Supermarket laser scanners, for example, can read bar-code data. Raster-scanning of such systems can permit acquisition of 2-D data (either in bit-mapped form, or grey-scale).

Some embodiments can advantageously employ texture-based Bedoop encoding of objects. Bedoop texturing can be effected by various means, including pressure rollers, chemical or laser etching, etc.

It should be noted that the responses triggered by a watermark can be changed over time. This extends the useful life of an encoded object. For example, an encoded link in a magazine ad for a 1999 Ford Explorer that points to a Ford URL related to the 1999 Ford Explorer can be updated to point to the URL for the 2000 model year version when marketing of the new model year vehicles commences.

In other embodiments, of course, a literal URL can be encoded, and can be used to direct a browser or other information appliance to that address. Still further, a literal URL can be encoded, but not necessarily used. Instead, the encoded URL can be mapped to an actual URL (i.e., a URL to which the browser is directed or to which a response to the MediaBridge object is otherwise keyed) through a database. In one such embodiment, a URL is encoded in an object together with a future date. On "reading" the object, the local (client) computer checks the associated date. If the date has not passed, the literal URL is used as the actual URL. If the date has passed, the client computer refers to the code to a remote database (e.g., at the router) to obtain an actual URL (which may be the same—if no update has been required, or may be new). The actual URL is then used in providing a response to the MediaBridge object.

The implementation of the watermark encoding and decoding systems is straightforward to artisans in the field, and thus not unduly belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

While the foregoing embodiments have generally employed planar objects to convey the digital encoding, this need not be the case. Objects of other shapes can likewise be employed. Some shapes present relatively straightforward image processing tasks. As noted above, data imaged from a soft drink can or other cylindrical surface can be remapped using known geometrical transforms so as to essentially "unwrap" the printing from the can. Other geometries can present more complex re-mappings, but are likewise generally within the capabilities of the artisan. (Such remapping is facilitated by encoding in the data certain reference markings, such as subliminal graticules, etc. The unknown 3D shape of the object being imaged can usually be inferred from the apparent warping of the reference markings in the 2D image data generated by the scanner. Once the warping is characterized, it is generally straightforward to un-warp so as to prepare the image data for decoding.)

It was once popular to predict that paper documents would be replaced with electronic media. In hindsight, electronic media may be recognized as a poor surrogate for paper. Electronic media conveys information flawlessly, but is lacking in experiential attributes. We can hold paper, stack it, own it, deface it, give it, guard it, etc. It provides an opportunity for physical dominion entirely lacking with electronic media.

From the foregoing discussion it can be seen that, rather than replacing paper with electronic media, perhaps the future lies in giving paper digital attributes—hybridizing the physical experience of paper with the technical advantages of digital media. Such an arrangement makes available a great wealth of new functionality, now accessible through familiar paper items, rather than through a "computer input peripheral."

In view of the many embodiments to which the above-detailed principles may be applied, it should be recognized that the detailed embodiments are illustrative only and should not be taken as limiting. Rather, we claim all such embodiments as fall within the scope and spirit of the following claims, and equivalents thereto.

We claim:

1. A method comprising:
   discerning, using a processor, a plural-bit identifier from first content, wherein the first content comprises audio or video represented by content data values, wherein the discerning comprises applying a series of operations on the content data values to produce the plural-bit identifier, and wherein the plural-bit identifier is based on the content data values;
   determining if a data structure contains information corresponding to the discerned content identification data;
   based upon the determining, sending data related to the discerned content identification data to a first remote computer;
   based upon the sending of data to the first remote computer, receiving, at a portable device, from a second remote computer, information that corresponds to the discerned content identification data;
   based upon the sending of data to the first remote computer, receiving at the portable device, from the second remote computer, information identifying resources associated with second content, wherein the first content is distinct from the second content; and
   taking action, at the portable device, based on the received information.

2. The method of claim 1, wherein the discerning comprises applying a mathematic algorithm to the content data values to produce the content identification data.

3. A method comprising:
   capturing content from an environment, using a sensor in a portable device;
   producing a series of digital values from the content, wherein the content comprises human-perceptible audio features or visual features;
   deriving a plural-bit identifier corresponding to the captured content, based on the series of digital values;
   applying at least some of the content identification data to a first data structure to yield first response data;
   based at least upon the first response data, applying at least some of the content identification data to a second data structure, to yield second response data;
   identifying a remote computer based at least in part on the first response data or the second response data; and obtaining response information from the remote computer for presentation to the user.

4. The method of claim 3, wherein the first data structure resides in a data store of the portable device, and wherein the second data structure resides in a data store remote from the portable device.

5. The method of claim 3 further comprising:
in response to the first response data being of a second type, applying the content identification data to the second data structure, to yield second response data; and
in response to the second response data being of the second type, applying the content identification data to a third data structure, to yield third response data.

6. The method of claim 3, wherein the response data of the first type comprises a URL.

7. A method comprising:
capturing content from an environment, using a sensor in a portable user device;
producing a series of digital values from the content, wherein the content comprises human-perceptible visual or audio features;
deriving, based on the series of digital values, a plural-bit identifier corresponding to the captured content;
checking, by reference to at least some of the plural-bit identifier, a first data store, in the portable device, for information about how the portable device should respond to the captured visual or audio content;
based at least upon the checking of the first data store, checking a second data store, associated with a first computer network, for the information about how the portable device should respond to the captured visual or audio content;
based at least upon the checking of the second data store, checking a further data store for the information about how the portable device should respond to the captured content; and
taking an action at the portable device in accordance with the information about how the portable device should respond to the captured content, wherein different actions to the same content can be specified in different data stores having different priority to the user device.

8. The method of claim 7, wherein the first computer network comprises a corporate computer network.

9. A method comprising:
capturing, using a camera of a portable computing device, visual content data from a physical article, wherein the physical article is distinct from a user;
applying a digital watermark decoding process to discern steganographically encoded plural bit content identification data found in the visual content data;
checking whether a data structure in the portable computing device has information corresponding to the content identification data and, if so, taking action based on the information, wherein the action comprises presenting a graphical menu from which one of plural actions relating to the article is selectable; and
based at least upon the checking of the data structure in the portable computing device:
sending data related to the content identification data to a remote computer, wherein one or more successive remote computers receive at least part of the sent data from the remote computer;
receiving, at the portable device, a list of resources with the content identification data from one of the successive remote computers that corresponds to the article;
presenting the list of resources on a screen of the portable computer device;
receiving a selection of a resource from the list of resources; and
initiating a link to the selected resource.

10. A non-transitory computer-readable medium having instructions stored thereon that, if executed by a computing device, cause the computing device to perform operations comprising:
discerning a plural-bit identifier from first content, wherein the first content comprises audio or video represented by content data values, wherein the discerning comprises applying a series of operations on the content data values to produce the plural-bit identifier, and wherein the plural-bit identifier is based on the content data values;
determining if a data structure contains information corresponding to the discerned content identification data;
based upon the determining, sending data related to the discerned content identification data to a first remote computer;
based upon the sending of data to the first remote computer, receiving from a second remote computer, information that corresponds to the discerned content identification data;
based upon the sending of data to the first remote computer, receiving from the second remote computer, information identifying resources associated with second content, wherein the first content is distinct from the second content; and
taking action based on the received information.

11. The non-transitory computer-readable medium of claim 10, wherein the discerning comprises applying a mathematic algorithm to the content data values to produce the content identification data.

12. A non-transitory computer-readable medium having instructions stored thereon that, if executed by a computing device, cause the computing device to perform operations comprising:
receiving content captured from an environment;
producing a series of digital values from the content, wherein the content comprises human-perceptible audio features or visual features;
deriving a plural-bit identifier corresponding to the captured content, based on the series of digital values;
applying at least some of the content identification data to a first data structure to yield first response data;
based upon the first response data, applying at least some of the content identification data to a further data structure, to yield second response data;
identifying a remote computer based at least in part on the first response data or the second response data; and
obtaining response information from the remote computer for presentation to the user.

13. The non-transitory computer-readable medium of claim 12, wherein the operations further comprise:
in response to the first response data being of a second type, applying the content identification data to the second data structure, to yield second response data; and
in response to the second response data being of the second type, applying the content identification data to a third data structure, to yield third response data.

14. The non-transitory computer-readable medium of claim 12, wherein the response data of the first type comprises a URL.

15. An apparatus comprising:
a sensor configured to capture content from an environment;

a processor configured to:
  receive the content captured from an environment by the sensor;
  produce a series of digital values from the content, wherein the content comprises human-perceptible audio features or visual features;
  derive a plural-bit identifier corresponding to the captured content, based on the series of digital values;
  apply at least some of the content identification data to a first data structure to yield first response data;
  based at least upon the first response data, apply at least some of the content identification data to a second data structure, to yield second response data;
  identify a remote computer based at least in part on the first response data or the second response data; and
  obtaining response information from the remote computer; and
a display configured to present the response information.

16. The apparatus of claim 15, wherein the processor is further configured to:
  in response to the first response data being of a second type, apply the content identification data to the second data structure, to yield second response data; and
  in response to the second response data being of the second type, apply the content identification data to a third data structure, to yield third response data.

17. The apparatus of claim 15, wherein the response data of the first type comprises a URL.

18. A non-transitory computer-readable medium having instructions stored thereon that, if executed by a computing device, cause the computing device to perform operations comprising:
  receiving content captured from an environment;
  producing a series of digital values from the content, wherein the content comprises human-perceptible visual or audio features;
  deriving, based on the series of digital values, a plural-bit identifier corresponding to the captured content;
  checking, by reference to at least some of the plural-bit identifier, a first data store, for information about how the computing device should respond to the captured visual or audio content;
  based at least upon the checking of the first data store, checking a second data store, associated with a first computer network, for the information about how the computing device should respond to the captured visual or audio content;
  based at least upon the checking of the second data store, checking a further data store for the information about how the computing device should respond to the captured content; and
  taking an action at the computing device in accordance with the information about how the computing device should respond to the captured content, wherein different actions to the same content can be specified in different data stores having different priority to the user device.

19. A non-transitory computer-readable medium having instructions stored thereon that, if executed by a computing device, cause the computing device to perform operations comprising:
  receiving visual content data from a physical article, wherein the physical article is distinct from a user;
  applying a digital watermark decoding process to discern steganographically encoded plural bit content identification data found in the visual content data;
  checking whether a data structure has information corresponding to the content identification data and, if so, taking action based on the information, wherein the action comprises presenting a graphical menu from which one of plural actions relating to the article is selectable; and
  based at least upon the checking of the data structure:
    sending data related to the content identification data to a second remote computer, wherein one or more successive remote computers receive at least part of the sent data from the second computer;
    receiving a list of resources with the content identification data from one of the successive remote computers that corresponds to the article;
  presenting a graphical display of the list of resources;
  receiving a selection of a resource from the list of resources; and
  initiating a link to the selected resource.

20. An apparatus comprising:
a camera configured to capture visual content data from a physical article, wherein the physical article is distinct from a user;
a processor configured to:
  apply a digital watermark decoding process to discern steganographically encoded plural bit content identification data found in the visual content data;
  check whether a data structure has information corresponding to the content identification data and, if so, taking action based on the information, wherein the action comprises presenting a graphical menu from which one of plural actions relating to the article is selectable; and
  based at least upon the checking of the data structure:
    send data related to the content identification data to a second remote computer, wherein one or more successive remote computers receive at least part of the sent data from the second computer;
    receive a list of resources with the content identification data from one of the successive remote computers that corresponds to the article;
    receive a selection of a resource from the list of resources; and
    initiate a link to the selected resource; and
a screen configured to present a graphical display of the list of resources.

* * * * *

UNITED STATES PATENT AND TRADEMARK OFFICE
CERTIFICATE OF CORRECTION

PATENT NO.       : 8,489,598 B2                                        Page 1 of 4
APPLICATION NO.  : 11/671848
DATED            : July 16, 2013
INVENTOR(S)      : Rhoads et al.

It is certified that error appears in the above-identified patent and that said Letters Patent is hereby corrected as shown below:

On the Title Page, in Column 1, below Related U.S. Application Data, delete Item "(60)" and insert Item -- (63) --, therefor.

Figure 3:
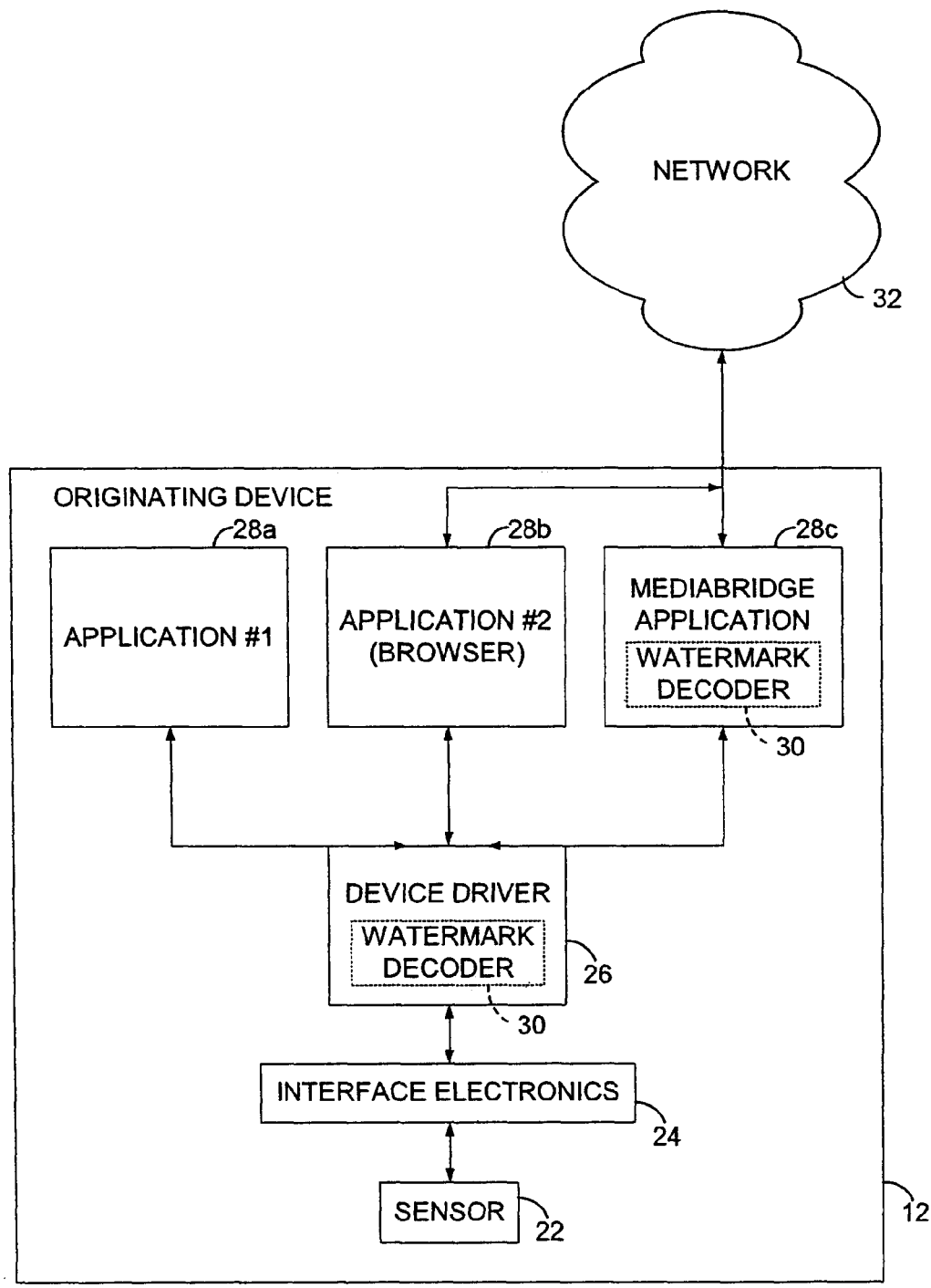
FIG. 3 is a block diagram more particularly detailing an originating device used in the system of FIG. 2.

In the Drawings,

In Fig. 3, Sheet 3 of 16, delete " 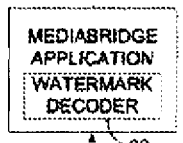 " and insert --  --, therefor.

In Fig. 3, Sheet 3 of 16, delete " 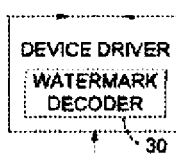 " and insert --  --, therefor.

Figure 7:
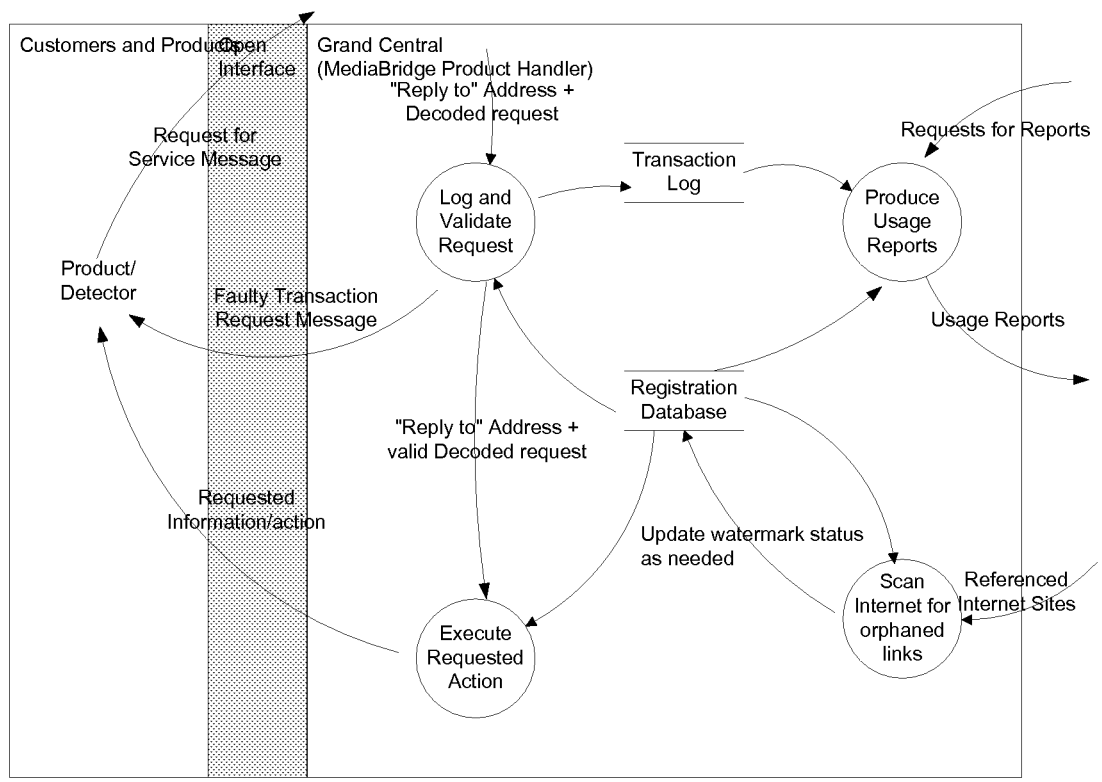
FIG. 7 illustrates certain data flows associated with the product handler of FIG. 2.

In Fig. 7, Sheet 7 of 16, delete " Produciden " and insert -- Product Open --, therefor.

In Fig. 12, Sheet 12 of 16, delete "  " and insert --  --, therefor.

In Fig. 13, Sheet 13 of 16, delete Tag "10" and insert Tag -- 210 --, therefor.

In the Specification,

In Column 1, Line 18, delete "applications" and insert -- applications: --, therefor.

Signed and Sealed this
Fourth Day of November, 2014

Michelle K. Lee
*Deputy Director of the United States Patent and Trademark Office*

In Column 2, Line 38, delete "comprises" and insert -- comprises: --, therefor.

In Column 2, Line 46, delete "comprises" and insert -- comprises: --, therefor.

In Column 4, Line 44, delete "comprising" and insert -- comprising: --, therefor.

In Column 4, Line 50, delete "comprising" and insert -- comprising: --, therefor.

In Column 7, Line 65, delete "unnoticeable," and insert -- un-noticeable, --, therefor.

In Column 10, Line 21, delete "example decoding" and insert -- example, decoding --, therefor.

In Column 10, Line 42, delete ""1"," and insert -- "1" --, therefor.

In Column 12, Line 62, delete "browser 40" and insert -- browser 140 --, therefor.

In Column 12, Line 63, delete "computer 42." and insert -- computer 142. --, therefor.

In Column 12, Line 65, delete "server 42" and insert -- server 142 --, therefor.

In Column 12, Line 67, delete "server 44." and insert -- server 144. --, therefor.

In Column 13, Line 3, delete "server 44" and insert -- server 144 --, therefor.

In Column 13, Line 3, delete "tree 46" and insert -- tree 146 --, therefor.

In Column 13, Line 4, delete "server 48a," and insert -- server 148a, --, therefor.

In Column 13, Line 5, delete "tier 50" and insert -- tier 150 --, therefor.

In Column 13, Lines 6-7, delete "server 48b" and insert -- server 148b --, therefor.

In Column 13, Line 9, delete "tier 50" and insert -- tier 150 --, therefor.

In Column 13, Line 14, delete "servers 56." and insert -- servers 156. --, therefor.

In Column 13, Line 16, delete "server 56." and insert -- server 156. --, therefor.

In Column 13, Line 18, delete "server 58" and insert -- server 158 --, therefor.

In Column 13, Line 28, delete "port 59" and insert -- port 159 --, therefor.

In Column 15, Line 33, delete "(or" and insert -- or --, therefor.

In Column 18, Line 21, delete "need" and insert -- need to --, therefor.

CERTIFICATE OF CORRECTION (continued)
U.S. Pat. No. 8,489,598 B2

In Column 18, Line 59, delete "handing" and insert -- handling --, therefor.

In Column 20, Line 4, delete "prewarped" and insert -- pre-warped --, therefor.

In Column 20, Line 12, delete "degrees.)" and insert -- degrees. --, therefor.

In Column 20, Line 18, delete "+/-90 degree" and insert -- +/-90 degrees --, therefor.

In Column 21, Line 13, delete "products'" and insert -- products" --, therefor.

In Column 22, Line 14, delete "data.)" and insert -- data. --, therefor.

In Column 23, Line 26, delete "(e.g.," and insert -- e.g., --, therefor.

In Column 25, Line 9, delete "(It" and insert -- It --, therefor.

In Column 27, Line 2, delete "rotation" and insert -- rotation. --, therefor.

In Column 33, Line 23, delete "(Many" and insert -- Many --, therefor.

In Column 34, Line 57, delete "others" and insert -- other --, therefor.

In Column 41, Line 52, delete "device 210" and insert -- device 224 --, therefor.

In Column 43, Lines 44-45, delete "scanner 10" and insert -- scanner 210 --, therefor.

In Column 48, Line 63, delete "indiscernable" and insert -- indiscernible --, therefor.

In Column 51, Lines 57, delete "updates)" and insert -- updates). --, therefor.

In Columns 53-54, in Table 1, under "Comments", Line 35, delete "form" and insert -- from --, therefor.

In Column 56, Line 56, delete "ID" and insert -- ID. --, therefor.

In Column 63, Line 67, delete "form.)" and insert -- form. --, therefor.

In Column 67, Line 26, delete "account" and insert -- account. --, therefor.

In Column 67, Line 28, delete "password" and insert -- password. --, therefor.

In Column 76, Line 26, delete "(Default)" and insert -- (Default.) --, therefor.

In Column 81, Line 11, delete "comprising" and insert -- comprising: --, therefor.

CERTIFICATE OF CORRECTION (continued)
U.S. Pat. No. 8,489,598 B2

In Column 85, Line 18, delete "data" and insert -- data; --, therefor.

In Column 85, Line 53, delete "includes" and insert -- includes: --, therefor.

In Column 91, Line 36, delete "In" and insert -- In a --, therefor.

In the Claims,

In Column 95, Line 7, in Claim 5, delete "claim 3" and insert -- claim 3, --, therefor.

UNITED STATES PATENT AND TRADEMARK OFFICE
CERTIFICATE OF CORRECTION

| | | |
|---|---|---|
| PATENT NO. | : 8,489,598 B2 | Page 1 of 1 |
| APPLICATION NO. | : 11/671848 | |
| DATED | : July 16, 2013 | |
| INVENTOR(S) | : Rhoads et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1078 days.

Signed and Sealed this
Eleventh Day of November, 2014

Michelle K. Lee
*Deputy Director of the United States Patent and Trademark Office*